(12) United States Patent
Pellegrini et al.

(10) Patent No.: US 11,743,706 B2
(45) Date of Patent: Aug. 29, 2023

(54) ENHANCED COMMUNICATION FUNCTIONS FOR EMERGENCY SERVICE PROVIDERS

(71) Applicant: RapidSOS, Inc., New York, NY (US)

(72) Inventors: Riccardo Pellegrini, New York, NY (US); Jeremy Hitchcock, New York, NY (US); Nicole Leonard, Longmont, CO (US); Nicholas Edward Horelik, New York, NY (US); Jee Yoon Choi, Brooklyn, NY (US); Lauren Javaly, Brooklyn, NY (US); Brianna Guzman, Brooklyn, NY (US); John Alan Pirrie, Lehi, UT (US); Andrew Lindstrom Gillespie, Brooklyn, NY (US)

(73) Assignee: RapidSOS, Inc., New York, NY (US)

( * ) Notice: Subject to any disclaimer, the term of this patent is extended or adjusted under 35 U.S.C. 154(b) by 0 days.

(21) Appl. No.: 17/515,073

(22) Filed: Oct. 29, 2021

(65) Prior Publication Data
US 2022/0141637 A1  May 5, 2022

Related U.S. Application Data

(60) Provisional application No. 63/209,369, filed on Jun. 10, 2021, provisional application No. 63/108,225, filed on Oct. 30, 2020.

(51) Int. Cl.
*H04W 4/90* (2018.01)
*H04W 4/12* (2009.01)
*H04M 1/72469* (2021.01)

(52) U.S. Cl.
CPC ......... *H04W 4/90* (2018.02); *H04M 1/72469* (2021.01); *H04W 4/12* (2013.01)

(58) Field of Classification Search
None
See application file for complete search history.

(56) References Cited

U.S. PATENT DOCUMENTS

| | | | | |
|---|---|---|---|---|
| 2009/0147928 A1* | 6/2009 | Hwang | ............... | H04W 76/50 379/45 |
| 2010/0262668 A1* | 10/2010 | Piett | ............... | H04W 4/90 709/219 |
| 2012/0290947 A1* | 11/2012 | Baggett | ............... | G06F 3/04842 715/752 |
| 2018/0206099 A1* | 7/2018 | O'Connor | ............... | H04W 4/02 |
| 2020/0278216 A1* | 9/2020 | Gotschall | ............... | G01C 21/3664 |
| 2021/0219257 A1* | 7/2021 | Anand | ............... | H04W 64/003 |

* cited by examiner

*Primary Examiner* — Jinsong Hu
*Assistant Examiner* — Alexander J Yi
(74) *Attorney, Agent, or Firm* — Fitch, Even, Tabin & Flannery LLP

(57) ABSTRACT

Described herein are systems, devices, methods, and media for providing one or more of interagency communications, big text, area alert, and text or callback.

18 Claims, 33 Drawing Sheets

ENHANCED COMMUNICATION FUNCTIONS FOR EMERGENCY SERVICE PROVIDERS

CROSS-REFERENCE TO RELATED APPLICATION

This application claims the benefit of U.S. Provisional Application No. 63/108,225, filed Oct. 30, 2020, and U.S. Provisional Application No. 63/209,369, filed Jun. 10, 2021, which application is incorporated herein by reference.

BACKGROUND OF THE INVENTION

A person in an emergency situation may request help using a mobile communication device such as a cell phone to dial a designated emergency number like 9-1-1 or a direct access phone number for the local emergency service provider (e.g., an emergency dispatch center). This call is assigned to one or more first responders by the emergency service provider. Modern communication devices are capable of generating highly accurate locations (e.g., device-based hybrid locations) during emergency situations (e.g., in response to an emergency number being dialed) and transmitting the locations to emergency management systems and emergency service providers. Emergency service providers can then use these accurate locations to more quickly locate and dispatch emergency assistance to emergency callers. However, these accurate locations generated by modern communication devices can also be used by a variety of smart systems and devices to alternative modes of providing emergency assistance to persons in emergency situations.

SUMMARY OF THE INVENTION

One advantage provided by the systems, servers, devices, methods, and media of the instant application is an emergency response application that can be used by emergency service providers (ESPs; such as public safety answering points (PSAPs)) to receive and visualize emergency data from electronic devices involved in emergency or potential emergency situations. Furthermore, the emergency response application can be used by an ESP to facilitate enhanced communications between the ESP and an electronic device or between the ESP and another ESP.

In one aspect, disclosed herein is a method comprising: a) receiving an emergency alert comprising an emergency location within a first geofence associated with a first ESP; b) transmitting the emergency alert to the first ESP; c) displaying the emergency alert within a first instance of an emergency response application accessed by the first ESP; d) receiving selection of an option to transfer the emergency alert to a second ESP from within the first instance of the emergency response application; e) transmitting the emergency alert to the second ESP; and f) displaying the emergency alert within a second instance of the emergency response application accessed by the second ESP. In some embodiments, the first ESP is a public safety answering point (PSAP). In some embodiments, the first and second ESPs are both primary agencies. In some embodiments, the first ESP is a primary agency and the second ESP is a secondary agency. In some embodiments, the secondary agency is one of a police, fire, or emergency medical services. In some embodiments, the second ESP is associated with a second geofence and wherein the second geofence shares a border with the first geofence associated with the first ESP. In some embodiments, the second ESP is within a predetermined distance threshold of the first ESP. In another aspect, disclosed herein is a system comprising: a processor; and instructions that, when executed by the processor, causes the processor to perform steps of the method.

In another aspect, disclosed herein is a method comprising: a) establishing a plurality of communication links with a plurality of emergency service providers (ESPs), wherein each communication link is established through an emergency response application; b) providing a text-based communication interface within a graphical user interface (GUI) of the emergency response application for relaying messages between two or more ESPs from the plurality of ESPs; c) receiving, from within the GUI of a first instance of the emergency response application accessed by a first ESP from the plurality of ESPs, a selection of a second ESP from the plurality of ESPs; d) receiving a message through the text-based communication interface of the first instance of the emergency response application; e) transmitting the message to the second ESP; and f) displaying the message within the text-based communication interface of a second instance of the emergency response application accessed by the second ESP. In some embodiments, the GUI of the first instance of the emergency response application comprises a list of incidents and wherein an incident from the list of incidents must be selected to be associated with the message transmitted to the second ESP. In some embodiments, the method further comprises: a) receiving a selection of an incident from the list of incidents; b) determining one or more ESPs from the plurality of ESPs as appropriate to receive a message associated with the incident; c) presenting a list of appropriate ESPs within the text-based communication interface; and d) receiving selection of the second ESP from the list of appropriate ESPs. In some embodiments, determining the one or more ESPs from the plurality of ESPs as appropriate to receive a message associated with the incident comprises calculating a distance between a location associated with the incident and a plurality of geofences associated with the plurality of ESPs. In some embodiments, determining the one or more ESPs from the plurality of ESPs as appropriate to receive a message associated with the incident comprises determining an emergency type associated with the incident. In some embodiments, the second ESP is selected from a list of ESPs presented within the GUI of the emergency response application and wherein the list of ESPs prioritizes ESPs with which the first ESP is linked. In some embodiments, the second ESP is selected from a list of ESPs presented within the GUI of the emergency response application and wherein the list of ESPs prioritizes ESPs that have recently received messages from the first ESP. In some embodiments, the second ESP is selected from a list of ESPs presented within the GUI of the emergency response application and wherein the list of ESPs prioritizes ESPs closest to the first ESP. In some embodiments, the method further comprises: a) receiving, from within the GUI of the first instance of the emergency response application accessed by the first ESP, a selection of a third ESP from the plurality of ESPs; and b) simultaneously transmitting the message to the second and third ESPs. In some embodiments, the method further comprises facilitating a group conversation between the first, second, and third ESPs through the text-based communication interface. In some embodiments, the message is displayed within text-based communication interfaces of multiple instances of the emergency response application accessed by the second ESP. In some embodiments, the method further comprises: a) receiving a selection of a user associated with the second ESP; and b) displaying the message within the text-based communication interface of a second instance of the emergency response application associated with the user associated with the second ESP. In another aspect, disclosed herein is a system comprising: a processor; and instructions that, when executed by the processor, causes the processor to perform steps of the method.

In another aspect, disclosed herein is a method comprising: a) receiving an emergency alert generated in response to an emergency call executed by an electronic device, the emergency alert comprising an emergency location and a phone number associated with the electronic device; b) determining an appropriate ESP to receive the emergency alert based on the emergency location; c) providing an emergency response application to the ESP, wherein a graphical user interface (GUI) of the emergency response application comprises a list of incidents corresponding to respective emergency alerts; d) displaying the phone number associated with the electronic device as an incident within the list of incidents; e) receiving selection of the incident from the list of incidents within the GUI of the emergency response application; and f) facilitating a communication session between the ESP and the electronic device. In some embodiments, the method further comprises: a) presenting an option to contact a user associated with the emergency alert within the GUI of the emergency response application; and b) facilitating the communication session between the ESP and the electronic device in response to receiving selection of the option to contact the user associated with the emergency alert. In some embodiments, the communication is a two-way text-based communication session. In some embodiments, the method further comprises providing a text-based communication interface within the GUI of the emergency response application and facilitating the two-way text-based communication session through the text-based communication interface. In some embodiments, the communication is a voice-based communication session. In some embodiments, the voice-based communication session is a voice over interne protocol (VoIP) call. In some embodiments, the method further comprises: a) determining that the emergency call failed to connect or disconnected prematurely; and b) in response to determining that the emergency call failed to connect or disconnected prematurely, displaying a failure indication on the incident within the list of incidents. In some embodiments, the method further comprises prompting the emergency response application to generate an audible notification associated with the failure indication. In some embodiments, determining that the emergency call failed to connect or disconnected prematurely comprises receiving updated information associated with the emergency alert. In another aspect, disclosed herein is a system comprising: a processor; and instructions that, when executed by the processor, causes the processor to perform steps of the method.

In another aspect, disclosed herein is a method comprising: a) providing an emergency response application to an emergency service provider (ESP), wherein a graphical user interface (GUI) of the emergency response application comprises a list of incidents and an interactive map; b) populating the list of incidents with a plurality of incidents and the interactive map with a plurality of incident locations associated with the respective plurality of incidents, wherein each incident within the plurality of incident is associated with an emergency location and a user identifier; c) receiving selection of a subset of incidents from the plurality of incidents; d) providing a text-based communication interface within the GUI of the emergency response application; e) receiving a message through the text-based communication interface; and f) transmitting the message to each user identifier associated with the subset of incidents. In some embodiments, the subset of incidents is selected from the list of incidents. In some embodiments, receiving the selection of the subset of incidents comprises: a) receiving definition of a geospatial boundary within the interactive map; and b) determining which of the incident locations is within the geospatial boundary. In some embodiments, the definition of the geospatial boundary is a free form shape. In some embodiments, the definition of the geospatial boundary is a geometric shape. In some embodiments, the user identifier is a phone number or an email address. In some embodiments, the method further comprises, in response to receiving the selection of the subset of incidents, marking the incident locations associated with the subset of incidents as marked within the interactive map. In some embodiments, the method further comprises, in response to receiving the selection of the subset of incidents, marking the incidents within the subset of incidents as marked within the list of incidents. In some embodiments, the message is selected from a group of pre-composed messages provided by the emergency response application. In some embodiments, the group of pre-composed messages comprises stock messages provided by the emergency response application. In some embodiments, the group of pre-composed messages comprises custom messages written by a user of the emergency response application. In some embodiments, populating the list of incidents with the plurality of incidents and the interactive map with the plurality of incident locations associated with the respective plurality of incidents comprises: a) receiving a respective plurality of emergency alerts, wherein each emergency alert within the plurality of emergency alerts comprises an emergency location and a user identifier; b) automatically retrieving a geofence associated with the ESP; c) determining that the emergency location of each emergency alert is within the geofence associated with the ESP; and d) displaying the user identifier of each emergency alert as an incident within the list of incidents and the emergency location of each emergency alert as an incident location within the interactive map. In some embodiments, transmitting the message to a user identifier comprises transmitting the message to a device associated with the user identifier. In another aspect, disclosed herein is a system comprising: a processor; and instructions that, when executed by the processor, causes the processor to perform steps of the method.

In another aspect, disclosed herein is a method comprising: a) providing an emergency response application to an emergency service provider (ESP), wherein a graphical user interface (GUI) of the emergency response application comprises a list of incidents and an interactive map; b) receiving definition of a geospatial boundary for an alert area within the interactive map; c) providing a text-based communication interface within the GUI of the emergency response application; d) receiving a message through the text-based communication interface; e) receiving an emergency alert generated by an electronic device, the emergency alert comprising an emergency location and a user identifier; f) displaying the user identifier as incident within the list of incidents and the emergency location was an incident location within the interactive map; g) determining if the incident location is within the alert area; and h) in response to determining that the incident is within the alert area, transmitting the message to the user identifier. In some embodiments, transmitting the message to the user identifier comprises transmitting the message to a device associated with the user identifier. In some embodiments, the device associated with the user identifier is the electronic device that generated the emergency alert. In some embodiments, the method further comprises receiving a duration for the alert area. In some embodiments, the message is selected from a group of pre-composed messages provided by the emergency response application. In some embodiments, the group of pre-composed messages comprises stock messages provided by the emergency response application. In some embodiments, the group of pre-composed messages comprises custom messages written by a user of the emergency response application. In some embodiments, the definition of the geospatial boundary is a free form shape. In some embodiments, the definition of the geospatial boundary is a geometric shape. In some embodiments, the user identifier is a phone number or an email address. In another aspect, disclosed herein is a system comprising: a processor; and instructions that, when executed by the processor, causes the processor to perform steps of the method.

Disclosed herein, in some aspects, is a method comprising: receiving an emergency alert comprising an emergency location within a first geofence associated with a first ESP; transmitting the emergency alert to the first ESP; displaying the emergency alert within a first instance of an emergency response application accessed by the first ESP; receiving a selection of an option to transfer the emergency alert to a second ESP from within the first instance of the emergency response application; transmitting the emergency alert to the second ESP when the option to transfer is selected; and displaying the emergency alert within a second instance of the emergency response application accessed by the second ESP. In some embodiments, the second ESP is limited to a list of pre-approved ESPs. In some embodiments, the second ESP is determined to be online for transferring the emergency alert. In some embodiments, the second ESP based on rules of transferring. In some embodiments, the option to transfer expires if a transfer is not accepted within a specific time window. In some embodiments, the option to transfer expires within 5 to 60 seconds. In some embodiments, the method further comprises transferring an emergency call from the first ESP to the second ESP. In some embodiments, the first ESP is a public safety answering point (PSAP). In some embodiments, the first and second ESPs are both primary agencies. In some embodiments, the first ESP is a primary agency and the second ESP is a non-primary agency. In some embodiments, the secondary agency is one of police, fire, or emergency medical services. In some embodiments, the second ESP is associated with a second geofence and wherein the second geofence shares a border with the first geofence associated with the first ESP. In some embodiments, the second ESP is within a predetermined distance threshold of the first ESP. In some embodiments, the emergency data associated with the emergency alert is sent to additional ESPs. In some embodiments, the emergency data associated with the emergency alert is a link to a multimedia file. In some embodiments, the method further comprises determining that the second ESP is appropriate, "available" and authorized to receive the emergency data associated with the emergency alert. In some embodiments, determining the one or more ESPs from the plurality of ESPs as appropriate to receive a message associated with the incident comprises calculating a distance between a location associated with the incident and a plurality of geofences associated with the plurality of ESPs. In some embodiments, determining the one or more ESPs from the plurality of ESPs as appropriate to receive a message associated with the incident comprises determining an emergency type associated with the incident. In some embodiments, the transfer of the emergency alert creates a new incident in CAD at the second ESP. In some embodiments, the emergency alert is a first incident in a first CAD at the first ESP, and the first incident is converted into the format of a second CAD and displayed at the second CAD in the second ESP.

In some aspects, disclosed herein is a method comprising: establishing a plurality of communication links with a plurality of emergency service providers (ESPs), wherein each communication link is established through an emergency response application; providing a text-based communication interface within a graphical user interface (GUI) of the emergency response application for relaying messages between two or more ESPs from the plurality of ESPs; receiving, from within the GUI of a first instance of the emergency response application accessed by a first ESP from the plurality of ESPs, a selection of a second ESP from the plurality of ESPs; receiving a message through the text-based communication interface of the first instance of the emergency response application; transmitting the message to the second ESP; and displaying the message within the text-based communication interface of a second instance of the emergency response application accessed by the second ESP. In some embodiments, the text-based communication is a two-way communication session. In some embodiments, the second ESP is limited to a list of pre-approved ESPs. In some embodiments, the method further comprises transmitting the message to a list of pre-approved ESPs. In some embodiments, the second ESP is determined to be online for transferring the emergency alert. In some embodiments, the second ESP is an agency that shares a boundary with the first ESP. In some embodiments, a list of second ESPs is limited to not more than five. In some embodiments, the first ESP broadcasts the emergency alert to two or more ESPs simultaneously. In some embodiments, the GUI of the first instance of the emergency response application comprises a list of incidents and wherein an incident from the list of incidents must be selected to be associated with the message transmitted to the second ESP. In some embodiments, the method further comprises: receiving a selection of an incident from the list of incidents; determining one or more ESPs from the plurality of ESPs as appropriate and available to receive a message associated with the incident; presenting a list of appropriate ESPs within the text-based communication interface; and receiving selection of the second ESP from the list of appropriate ESPs. In some embodiments, determining the one or more ESPs from the plurality of ESPs as appropriate to receive a message associated with the incident comprises calculating a distance between a location associated with the incident and a plurality of geofences associated with the plurality of ESPs. In some embodiments, determining the one or more ESPs from the plurality of ESPs as appropriate to receive a message associated with the incident comprises determining an emergency type associated with the incident. In some embodiments, the method further comprises determining that one or more ESPs are appropriate, available, and authorized to receive the emergency data associated with the emergency alert. In some embodiments, the second ESP is selected from a list of ESPs presented within the GUI of the emergency response application and wherein the list of ESPs prioritizes ESPs with which the first ESP is linked. In some embodiments, the second ESP is selected from a list of ESPs presented within the GUI of the emergency response application and wherein the list of ESPs prioritizes ESPs that have recently received messages from the first ESP. In some embodiments, the second ESP is selected from a list of ESPs presented within the GUI of the emergency response application and wherein the list of ESPs prioritizes ESPs closest to the first ESP. In some embodiments, the method further comprises: receiving, from within the GUI of the first instance of the emergency response application accessed by the first ESP, a selection of a third ESP from the plurality of ESPs; and simultaneously transmitting the message to the second ESP and the third ESP. In some embodiments, the method further comprises facilitating a group conversation between the first, second, and third ESPs through the text-based communication interface. In some embodiments, the message is displayed within text-based communication interfaces of multiple instances of the emergency response application accessed by the second ESP. In some embodiments, the method further comprises: receiving a selection of a user associated with the second ESP; and displaying the message within the text-based communication interface of a second instance of the emergency response application associated with the user associated with the second ESP.

In some aspects, disclosed herein is a method comprising: establishing a plurality of communication links with a plurality of emergency service providers (ESPs), wherein each communication link is established through an emergency response application; receiving, from within a GUI of a first instance of the emergency response application accessed by a first ESP from the plurality of ESPs, a selection of an emergency from a list of emergencies, wherein the emergency is associated with emergency data comprising an emergency location; receiving, from within the GUI of the first instance of the emergency response application accessed by the first ESP, a selection of a second ESP from the plurality of ESPs; transmitting the emergency data comprising the emergency location to the second ESP, wherein the emergency location is outside the jurisdictional boundary of the second ESP; and displaying the emergency within an interactive map accessed by the second ESP. In some embodiments, the emergency data comprises displaying a type of the emergency. In some embodiments, the emergency location is displayed at a second instance of the emergency response application. In some embodiments, the emergency location is displayed as a new CAD incident within a CAD interface station accessed by the second ESP. In some embodiments, the emergency location is displayed via a web-link accessed by the second ESP.

In some aspects, disclosed herein is a method comprising: establishing a plurality of communication links with a plurality of emergency service providers (ESPs), wherein each communication link is established through an emergency response application; receiving, from within a GUI of a first instance of the emergency response application accessed by a first ESP from the plurality of ESPs, a selection of an emergency from a list of emergencies, wherein the emergency is associated with emergency data comprising an emergency location; receiving, from within the GUI of the first instance of the emergency response application accessed by the first ESP, a selection of a second ESP from the plurality of ESPs; transmitting the emergency data comprising the emergency location to the second ESP; and displaying the emergency within an interactive map accessed by the second ESP. In some embodiments, the second ESP is selected based on rules of delegation based on type of emergency.

In some aspects, disclosed herein is a method comprising: receiving an emergency alert generated in response to an emergency call executed by an electronic device, the emergency alert comprising an emergency location and a phone number associated with the electronic device; determining an appropriate ESP to receive the emergency alert based on the emergency location; providing an emergency response application to the ESP, wherein a graphical user interface (GUI) of the emergency response application comprises a list of incidents corresponding to respective emergency alerts; displaying the phone number associated with the electronic device as an incident within the list of incidents; receiving selection of the incident from the list of incidents within the GUI of the emergency response application; and facilitating a communication session between the ESP and the electronic device. In some embodiments, the method further comprises: presenting an option to contact a user associated with the emergency alert within the GUI of the emergency response application; and facilitating the communication session between the ESP and the electronic device in response to receiving selection of the option to contact the user associated with the emergency alert. In some embodiments, the communication is a two-way text-based communication session. In some embodiments, the communication is a voice-based communication session. In some embodiments, the voice-based communication session is a voice over internet protocol (VoIP) call. In some embodiments, the method further comprises: determining that the emergency call failed to connect or disconnected prematurely; and in response to determining that the emergency call failed to connect or disconnected prematurely, displaying a failure indication on the incident within the list of incidents. In some embodiments, the method further comprises prompting the emergency response application to generate an audible notification associated with the failure indication. In some embodiments, determining that the emergency call failed to connect or disconnected prematurely comprises receiving updated information associated with the emergency alert.

In some aspects, disclosed herein is a method comprising: providing an emergency response application to an emergency service provider (ESP), wherein a graphical user interface (GUI) of the emergency response application comprises a list of incidents and an interactive map; populating the list of incidents with a plurality of incidents and the interactive map with a plurality of incident locations associated with the respective plurality of incidents, wherein each incident within the plurality of incident is associated with an emergency location and a user identifier; receiving selection of a subset of incidents from the plurality of incidents; providing a text-based communication interface within the GUI of the emergency response application; receiving a message through the text-based communication interface; and transmitting the message to each user identifier associated with the subset of incidents. In some embodiments, the subset of incidents is selected from the list of incidents. In some embodiments, receiving the selection of the subset of incidents comprises: receiving definition of a geospatial boundary within the interactive map; and determining which of the incident locations is within the geospatial boundary. In some embodiments, the definition of the geospatial boundary is a free form shape. In some embodiments, the definition of the geospatial boundary is a geometric shape. In some embodiments, the method further comprises: in response to receiving the selection of the subset of incidents, marking the incident locations associated with the subset of incidents as marked within the interactive map. In some embodiments, the method further comprises: in response to receiving the selection of the subset of incidents, marking the incidents within the subset of incidents as marked within the list of incidents. In some embodiments, the message is selected from a group of pre-composed messages provided by the emergency response application. In some embodiments, the group of pre-composed messages comprises stock messages provided by the emergency response application. In some embodiments, the group of pre-composed messages comprises custom messages written by a user of the emergency response application. In some embodiments, populating the list of incidents with the plurality of incidents and the interactive map with the plurality of incident locations associated with the respective plurality of incidents comprises: receiving a respective plurality of emergency alerts, wherein each emergency alert within the plurality of emergency alerts comprises an emergency location and a user identifier; automatically retrieving a geofence associated with the ESP; determining that the emergency location of each emergency alert is within the geofence associated with the ESP; and displaying the user identifier of each emergency alert as an incident within the list of incidents and the emergency location of each emergency alert as an incident location within the interactive map. In some embodiments, the method comprises transmitting the message to a user identifier comprises transmitting the message to a device associated with the user identifier.

In some aspects, disclosed herein is a method comprising: providing an emergency response application to an emergency service provider (ESP), wherein a graphical user interface (GUI) of the emergency response application comprises a list of incidents and an interactive map; receiving definition of a geospatial boundary for an alert area within the interactive map; providing a text-based communication interface within the GUI of the emergency response application; receiving a message through the text-based communication interface; receiving an emergency alert generated by an electronic device, the emergency alert comprising an emergency location and a user identifier; displaying the user identifier as incident within the list of incidents and the emergency location was an incident location within the interactive map; determining if the incident location is within the alert area; and in response to determining that the incident is within the alert area, transmitting the message to the user identifier. In some embodiments, transmitting the message to the user identifier comprises transmitting the message to a device associated with the user identifier. In some embodiments, the device associated with the user identifier is the electronic device that generated the emergency alert. In some embodiments, the method further comprises receiving a duration for the alert area. In some embodiments, the message is selected from a group of pre-composed messages provided by the emergency response application. In some embodiments, the definition of the geospatial boundary is a free form shape. In some embodiments, the definition of the geospatial boundary is a geometric shape.

In some aspects, disclosed herein is a method for providing emergency response assistance by an emergency management system (EMS), the method comprising: receiving definition of a beat area through a graphical user interface (GUI) of an emergency response application accessed by an emergency service provider (ESP), wherein the beat area is a subsection of a geofence associated with the ESP; receiving a first emergency alert associated with a first emergency location; determining that the first emergency location is within the geofence associated with the ESP and within the beat area; displaying the first emergency location within an interactive map provided by the GUI of the emergency response application; receiving a second emergency alert associated with a second emergency location; determining that the second emergency location is within the geofence associated with the ESP and outside of the beat area; and forgoing displaying the second emergency location within the interactive map provided by the GUI of the emergency response application. In some embodiments, the beat area is defined through the interactive map provided by the GUI of the emergency response application. In some embodiments, the beat area expires after a predetermined amount of time. In some embodiments, both the first and second emergency alerts are transmitted to the ESP in response to determining that the both the first and second emergency locations are within the geofence associated with the ESP. In some embodiments, the first emergency alert is associated with a first user identifier and the second emergency alert is associated with a second user identifier; wherein the GUI of the emergency response application comprises a list of incidents; and the method further comprises displaying the first user identifier as a first incident within the list of incidents and forgoing displaying the second user identifier as a second incident within the list of incidents. In some embodiments, the list of incident displays a plurality of incidents associated with a respective plurality of emergency alerts, wherein each emergency alert within the plurality of emergency alerts is associated with a respective emergency location that is within both the geofence associated with the ESP and the beat area. In some embodiments, the beat area is displayed within the interactive map provided by the GUI of the emergency response application along with the first emergency location. In some embodiments, the geofence associated with the ESP is displayed within the interactive map provided by the GUI of the emergency response application along with the beat area and the first emergency location. In some embodiments, the method further comprises displaying a plurality of emergency locations associated with a respective plurality of emergency alerts within the interactive map provided by the GUI of the emergency response location simultaneously, wherein each emergency location within the plurality of emergency locations is within both the geofence associated with the ESP and the beat area. In some embodiments, the beat area is defined as a freeform shape or polygon.

In some aspects, disclosed herein is a method for applying a tactical geofence by an emergency management system (EMS), the method comprising: receiving a tactical geofence request from a first emergency service provider (ESP) previously associated with a first geofence, wherein the tactical geofence request defines a second geofence different from the first geofence; associating the first ESP with the second geofence for a temporary period; identifying emergency data associated with a first location during the temporary period; determining that the first location associated with the emergency data is within the second geofence; in response to identifying the emergency data associated with the first location during the temporary period and determining that the first location is within the second geofence, transmitting the emergency data to the first ESP; and displaying the emergency data within a graphical user interface (GUI) of an emergency response application accessed by the first ESP. In some embodiments, the tactical geofencing request comprises a proposed duration corresponding to the temporary period. In some embodiments, the temporary period corresponds to a default duration for the tactical geofencing request. In some embodiments, the default duration for the tactical geofencing request is 24 hours. In some embodiments, the second geofence is defined by the first ESP within the GUI of the emergency response application. In some embodiments, the second geofence is a freeform shape or polygon drawn within an interactive map within the GUI of the emergency response application. In some embodiments, the second geofence partially or fully comprises a geofence associated with a second ESP. In some embodiments, the two or more geofences are selected within an interactive map within the GUI of the emergency response application. In some embodiments, identifying the emergency data associated with the first location during the temporary period comprises receiving an emergency alert comprising the first location during the temporary period. In some embodiments, the emergency alert additionally comprises the emergency data associated with the first location. In some embodiments, identifying the emergency data associated with the first location during the temporary period comprises identifying an emergency response asset having an asset location within the second geofence. In some embodiments, the GUI of the emergency response application accessed by the first ESP provides an option for viewing information within the second geofence separately from information within the first geofence. In some embodiments, the tactical geofence request must be approved by the emergency management system (EMS). In some embodiments, the tactical geofence comprises a proposed duration corresponding to the temporary period and wherein the EMS automatically approves the tactical geofence request if the proposed duration is less than a threshold amount of time. In some embodiments, the second geofence partially or fully comprises a geofence associated with a second ESP and wherein the tactical geofence request must be approved by the second ESP. In some embodiments, the first geofence represents only the first ESP's authoritative jurisdiction and wherein the second geofence at least partially represents regions outside of the first ESP's authoritative jurisdiction.

In some aspects, disclosed herein is a method for applying a tactical geofence by an emergency management system (EMS), the method comprising: receiving a tactical geofence request from a first emergency service provider (ESP) previously associated with a first geofence, wherein the tactical geofence request comprises a second geofence associated with a second ESP; associating the first ESP with the second geofence for a temporary period; identifying emergency data associated with a first location during the temporary period; determining that the first location associated with the emergency data is within the second geofence; in response to identifying the emergency data associated with the first location during the temporary period and determining that the first location is within the second geofence, transmitting the emergency data to the first ESP; and displaying the emergency data within a graphical user interface (GUI) of an emergency response application accessed by the first ESP. In some embodiments, the method further comprises receiving approval of the tactical geofence request from the second ESP. In some embodiments, receiving approval of the tactical geofence request from the second ESP comprises: transmitting a notification of the tactical geofence request to the second ESP; receiving the approval of the tactical geofence request from the second ESP in response to the notification of the tactical geofence request. In some embodiments, the method further comprises presenting the notification of the tactical geofence request within a GUI of a second instance of the emergency response application accessed by the second ESP and wherein the approval of the tactical geofence request is provided through the GUI of the second instance of the emergency response application accessed by the second ESP.

In another aspect, disclosed herein is a computer-implemented method for sharing emergency data within a network of emergency network entities corresponding to a plurality of emergency service providers (ESPs), the method comprising: providing an emergency response application to the network of emergency network entities corresponding to the plurality of emergency service providers, including a first instance of the emergency response application to a first emergency network entity at a first ESP and a second instance of the emergency response application to a second emergency network entity at a second ESP, wherein the emergency response application comprises a graphical user interface (GUI) configured to display a list of one or more incidents and an interactive map; receiving, through the GUI of the first instance of the emergency response application at the first emergency network entity, a selection of an option to share a first incident from within the list of one or more incidents; displaying, within the GUI of the first instance of the emergency response application at the first emergency network entity, an ESP list comprising one or more ESPs available for sharing the first incident with, wherein the ESP list comprises the second ESP; receiving, through the GUI of the first instance of the emergency response application at the first emergency network entity, a selection of the second ESP from the ESP list; transmitting emergency data associated with the first incident to the second emergency network entity at the second ESP through the second instance of the emergency response application, wherein the emergency data associated with the first incident comprises a user identifier and an emergency location; and displaying, within the GUI of the second instance of the emergency response application at the second emergency network entity, the user identifier as a second incident within the incident list and the emergency location as an incident location within the interactive map. In some embodiments, the ESP list further comprises one or more ESPs not available for sharing the incident with and wherein the ESPs available for sharing the incident with are marked with an available icon. In some embodiments, the second ESP is shown within the ESP list only if a user associated with the second ESP is logged into the second instance of the emergency response application. In some embodiments, the ESP list further comprises a list of pre-approved ESPs for the first ESP to share incidents with and wherein the second ESP is a pre-approved ESP for receiving shared incidents from the first ESP. In some embodiments, the method further comprises receiving a selection of the second incident from within the GUI of the second instance of the emergency response application and, in response to receiving the selection of the second incident, notifying the first ESP of receipt of the second incident by the second ESP. In some embodiments, notifying the first ESP of the receipt of the second incident by the second ESP comprises displaying a share icon on the first incident within the list of incidents of the first instance of the emergency response application. In some embodiments, the method further comprises determining that the second incident is not selected from within the list of incidents of the second instance of the emergency response application within a threshold period of time and, in response, notifying the first ESP of a failed receipt of the second incident by the second ESP. In some embodiments, notifying first ESP of the failed receipt of the second incident by the second ESP comprises displaying a failed share icon on the first incident within the list of incidents or a failed share banner within the GUI of the first instance of the emergency response application. In some embodiments, the method further comprises displaying the emergency location as a second incident location within the interactive map of the first instance of the emergency response application and wherein notifying the first ESP of the failed receipt of the second incident by the second ESP comprises displaying a failed share icon on the second incident location. In some embodiments, the method further comprises receiving a selection of the second incident from within the second instance of the emergency response application and, in response, initiating a two-way, text-based communication session between the first and second instances of the emergency response application. In some embodiments, the method further comprises: providing a third instance of the emergency response application to the first or second ESP; receiving a selection of a third incident associated with the user identifier from within the third instance of the emergency response application; and facilitating a three-way, text-based communication session between the first, second, and third instances of the emergency response application. In some embodiments, the method further comprises: providing a third instance of the emergency response application to a third emergency network entity at a third ESP; receiving, through the GUI of the first instance of the emergency response application, a selection of an option to share the first incident with the third ESP; transmitting the emergency data associated with the first incident to the third emergency network entity at the third ESP through the third instance of the emergency response application; displaying, within the GUI of the third instance of the emergency response application, the user identifier as a third incident within the list of incidents; receiving a selection of the third incident from within the third instance of the emergency response application; and facilitating a three-way, text-based communication session between the first, second, and third instances of the emergency response application. In some embodiments, the both the first and second ESPs are public safety answering points (PSAPs). In some embodiments, the first ESP is a primary emergency response agency and the second ESP is a non-primary emergency response agency. In some embodiments, the non-primary emergency response agency is one of a police department, a fire department, and emergency medical services. In some embodiments, the method further comprises providing a jurisdictional awareness view to the primary emergency response agency and not providing a jurisdictional awareness view to the non-primary emergency response agency. In some embodiments, primary emergency response agencies are permitted to share incidents via the emergency response application and non-primary emergency response agencies are not permitted to share incidents via the emergency response application. In some embodiments, the first ESP is associated with a first geofence and wherein the second ESP is associated with a second geofence that shares a border with the first geofence.

In another aspect, disclosed herein is an emergency management system (ESM) for sharing emergency data within a network of emergency network entities corresponding to a plurality of emergency service providers (ESPs), the system comprising: (a) a network communication element communicatively coupled to the network of emergency network entities; and (b) a processor and non-transitory computer readable storage medium containing instructions that, when executed by the processor, cause the processor to: provide an emergency response application to the network of emergency network entities corresponding to the plurality of emergency service providers, including a first instance of an emergency response application to a first emergency network entity at a first ESP from the plurality of ESPs and a second instance of the emergency response application to a second emergency network entity at to a second ESP from the plurality of ESPs, wherein the emergency response application comprises a graphical user interface (GUI) configured to display a list of one or more incidents and an interactive map; receive, through the GUI of the first instance of the emergency response application at the first emergency network entity, a selection of an option to share a first incident from within the list of incidents; display, within the GUI of the first instance of the emergency response application at the first emergency network entity, an ESP list comprising ESPs available for sharing the incident with, wherein the ESP list comprises the second ESP; receive, through the GUI of the first instance of the emergency response application at the second emergency network entity, a selection of the second ESP from the ESP list; transmit emergency data associated with the first incident to the second ESP through the second instance of the emergency response application at the second emergency network entity, wherein the emergency data associated with the first incident comprises a user identifier and an emergency location; and display, within the GUI of the second instance of the emergency response application at the second emergency network entity, the user identifier as a second incident within the list of incidents and the emergency location as an incident location within the interactive map. In some embodiments, the ESP list further comprises one or more ESPs not available for sharing the incident with and wherein the ESPs available for sharing the incident with are marked with an available icon. In some embodiments, the second ESP is shown within the ESP list only if a user associated with the second ESP is logged into the second instance of the emergency response application. In some embodiments, the ESP list further comprises a list of pre-approved ESPs for the first ESP to share incidents with and wherein the second ESP is a pre-approved ESP for receiving shared incidents from the first ESP. In some embodiments, the processor is further caused to receive a selection of the second incident from within the GUI of the second instance of the emergency response application and, in response to the selection of the second incident, notify the first ESP of receipt of the second incident by the second ESP. In some embodiments, notify the first ESP of the receipt of the second incident by the second ESP comprises display a share icon on the first incident within the list of incidents of the first instance of the emergency response application. In some embodiments, the processor is further caused to determine that the second incident is not selected from within the list of incidents of the second instance of the emergency response application within a threshold period of time and, in response, notify the first ESP of a failed receipt of the second incident by the second ESP. In some embodiments, notify the first ESP of the failed receipt of the second incident by the second ESP comprises display a failed share icon on the first incident within the list of incidents or a failed share banner within the GUI of the first instance of the emergency response application. In some embodiments, the processor is further caused to display the emergency location as a second incident location within the interactive map of the first instance of the emergency response application and wherein notify the first ESP of the failed receipt of the second incident by the second ESP comprises display a failed share icon on the second incident location. In some embodiments, the processor is further caused to receive a selection of the second incident from within the second instance of the emergency response application and, in response, initiate a two-way, text-based communication session between the first and second instances of the emergency response application. In some embodiments, the processor is further caused to: provide a third instance of the emergency response application to the first or second ESP; receive a selection of a third incident associated with the user identifier from within the third instance of the emergency response application; and facilitate a three-way, text-based communication session between the first, second, and third instances of the emergency response application. In some embodiments, the processor is further caused to: provide a third instance of the emergency response application to a third emergency network entity at a third ESP; receive, through the GUI of the first instance of the emergency response application, a selection of an option to share the first incident with the third ESP; transmit the emergency data associated with the first incident to the third emergency network entity at the third ESP through the third instance of the emergency response application; display, within the GUI of the third instance of the emergency response application, the user identifier as a third incident within the list of incidents; receive a selection of the third incident from within the third instance of the emergency response application; and facilitate a three-way, text-based communication session between the first, second, and third instances of the emergency response application. In some embodiments, the both the first and second ESPs are public safety answering points (PSAPs). In some embodiments, the first ESP is a primary emergency response agency and the second ESP is a non-primary emergency response agency. In some embodiments, the non-primary emergency response agency is one of a police department, a fire department, and emergency medical services. In some embodiments, the processor is further caused to provide a jurisdictional awareness view to the primary emergency response agency and not providing a jurisdictional awareness view to the non-primary emergency response agency. In some embodiments, primary emergency response agencies are permitted to share incidents via the emergency response application and non-primary emergency response agencies are not permitted to share incidents via the emergency response application. In some embodiments, the first ESP is associated with a first geofence and wherein the second ESP is associated with a second geofence that shares a border with the first geofence.

In another aspect, disclosed herein is non-transitory computer readable storage medium containing instructions that, when executed by a processor, cause the processor to: provide an emergency response application to a network of emergency network entities corresponding to a plurality of emergency service providers, including a first instance of an emergency response application to a first emergency network entity at a first ESP from the plurality of ESPs and a second instance of the emergency response application to a second emergency network entity at to a second ESP from the plurality of ESPs, wherein the emergency response application comprises a graphical user interface (GUI) configured to display a list of one or more incidents and an interactive map; receive, through the GUI of the first instance of the emergency response application at the first emergency network entity, a selection of an option to share a first incident from within the list of incidents; display, within the GUI of the first instance of the emergency response application at the first emergency network entity, an ESP list comprising ESPs available for sharing the incident with, wherein the ESP list comprises the second ESP; receive, through the GUI of the first instance of the emergency response application at the second emergency network entity, a selection of the second ESP from the ESP list; transmit emergency data associated with the first incident to the second ESP through the second instance of the emergency response application at the second emergency network entity, wherein the emergency data associated with the first incident comprises a user identifier and an emergency location; and display, within the GUI of the second instance of the emergency response application at the second emergency network entity, the user identifier as a second incident within the list of incidents and the emergency location as an incident location within the interactive map.

In another aspect, disclosed herein is a computer-implemented method for sharing emergency data within a network of emergency network entities corresponding to a plurality of emergency service providers (ESPs), the method comprising: providing an emergency response application to the network of emergency network entities corresponding to the plurality of emergency service providers, including a first instance of the emergency response application to a first emergency network entity at a first ESP and a second instance of the emergency response application to a second emergency network entity at a second ESP, wherein the emergency response application comprises a graphical user interface (GUI) configured to display a list of one or more incidents and an interactive map; receiving an emergency alert generated by an electronic device in response to the initiation of an emergency communication on the electronic device, wherein the emergency alert comprises a location of the electronic device; determining that the location of the electronic device is within a geofence associated with the first ESP; in response to determining that the emergency location is within a geofence associated with the first ESP, autonomously transmitting the emergency alert to the first emergency network entity at the first ESP through the first instance of the emergency response application; displaying, within the GUI of the first instance of the emergency response application at the first emergency network entity, the emergency alert as a first incident within the list of one or more incidents and the emergency location as a first incident location within the interactive map; receiving, through the GUI of the first instance of the emergency response application at the first emergency network entity, a selection of an option to share the first incident with the second ESP; transmitting the emergency alert to the second ESP through the second instance of the emergency response application at the second emergency network entity at the second ESP; and displaying, within the GUI of the second instance of the emergency response application at the second emergency network entity, the emergency alert as a second incident within the list of incidents and the emergency location as a second incident location within the interactive map.

In another aspect, disclosed herein is a emergency management system (ESM) for sharing emergency data within a network of emergency network entities corresponding to a plurality of emergency service providers (ESPs), the system comprising: (a) a network communication element communicatively coupled to the network of emergency network entities; and (b) a processor and non-transitory computer readable storage medium containing instructions that, when executed by the processor, cause the processor to provide an emergency response application to the network of emergency network entities corresponding to the plurality of emergency service providers, including a first instance of the emergency response application to a first emergency network entity at a first ESP and a second instance of the emergency response application to a second emergency network entity at a second ESP, wherein the emergency response application comprises a graphical user interface (GUI) configured to display a list of one or more incidents and an interactive map; receive an emergency alert generated by an electronic device in response to the initiation of an emergency communication on the electronic device, wherein the emergency alert comprises a location of the electronic device; determine that the location of the electronic device is within a geofence associated with the first ESP; in response to determining that the emergency location is within a geofence associated with the first ESP, autonomously transmit the emergency alert to the first emergency network entity at the first ESP through the first instance of the emergency response application; display, within the GUI of the first instance of the emergency response application at the first emergency network entity, the emergency alert as a first incident within the list of one or more incidents and the emergency location as a first incident location within the interactive map; receive, through the GUI of the first instance of the emergency response application at the first emergency network entity, a selection of an option to share the first incident with the second ESP; transmit the emergency alert to the second ESP through the second instance of the emergency response application at the second emergency network entity at the second ESP; and display, within the GUI of the second instance of the emergency response application at the second emergency network entity, the emergency alert as a second incident within the list of incidents and the emergency location as a second incident location within the interactive map.

In another aspect, disclosed herein is a method for sharing emergency data between two or more emergency service providers (ESPs), the method comprising: providing a first instance of an emergency response application to a first ESP and a second instance of the emergency response application to a second ESP, wherein the emergency response application comprises a graphical user interface (GUI) comprising a list of incidents and an interactive map; receiving an emergency alert generated by an electronic device in response to the initiation of an emergency call on the electronic device, wherein the emergency alert comprises an emergency location that is within a geofence associated with the first ESP; in response to determining that the emergency location is within the geofence associated with the first ESP, autonomously transmitting the emergency alert to the first ESP through the first instance of the emergency response application; displaying, within the GUI of the first instance of the emergency response application, the emergency alert as a first incident within the list of incidents and the emergency location as a first incident location within the interactive map; receiving, through the GUI of the first instance of the emergency response application, a selection of an option to share the first incident with the second ESP; transmitting the emergency alert to the second ESP through the second instance of the emergency response application; and displaying, within the GUI of the second instance of the emergency response application, the emergency alert as a second incident within the list of incidents and the emergency location as a second incident location within the interactive map.

In another aspect, disclosed herein is a method for sharing emergency data between two or more emergency service providers (ESPs), the method comprising: providing a first instance of an emergency response application to a first ESP and a second instance of the emergency response application to a second ESP, wherein the emergency response application comprises a graphical user interface (GUI) comprising a list of incidents and an interactive map; receiving, through the GUI of the first instance of the emergency response application, a selection of an option to share a first incident from within the list of incidents; displaying, within the GUI of the first instance of the emergency response application, a list of ESPs available for sharing the incident with, wherein the list of ESPs comprises the second ESP; receiving a selection of the second ESP from the list of ESPs; transmitting emergency data associated with the first incident to the second ESP through the second instance of the emergency response application, wherein the emergency data associated with the first incident comprises a user identifier and an emergency location; and displaying, within the GUI of the second instance of the emergency response application, the user identifier as a second incident within the list of incidents and the emergency location as an incident location within the interactive map.

In another aspect, disclosed herein is a method for sharing emergency data between two or more emergency service providers (ESPs), the method comprising: providing a first instance of an emergency response application to a primary emergency response agency and a second instance of the emergency response application to a non-primary emergency response agency, wherein the emergency response application comprises a graphical user interface (GUI) comprising a list of incidents and an interactive map; providing a jurisdictional awareness view to the primary emergency response agency through the first instance of the emergency response application but not providing a jurisdictional awareness view to the non-primary emergency response agency through the second instance of the emergency response application; receiving, through the GUI of the first instance of the emergency response application, a selection of an option to share a first incident from within the list of incidents with the non-primary emergency response agency; transmitting emergency data associated with the first incident to the non-primary emergency response agency through the second instance of the emergency response application, wherein the emergency data associated with the first incident comprises a user identifier and an emergency location; and displaying, within the GUI of the second instance of the emergency response application, the user identifier as a second incident within the list of incidents and the emergency location as an incident location within the interactive map.

In another aspect, disclosed herein is a method for sharing information regarding an emergency between two or more emergency service providers (ESPs), the method comprising: receiving a data request from an emergency responder regarding the emergency, wherein the data request includes a device identifier; gathering for emergency data regarding the emergency using the device identifier; identifying a primary ESP for the emergency, wherein the emergency falls within the jurisdictional boundaries of the primary ESP; obtain an approval from the primary ESP to share the emergency data regarding the emergency, wherein the approval is provided electronically by a user at the primary ESP; and provide the emergency data regarding the emergency with the emergency responder, wherein the emergency data comprises location and additional information about the emergency.

In another aspect, disclosed herein is a method for sharing emergency data between two or more emergency service providers (ESPs), the method comprising: providing a first instance of an emergency response application to a first ESP and a second instance of the emergency response application to a second ESP, wherein the emergency response application comprises a graphical user interface (GUI) comprising a list of incidents and an interactive map; receiving, through the GUI of the first instance of the emergency response application, a selection of an option to share a first incident from within the list of incidents; displaying, within the GUI of the first instance of the emergency response application, a list of ESPs comprising ESPs available for sharing the incident with, wherein the list of ESPs comprises the second ESP; receiving, through the GUI of the first instance of the emergency response application, a selection of the second ESP from the list of ESPs; transmitting emergency data associated with the first incident to the second ESP through the second instance of the emergency response application, wherein the emergency data associated with the first incident comprises a user identifier and an emergency location; and displaying, within the GUI of the second instance of the emergency response application, the user identifier as a second incident within the list of incidents and the emergency location as an incident location within the interactive map. In some embodiments, the list of ESPs further comprises one or more ESPs not available for sharing the incident with and wherein the ESPs available for sharing the incident with are marked with an available icon. In some embodiments, the second ESP is shown within the list of ESPs only if a user associated with the second ESP is logged into the second instance of the emergency response application. In some embodiments, the list of ESPs further comprises a list of pre-approved ESPs for the first ESP to share incidents with and wherein the second ESP is a pre-approved ESP for the first ESP. In some embodiments, the method further comprises receiving a selection of the second incident from within the GUI of the second instance of the emergency response application and, in response, notifying the first ESP of receipt of the second incident by the second ESP. In some embodiments, notifying the first ESP of the receipt of the second incident by the second ESP comprises displaying a share icon on the first incident within the list of incidents of the first instance of the emergency response application. In some embodiments, the method further comprises determining that the second incident is not selected from within the list of incidents of the second instance of the emergency response application within a threshold period of time and, in response, notifying the first ESP of a failed receipt of the second incident by the second ESP. In some embodiments, notifying first ESP of the failed receipt of the second incident by the second ESP comprises displaying a failed share icon on the first incident within the list of incidents or a failed share banner within the GUI of the first instance of the emergency response application. In some embodiments, the method further comprises displaying the emergency location as a second incident location within the interactive map of the first instance of the emergency response application and wherein notifying the first ESP of the failed receipt of the second incident by the second ESP comprises displaying a failed share icon on the second incident location. In some embodiments, the method further comprises receiving a selection of the second incident from within the second instance of the emergency response application and, in response, initiating a two-way, text-based communication session between the first and second instances of the emergency response application. In some embodiments, the method further comprises: providing a third instance of the emergency response application to the first or second ESP; receiving a selection of a third incident associated with the user identifier from within the third instance of the emergency response application; and facilitating a three-way, text-based communication session between the first, second, and third instances of the emergency response application. In some embodiments, the method further comprises: providing a third instance of the emergency response application to a third ESP; receiving, through the GUI of the first instance of the emergency response application, a selection of an option to share the first incident with the third ESP; transmitting the emergency data associated with the first incident to the third ESP through the third instance of the emergency response application; displaying, within the GUI of the second instance of the emergency response application, the user identifier as a third incident within the list of incidents; receiving a selection of the third incident from within the third instance of the emergency response application; and facilitating a three-way, text-based communication session between the first, second, and third instances of the emergency response application. In some embodiments, the both the first and second ESPs are public safety answering points (PSAPs). In some embodiments, the first ESP is a primary emergency response agency and the second ESP is a non-primary emergency response agency. In some embodiments, the non-primary emergency response agency is one of a police department, a fire department, and emergency medical services. In some embodiments, the method further comprising providing a jurisdictional awareness view to the primary emergency response agency and not providing a jurisdictional awareness view to the non-primary emergency response agency. In some embodiments, primary emergency response agencies are permitted to share incidents via the emergency response application and non-primary emergency response agencies are not permitted to share incidents via the emergency response application. In some embodiments, the first ESP is associated with a first geofence and wherein the second ESP is associated with a second geofence that shares a border with the first geofence.

In another aspect, disclosed herein is an emergency management system (EMS for sharing emergency data within a network of emergency service providers (ESPs), the system comprising: (a) a network communication element communicatively coupled to the network of ESPs; and (b) a processor and non-transitory computer readable storage medium containing instructions that, when executed by the processor, cause the processor to: provide a first instance of an emergency response application to a first ESP from the plurality of ESPs and a second instance of the emergency response application to a second ESP from the plurality of ESPs, wherein the emergency response application comprises a graphical user interface (GUI) comprising a list of incidents and an interactive map; receive, through the GUI of the first instance of the emergency response application, a selection of an option to share a first incident from within the list of incidents; display, within the GUI of the first instance of the emergency response application, a list of ESPs comprising ESPs available for sharing the incident with, wherein the list of ESPs comprises the second ESP; receive, through the GUI of the first instance of the emergency response application, a selection of the second ESP from the list of ESPs; transmit emergency data associated with the first incident to the second ESP through the second instance of the emergency response application, wherein the emergency data associated with the first incident comprises a user identifier and an emergency location; and display, within the GUI of the second instance of the emergency response application, the user identifier as a second incident within the list of incidents and the emergency location as an incident location within the interactive map.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 16A, FIG. 16B, and FIG. 16C illustrate examples of a graphical user interface of an emergency response application in accordance with one embodiment of the present disclosure;

DETAILED DESCRIPTION

Disclosed herein are systems, devices, media, and methods for providing enhanced emergency communications and functions. Embodiments of the present disclosure take advantage of technological advancements that have allowed for mobile communication devices to generate accurate locations by incorporating multiple technologies embedded in the devices, such as GPS, Wi-Fi, and Bluetooth to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls.

Furthermore, mobile communication devices (e.g., mobile phones, wearables, IoT devices, smart home devices, vehicle computers, etc.) are often capable of generating or storing additional information that may be useful in responding to emergency situations, such as health data or medical histories. For example, during an emergency, a modern mobile communication device may have access to an implicated person's blood type, preexisting medical conditions, or even the implicated person's current heartrate. In some embodiments, the mobile communication device has access to data from sensors (e.g., health or environmental sensors). For example, a video feed of the emergency via a connected surveillance camera can provide valuable situational awareness regarding the emergency.

Electronic Device, Emergency Management System (EMS), and Emergency Service Provider (ESP)

Figure 1A:
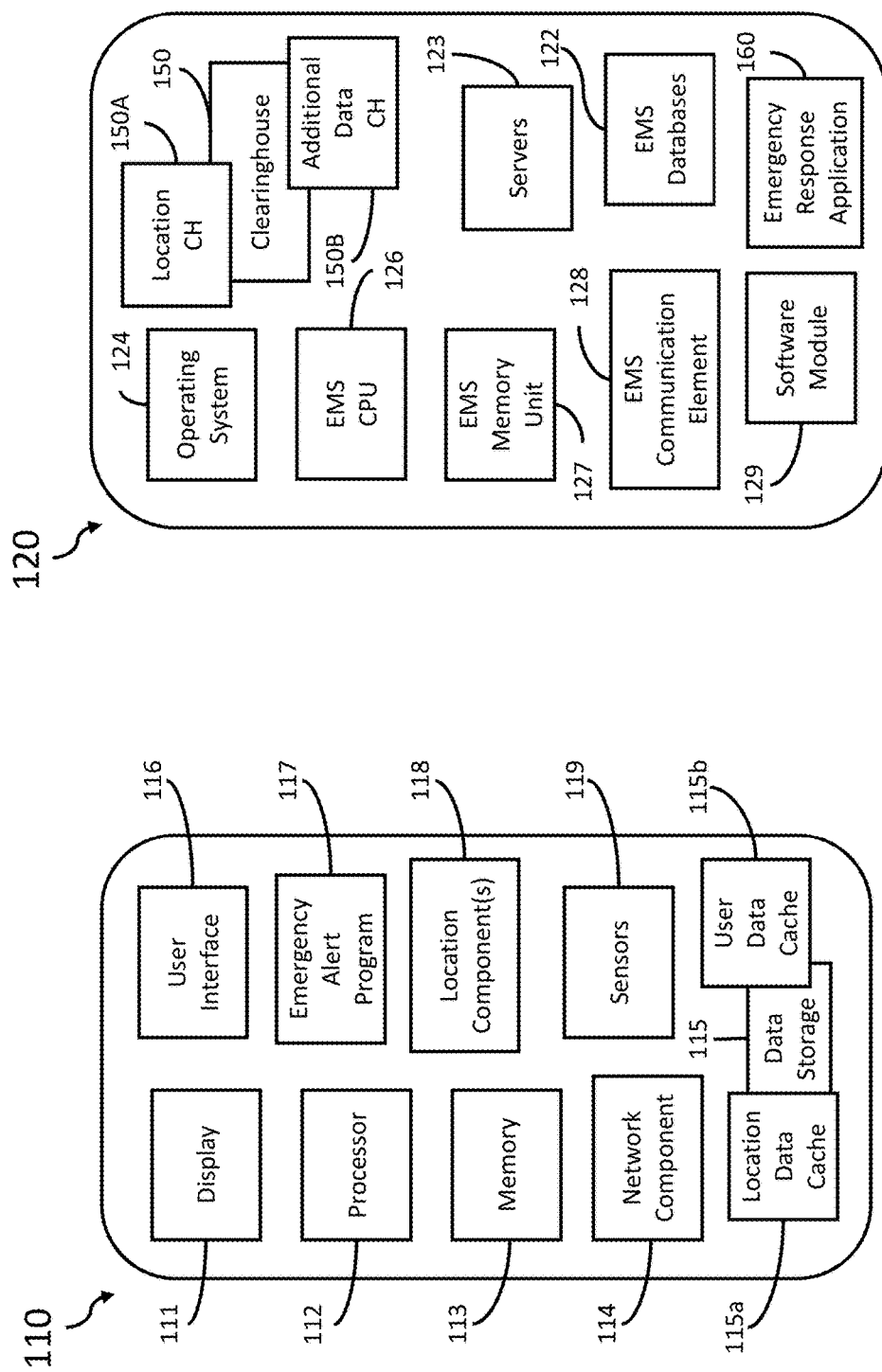
FIG. 1A depicts diagrams of (i) an electronic device and (ii) an emergency management system (EMS) in accordance with one embodiment of the present disclosure.

In various embodiments, disclosed herein are devices, systems, and methods for managing emergency data for emergency response. FIG. 1A depicts exemplary diagrams of (i) an electronic device 110 and (ii) an emergency management system (EMS) 120 in accordance with one embodiment of the present invention. In some embodiments, the electronic device 110 is a digital processing device such as a communication device (e.g., mobile or cellular phone, computer, laptop, etc.). In some embodiments, the electronic device is a wearable device (e.g., a smartwatch). In some embodiments, the electronic device is an Internet of Things (IoT) device, such as a home assistant (e.g., an Amazon Echo) or a connected smoke detector (e.g., a Nest Protect smoke and carbon monoxide alarm). In some embodiments, the electronic device is a walkie-talkie or two-way radio.

In some embodiments, the electronic device 110 includes a display 111, a processor 112, a memory 113 (e.g., an EPROM memory, a RAM, or a solid-state memory), a network component 114 (e.g., an antenna and associated components, Wi-Fi adapters, Bluetooth adapters, etc.), a data storage 115, a user interface 116, an emergency alert program 117, one or more location components 118, and one or more sensors 119. In some embodiments, the processor 112 is implemented as one or more microprocessors, microcomputers, microcontrollers, digital signal processors, central processing units, state machines, logic circuitries, and/or devices that manipulate signals based on operational instructions. Among other capabilities, the processor 112 is configured to fetch and execute computer-readable instructions stored in the memory 113.

In some embodiments, the display 111 is part of the user interface 116 (e.g., a touchscreen is both a display and a user interface in that it provides an interface to receive user input or user interactions). In some embodiments, the user interface 116 includes physical buttons such as an on/off button or volume buttons. In some embodiments, the display 111 and/or the user interface 116 comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage 115 includes a location data cache 115A and a user data cache 115B. In some embodiments, the location data cache 115A is configured to store locations generated by the one or more location components 118.

In some embodiments, the emergency alert program 117 is an emergency response application or emergency response mobile application. In some embodiments, the emergency alert program 117 is configured to record user data, such as a name, address, or medical data of a user associated with the electronic device 110. In some embodiments, the emergency alert program 117 is configured to detect when an emergency request is generated or sent by the electronic device 110 (e.g., when a user uses the electronic device 110 to make an emergency call). In some embodiments, in response to detecting an emergency request generated or sent by the electronic device 110, the emergency alert program 117 is configured to deliver a notification to the EMS 120. In some embodiments, the notification is an HTTP post containing information regarding the emergency request. In some embodiments, the notification includes a location (e.g., a device-based hybrid location) generated by or for the electronic device 110. In some embodiments, in response to detecting an emergency request generated or sent by the electronic device 110, the emergency alert program 117 is configured to deliver user data to the EMS 120.

In some embodiments, as depicted in FIG. 1A, the emergency management system (EMS) 120 includes an EMS operating system 124, an EMS CPU 126, an EMS memory unit 127, an EMS communication element 128, and one or more software modules 129. In some embodiments, the EMS CPU 126 is implemented as one or more microprocessors, microcomputers, microcontrollers, digital signal processors, central processing units, state machines, logic circuitries, and/or devices that manipulate signals based on operational instructions. Among other capabilities, the EMS CPU 126 is configured to fetch and execute computer-readable instructions stored in the EMS memory unit 127. The EMS memory unit 127 optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The EMS memory unit 127 optionally includes modules, routines, programs, objects, components, data structures, etc., which perform particular tasks or implement particular abstract data types.

In some embodiments, the EMS 120 includes one or more EMS databases 122, one or more servers 123, and a clearinghouse 150. In some embodiments, the clearinghouse 150, as described in further detail below, is an input/output (I/O) interface configured to manage communications and data transfers to and from the EMS 120 and external systems and devices. In some embodiments, the clearinghouse 150 includes a variety of software and hardware interfaces, for example, a web interface, a graphical user interface (GUI), and the like. The clearinghouse 150 optionally enables the EMS 120 to communicate with other computing devices, such as web servers and external data servers (not shown). In some embodiments, the clearinghouse 150 facilitates multiple communications within a wide variety of networks and protocol types, including wired networks, for example, LAN, cable, etc., and wireless networks, such as WLAN, cellular, or satellite. In some embodiments, the clearinghouse 150 includes one or more ports for connecting a number of devices to one another or to another server. In some embodiments, the clearinghouse 150 includes one or more sub-clearinghouses, such as location clearinghouse 150A and additional data clearinghouse 150B, configured to manage the transfer of locations and additional data, respectively. In some embodiments, the EMS 120 additionally includes a user information module 161 that receives and stores user information (e.g., personal information, demographic information, medical information, location information, etc.) within the EMS 120. In some embodiments, users can submit user information through a website, web application, or mobile application, such as during a registration process for an emergency response application. In some embodiments, when the EMS 120 receives emergency data including user information, such as through an emergency alert received by the clearinghouse 150 (as described below), the EMS 120 stores the user information in the user information module 161. In some embodiments, user information stored within the user information module 161 is received by the EMS 120 from a third-party server system, as described below. In some embodiments, user information stored within the user information module 161 is associated with an identifier of a user or an electronic device associated with a user, such as a phone number or an email address.

Figure 1B:
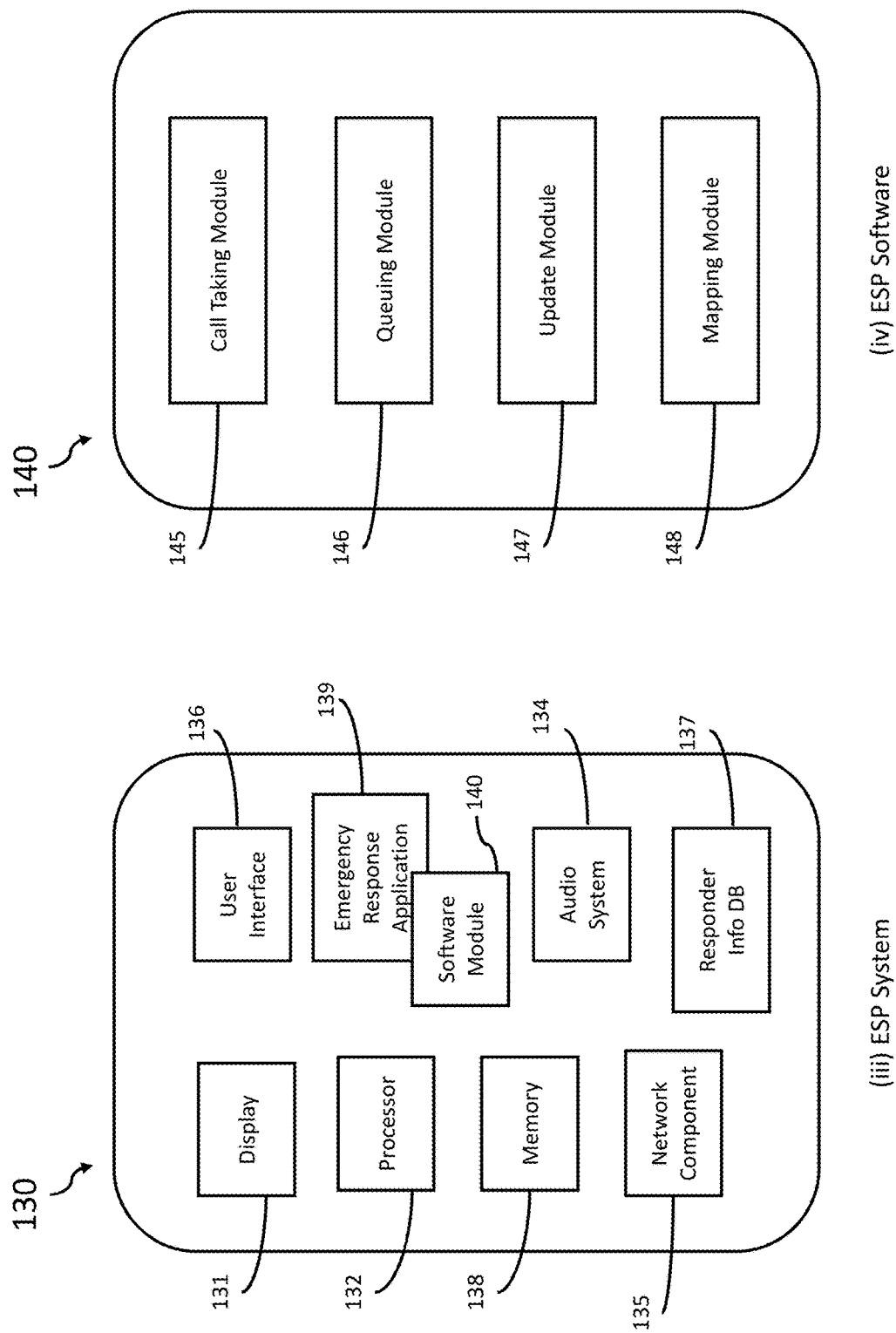
FIG. 1B depicts diagrams of (iii) an emergency service provider (ESP) system and (iv) ESP software in accordance with one embodiment of the present disclosure.

In some embodiments, as depicted in FIG. 1B, an emergency service provider (ESP; e.g., a public safety answering point (PSAP)) system 130 includes one or more of a display 131, a user interface 136, at least one central processing unit or processor 132, a network component 135, an audio system 134 (e.g., microphone, speaker and/or a call-taking headset), and a computer program such as a PSAP Emergency Display Application or Location Display Program 139. In some embodiments, the PSAP application or program 139 comprises one or more software modules 140. In some embodiments, the PSAP system 130 comprises a database of emergency responders 137, such as medical assets, police assets, fire response assets, rescue assets, safety assets, etc.

In some embodiments, as depicted in FIG. 1B, the PSAP application or program 139 installed on a PSAP system 130 comprising a software module 140 is a call taking module 145, an ESP display module 146, a supplemental or updated information module 147, or a combination thereof. In some embodiments, the PSAP application 139 displays the information on a map (e.g., on the display 131). In some embodiments, location and supplemental information is displayed for emergency service providers (e.g., police, fire, medical, etc.) and/or responders on their devices. It is contemplated that responder devices have optionally installed a responder device program (not shown) similar to PSAP display module 146. In some embodiments, the responder device program displays the emergency location on a map.

Emergency Clearinghouse

In some embodiments, as mentioned above with respect to FIG. 1A, the emergency management system (EMS) 120 includes a clearinghouse 150 (also referred to as an "Emergency Clearinghouse") for storing, retrieving, and transmitting emergency data. In some embodiments, the clearinghouse 150 includes a location clearinghouse 150A and an additional data clearinghouse 150B. In some embodiments, the location clearinghouse 150A includes a location ingestion module and a location retrieval module, as described below with respect to FIG. 2. In some embodiments, the additional data clearinghouse 150B includes an additional data ingestion module and an additional data retrieval module, as described below with respect to FIG. 2. In other embodiments, additional data and location data (hereinafter "emergency data") are stored in one or more databases in a distributed manner. In some embodiments, the emergency data is stored in an external or third-party server that is accessible to the EMS 120. The clearinghouse 150 optionally functions as an interface that receives and stores emergency data from electronic or communication devices that are then retrieved, transmitted, and/or distributed to recipients (e.g., emergency service providers) before, during, or after emergencies. As described above, the clearinghouse optionally receives emergency data from electronic or communication devices such as mobile phones, wearable devices, laptop or desktop computers, personal assistants, intelligent vehicle systems, home security systems, IoT devices, camera feeds, and other sources (e.g., emergency response assets and asset service providers, as described in further detail below). As described above and below, emergency data optionally includes locations or additional data such as medical history, personal information, or contact information. In some embodiments, during an emergency, the clearinghouse 150 detects the emergency and/or otherwise identifies the need to provide emergency data pertaining to the emergency. The clearinghouse 150 then identifies any emergency data pertaining to the emergency stored within the clearinghouse 150 and transmits the pertinent emergency data to the requesting ESP. Accordingly, in some embodiments, the clearinghouse 150 acts as a data pipeline that automatically pushes emergency data to an ESP that would otherwise be without access to emergency data that is critical to most effectively and efficiently responding to an emergency. Accordingly, location data stored within the clearinghouse 150 allows emergency responders to arrive at the scene of an emergency faster, and additional data stored within the clearinghouse 150 allows emergency responders to be better prepared for the emergencies they face.

For example, in one embodiment, an emergency alert is triggered by an electronic device 110 (e.g., by pressing a soft button, a physical button, voice command, or gesture) or autonomously based on sensor data (e.g., smoke alarms). In this example, the user then confirms the emergency and/or provides authorization for sending the emergency alert. Emergency data, such as an enhanced location and additional data regarding the user (e.g., the user's medical history) is delivered by the electronic device 110 to the EMS 120 and stored in the clearinghouse 150 (e.g., in the location clearinghouse 150A and the additional data clearinghouse 150B). In some embodiments, the EMS 120 or clearinghouse 150 formats the emergency data into a format that is compatible with industry standards for storing and sharing emergency data. For example, in some embodiments, the emergency data is formatted to be compatible with National Emergency Number Association (NENA) standards. In some embodiments, the clearinghouse 150 transmits the emergency data to a receiving party in response to receiving a query from the receiving party, as described below. In some embodiments, the clearinghouse 150 automatically pushes the emergency data to a receiving party (e.g., without receiving a query from the receiving party), such as a PSAP. For example, in some embodiments, the clearinghouse 150 or emergency management system 120 housing the clearinghouse automatically pushes the emergency data to a receiving party using a subscription system, as described below.

In some embodiments, as mentioned above, a requesting party (such as a PSAP responding to an emergency call) queries the clearinghouse 150 with an emergency data request (such as a HTTP GET request). In some embodiments, the emergency data request is in the form of Location Information Server (LIS) protocol. In response to the emergency data request, the EMS 120 or clearinghouse 150 sends an appropriate response including relevant emergency data to the requesting party via an encrypted pathway. In some embodiments, the emergency data request is in the form of HTTP-Enabled Location Delivery (HELD) and the response from the EMS 120 or clearinghouse 150 is in the form of Presence Information Data Format Location Object (PIDF-LO). In some embodiments, the emergency data request includes an authorization code (also referred to as an "authorization token" or "temporary access token") in the body, header, or metadata of the request, and the EMS 120 checks that the authorization code is active before providing a response to the requesting party. In some embodiments, authorization is provided in the "Authorization" header of the emergency data request using HTTP Basic Authentication. For example, in some embodiments, authorization is base64-encoded username and password for an account associated with the requesting party. In some embodiments, emergency data requests are sent over public networks using API access keys or credentials. In some embodiments, Transport Layer Security (TLS) is used in the requests and responses from the EMS 120 for encryption security. In some embodiments, the call taking module 145 includes a call-handling application, which is provided by a third-party vendor. In some embodiments, an ESP personnel interacts with the call-handling application to send an emergency data request to the EMS 120. In some embodiments, the response from the EMS 120 is displayed at the ESP display 131.

In some embodiments, as described above, emergency data includes locations and additional data. In some embodiments, emergency data includes one or more emergency data categories (also referred to as "data categories"). In some embodiments, the emergency data categories include: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. In some embodiments, emergency data categories are tagged with tags for specific types of data such as "demographics" or "medical data." For example, in some embodiments, gender, height, weight, ethnicity, profile picture (image-url) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted.

An example of an additional data communication from the EMS 120 in a standard format compatible with industry standards, PIDF-LO, is shown below.

HTTP/1.1 200 OK
Date: Tue, 1 Dec. 2016 23:27:30 GMT
Content-Length: 489
Content-Type: application/EmergencyCallData.DeviceInfo+xml
<dev:EmergencyCallData.DeviceInfo xmlns:dev="urn:ietfparams:xml:ns:EmergencyCallData:DeviceInfo">
<dev:DataProviderReference>d4b3072df.201409182208075-@example.org In some embodiments, when the emergency data is stored at a third-party server and receives a request for emergency data from the EMS 120, as a database query, the third-party server formats the requested emergency data and stores this information in an alternate database, and forwards either a response or a reference to the alternate database for accessing the emergency data requested by the EMS 120, which is provided to the ESP 130 over a hybrid analog and/or a data communication channel, depending on the capabilities of ESP 130. In some embodiments, the third-party server stores the emergency data, requested by the EMS 120 or directly by the ESP 130, in the alternate database for a certain period of time after receiving the request for the emergency data regarding a user and any electronic devices 110. In some embodiments, this period of time is a timer value (e.g., a timer countdown or a set time point) defined by the EMS 120 and the third-party server in conjunction with each other prior to the addition of the requested emergency data to the alternate database at the third-party server. In some embodiments, once the timer value has passed and no new requests for the emergency data pertaining to the particular user and the electronic device 110, or other devices associated with the user, are received by the third-party server, then the third-party server marks the particular alternate database entries to be deleted and waits for another, different, time-out interval. In some embodiments, once this particular second time-out interval has also been completed and no new requests for location data for the particular user or associated electronic devices 110 are received by the third-party server, the third-party server removes the specific marked entries from the alternate database in the next cycle of updates for the alternate database. In some embodiments, after adding the emergency data in the alternate database by the third-party server, the third-party server keeps updating the emergency data in the alternate database on a periodic, or as-needed basis, for the purpose of keeping the emergency data about the user or electronic device 110 current for providing the most recent and accurate emergency data to the EMS 120 and the ESP 130 for the purposes of responding to a request for emergency assistance. In some embodiments, the third-party server is updated by the EMS 120 for all the emergency data pertaining to all users and their associated electronic devices 110 that are served by the EMS 120 at any current time.

In some non-emergency situations, there is a need to access location data, user data, emergency data or sensor data. For example, in some embodiments, a user of an electronic device 110 grants authorization to family members to access location data for the user. Accordingly, when a family member requests location data for a user, access is granted if there is proper authorization. As another example, in some embodiments, a taxi operations company requests and obtains location data of one or more fleet members to keep track of its vehicles (e.g., via onboard vehicle console or terminal).

Various embodiments and applications of the clearinghouse 150 are described in detail herein. However, the embodiments and applications described herein should not be considered exhaustive or limiting in any way.

Figure 2:
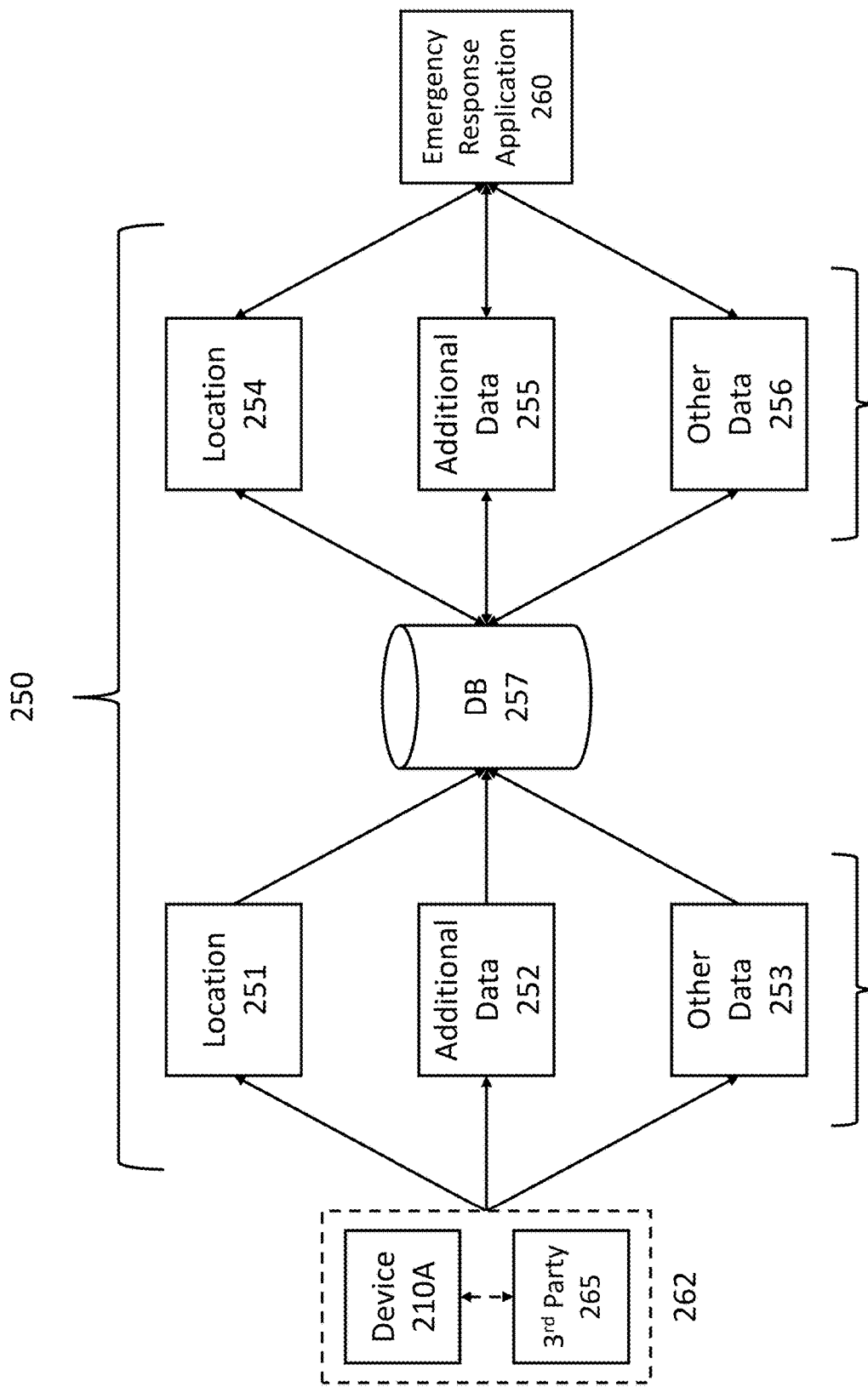
FIG. 2 depicts a diagram of a clearinghouse for emergency data in accordance with one embodiment of the present disclosure.

FIG. 2 depicts an embodiment of an Emergency Clearinghouse 250 for storing and retrieving emergency data. In some embodiments, the clearinghouse 250 includes a set of ingestion modules 258 (also referred to as "ingestion modules") and a set of retrieval modules 259 (also referred to as "retrieval modules"). The set of ingestion modules 258 is configured to receive various forms of emergency data from various emergency data sources 262, such as an electronic device 210A or a third-party server system 265 (hereinafter, "third-party server"). In some embodiments, an electronic device 210A is a communication device (e.g., a mobile phone), a wearable device (e.g., a smartwatch), or an internet of things (IoT) device (e.g., a smart speaker) that can communicate with one or more of the ingestion modules within the set of ingestion modules 258. In some embodiments, a third-party server 265 stores data that is not generated by or stored within an electronic device. For example, in some embodiments, a third-party server includes a database of static medical information that can be sent to the clearinghouse during an emergency. In some embodiments, when the emergency management system 120 detects an emergency (e.g., when a person calls 9-1-1), the clearinghouse 250 can query an emergency data source 262 for emergency data regarding the emergency. For example, in some embodiments, in response to detecting a 9-1-1 call made from a mobile phone, the additional data ingestion module 252 (as described below) sends a query including the phone number of the mobile phone to a third-party server 265 that stores static medical information. The third-party server 265 can then return any available medical information associated with the phone number of the mobile phone to the additional data ingestion module. In some embodiments, multiple ingestion modules within the set of ingestion modules can receive emergency data for a single emergency. For example, in some embodiments, when a person calls 9-1-1 from a mobile phone, the mobile phone can send a device-based hybrid location to the location ingestion module 251 (as described below) and demographic data (as described above) to the additional data ingestion module 252. In some embodiments, the clearinghouse can receive emergency data from multiple emergency data sources 262 for a single emergency. For example, in some embodiments, when a person calls 9-1-1 from a mobile phone, the clearinghouse can receive a location from the mobile phone (such as through the location ingestion module 251) and a heartrate from a smartwatch that the person is wearing (such as through additional data ingestion module 252). Or for example, in some embodiments, when a person calls 9-1-1 from a mobile phone, the clearinghouse can receive a location from the mobile phone and medical information associated with the person from a third-party server 265.

The set of ingestion modules 258 optionally include a location ingestion module 251, an additional data ingestion module 252, and one or more other data ingestion modules 253. In some embodiments, the location ingestion module 251 is an emergency location service ingestion interface for posting or receiving emergency locations. In some embodiments, the location ingestion module 251 is a REST API that receives an HTTP POST including location data when an emergency alert is generated (e.g., when an emergency call is made from a cell phone). The location data includes a location generated concurrently or in response to the generation of the emergency alert. In some embodiments, the location data includes a location generated before the emergency alert. For example, when an emergency call is made from a cell phone, thereby generating an emergency alert, the location ingestion module 251 receives a location recently generated by the phone but before the emergency alert was generated, ensuring that a location for the emergency is available as quickly as possible. In some embodiments, the location data includes a device-based hybrid location generated by an electronic device 210 that generated the emergency alert. In some embodiments, the location data includes a location generated by a second electronic device communicatively coupled to the electronic device that generated the emergency alert. The location ingestion module 251 is integrated into an electronic device 210 through a mobile application installed on the device 210 or integrated into the firmware or operating system of the electronic device 210.

In some embodiments, the location data is generated by the electronic device 210 before the emergency and is accessible to a PSAP during an emergency. For example, a taxi company may have software that transmits the location of its cars or assets to the emergency clearinghouse 250 preemptively. Thus, when an emergency arises, the location of the affected taxi can be made accessible quicker to send help. In some embodiments, the location data is generated by the electronic device 210 after the emergency has commenced and is made accessible to a PSAP during the on-going emergency. For example, updated location data of a hijacked taxi is also periodically transmitted to the emergency clearinghouse 250 and made accessible to a PSAP.

In some embodiments, the additional data ingestion module 252 is an interface for posting or receiving static or dynamic emergency profile data (hereinafter, "additional data" or "additional information"). In some embodiments, additional data comprises medical data, personal data, demographic data, health data, or any combination thereof. Examples of medical data include information relating to a person's medical history, such as past surgeries or preexisting conditions. Examples of personal data include a person's name, date of birth, height, weight, occupation, address(es) (e.g., home address, work address, etc.), spoken languages, and other personal information. Examples of demographic data include a person's gender, ethnicity, age, etc. Examples of health data include information such as a person's blood type or heartrate. In some embodiments, additional data comprises data received from connected devices such as vehicles, IoT devices, and wearable devices. For example, some intelligent vehicle systems generate and send data regarding a crash, such as the speed at which the vehicle was moving just before the collision, where the vehicle was struck, the number of occupants, etc. In some embodiments, the additional data ingestion module 252 is a REST API (e.g., a JSON (JavaScript Object Notation) REST API). For example, in some embodiments, when an emergency call is made from a cell phone, thereby generating an emergency alert, the cell phone receives a heartrate of the person who made the emergency call from a smartwatch worn by the person and communicatively coupled to the cell phone (e.g., Wi-Fi or Bluetooth connectivity). The cell phone sends the heartrate to the additional data ingestion module 252, along with any other additional data, in an HTTP POST. In some embodiments, the additional data ingestion module 252 is integrated into an electronic device 210 through a mobile application installed on the device 210 or integrated into the firmware or operating system of the electronic device 210. In some embodiments, additional data is sent to the additional data ingestion module 252 from a network server. The additional data ingestion module 252 is accessed by any connected platform that receives data that might be relevant in an emergency. Connected platforms optionally send additional data to the additional data ingestion module 252 at any time. For example, in some embodiments, a website, web application, or mobile application integrated with the additional data ingestion module 252 that allows users to create profiles sends additional data included in the profiles to the additional data ingestion module 252 every time a profile is created or updated.

In some embodiments, the set of ingestion modules 258 includes one or more other data ingestion modules 253. Another data ingestion module 253 is optionally an interface for posting or receiving data relevant to emergencies that is not received by the location ingestion module 251 or the additional data ingestion module 252. In some embodiments, the other data ingestion module 253 receives audio or video streams during an emergency from electronic or communication devices associated with the emergency or proximal to the emergency. For example, an emergency alert is generated by an intelligent vehicle system installed in a vehicle in response to the vehicle experiencing a collision. In this example, the emergency alert is sent to the EMS 120 by the intelligent vehicle system or by an electronic device communicatively coupled to the intelligent vehicle system, such as a cell phone coupled to the intelligent vehicle system via Bluetooth. In response to generating the emergency alert, the intelligent vehicle system additionally begins streaming audio and video from microphones and cameras installed inside or outside of the vehicle to the clearinghouse 250 through the other data ingestion module 253. A cell phone communicatively coupled to the intelligent vehicle system additionally or alternatively streams audio or video from microphones and cameras integrated into the cell phone to the clearinghouse 250 through the other data ingestion module 253. In some embodiments, the one or more other data ingestion modules 253 are REST APIs that are accessed with an HTTP POST.

After receiving the relevant data, the set of ingestion modules 258 can store the data in one or more clearinghouse databases 257. For example, in some embodiments, the clearinghouse databases 257 includes a location database and an additional data database. In some embodiments, as described above, the one or more clearinghouse databases 257 are stored on a third-party server communicatively coupled to or otherwise accessible by the EMS 120. In some embodiments, the set of ingestion modules 258 tags or otherwise associates the data received by the modules with an identifier of a user or device associated with the data. For example, the set of ingestions modules 258 tag the data the received by the modules with a user ID number, an email address, or a phone number (e.g., caller ID). In some embodiments, the ingestion modules 258 tag the data received by the clearinghouse 250 based on the data source (e.g., device name or type, application name, username, phone number, corporate account, etc.).

In some embodiments, the emergency data maintained by the clearinghouse is purged. In some embodiments, the data is purged on a regular or periodic basis. In some embodiments, data that is older than a defined threshold is purged. In some embodiments, different data types are purged according to different schedules and/or thresholds. For example, dynamic data (e.g., data that is subject to constant or regular change) such as location data may be more likely to become out-of-date over time and so may be purged more frequently than static data such as a permanent home address, which may remain permanently in the database until it is replaced with an updated address.

In some embodiments, an individual or group of individuals are associated with multiple identifiers. For example, the location ingestion module 251 receives a location generated by a phone associated with the phone number +1-555-555-5555, associated with John Doe. The additional data ingestion module 252 also receives a heartrate from a smartwatch associated with the email address johndoe@email.com, also associated with John Doe. In this example, the set of ingestion modules 258 tag the location with the phone number "+1-555-555-5555," tag the heartrate with the email address "johndoe@email.com," and associate both the location and the heartrate with John Doe in the clearinghouse databases 257.

In some embodiments, as depicted in FIG. 2, the clearinghouse 250 includes a set of retrieval modules 259. The set of retrieval modules 259 optionally include a location retrieval module 254, an additional data retrieval module 255, and one or more other data retrieval modules 256. In some embodiments, the location retrieval module 254 is an interface for retrieving location data from the clearinghouse databases 257. In some embodiments, the location retrieval module 254 is a JSON REST API that receives a query or request (e.g., in the form of an HTTP GET request) from a requesting party, such as an ESP. In some embodiments, the request is sent from a call-taking application (e.g., call taking module 145) integrated into the ESP system 130. In some embodiments, the request (also referred to as an "emergency data request") is sent from an emergency response application 260. In some embodiments, the location retrieval module 254 provides a single GET endpoint for retrieving either the latest or paginated list of locations for a specific caller ID (e.g., an identifier of a user or an electronic device associated with a user, such as a phone number). For example, as described above, a phone number associated with a device 210 from which a location was received is included in the header, body, or metadata of the request sent to the location retrieval module 254. The clearinghouse 250 then retrieves a location or set of locations from the clearinghouse databases 257 and deliver the location or set of locations to the requesting party. In some embodiments, the location retrieval module 254 is a location information server (LIS). In some embodiments, the LIS is a NG911 standards-based XML API for the retrieval of location data from the clearinghouse databases 257. In some embodiments, as described above, the location retrieval module 254 accepts HELD requests from requesting parties and returns location data for a specific caller ID or anonymous reference. However, in some embodiments, the location retrieval module 254 automatically retrieves and transmits location data using a subscription system, as described below.

As depicted in FIG. 2, the set of retrieval modules 259 optionally include an additional data retrieval module 255.

In some embodiments, the additional data retrieval module 255 is a JSON REST API for the retrieval of emergency or additional data. As described above, additional data optionally includes medical data, personal data, demographic data, and health data. Additional data also optionally includes data received from connected devices such as vehicles, IoT devices, and wearable devices. In some embodiments, the additional data retrieval module 255 receives a query or request (e.g., in the form of an HTTP GET request) from a requesting party, such as an ESP. In some embodiments, the request (also referred to as an "emergency data request") is sent from an emergency response application 260. The additional data then retrieves additional data associated with a specific or particular identifier of a user or an electronic device associated with the user, such as a phone number, and returns the data to the requesting party. In some embodiments, the set of retrieval modules 259 further includes one or more other data retrieval modules 256, which function similarly to the location retrieval module 254 and additional data retrieval module 255, for the retrieval of data stored in the clearinghouse databases 257 not retrieved by the location retrieval module 254 or additional data retrieval module 255. However, in some embodiments, the additional data retrieval module 255 automatically retrieves and transmits additional data using a subscription system, as described below.

In some embodiments, a retrieval module within the set of retrieval modules 259 and a corresponding ingestion module within the set of ingestion modules 258 form a sub-clearinghouse. For example, in some embodiments, location ingestion module 251 and location retrieval module 254 combine to form location clearinghouse 150A (as shown in FIG. 1B). Likewise, in some embodiments, additional data ingestion module 252 and additional data retrieval module 255 combine to form additional data clearinghouse 150B. In some embodiments, a requesting party is only given access to a particular sub-clearinghouse. For example, a police officer is only given access to the location clearinghouse 150A, while an EMT (emergency medical technician) is only given access to the additional data clearinghouse 150B. However, a requesting party is given differential access to the clearinghouse 150, sub-clearinghouses, or particular emergency data categories within the clearinghouse 150 based on any factor or set of factors. In some embodiments, a requesting party initiates a query or request (i.e., an emergency data request) using an emergency response application 260 (as described below), which in turn generates the query and transmits the query to the clearinghouse 250.

In some embodiments, the clearinghouse 250 includes an emergency data streaming module or streaming module (not shown). In some embodiments, a streaming module is capable of both receiving and transmitting emergency data, but emergency data received by the streaming module is not stored within a database. Instead, emergency data is streamed through the streaming module without being committed to memory within the clearinghouse 250. In some embodiments, the streaming module establishes an active or persistent communication link (e.g., a websocket connection, as described below) between the EMS or clearinghouse 250 and an emergency data recipient. For example, in some embodiments in which emergency data is pushed from the EMS or clearinghouse 250 to an emergency data recipient, the streaming module can establish a persistent communication link between the EMS or clearinghouse 250 and the emergency data recipient, and any emergency data that is received by the EMS or clearinghouse 250 to which the emergency data recipient is subscribed (as described below)

is pushed to the emergency data recipient through the persistent communication link without being committed to memory within the EMS or clearinghouse 250.

As described above, in some embodiments, an emergency management system (EMS) maintains a clearinghouse 250 that obtains and shares emergency data to aid emergency service providers (ESPs) in responding to emergencies. During an emergency, in some embodiments, an ESP can send an emergency data request to the EMS through the emergency response application 260, and, in response, the EMS can send any available emergency data associated with the emergency back to the emergency response application 260. In some embodiments, as described above, the emergency response application 260 includes an identifier associated with an emergency alert in the emergency data request. The EMS can then use the identifier associated with the emergency alert to retrieve emergency data associated with the emergency alert from the clearinghouse. For example, as described above, an ESP 230 (e.g., a public safety answering point (PSAP)) can receive an emergency alert in the form of a 9-1-1 phone call (representative of an emergency or potential emergency) from a mobile phone associated with a phone number (e.g., (555) 555-5555). The ESP 230 can then send an emergency data request including the phone number (i.e., the identifier of the emergency alert) to the EMS, which can then retrieve any emergency data within or otherwise accessible by the clearinghouse 250 associated with the phone number and return the available emergency data to the requesting ESP 230. This process of returning emergency data to the emergency response application 260 in response to an emergency data request is referred to as "pulling" emergency data from the clearinghouse.

However, in some embodiments, the EMS can "push" emergency data from the clearinghouse 250 to the emergency response application (i.e., the EMS can send emergency data to the emergency response application 260 without receiving an emergency data request). In some embodiments, the EMS pushes emergency data to the emergency response application 260 using an emergency data subscription system. Using the emergency data subscription system, a recipient (or potential recipient) of emergency data from the clearinghouse 250 can subscribe to the clearinghouse 250 for a particular device identifier, user identifier, or ESP account (hereinafter, "subscription"). After subscribing to a subscription, the recipient (e.g., an ESP) may automatically receive updates regarding the subscription without first sending an emergency data request. For example, in some embodiments, if an ESP subscribes to a phone number, whenever the clearinghouse 250 receives updated emergency data associated with the phone number, the clearinghouse 250 can automatically send the updated emergency data associated with the phone number to the ESP (e.g., through the emergency response application 260), without first receiving an emergency data request including the phone number. For example, in some embodiments, if a recipient is subscribed to a particular phone number, and the clearinghouse 250 receives a new or updated location associated with the particular phone number, the clearinghouse 250 will instantly and automatically push the new or updated location associated with the particular phone number to the recipient the moment that the new or updated location is received by the clearinghouse 250, without the recipient having to send an emergency data request. In some embodiments, when an ESP or ESP personnel accesses the emergency response application 260 at a computing device associated with the ESP or ESP personnel, the EMS establishes a persistent or active communication link (e.g., a websocket connection) with the computing device in order to push emergency data regarding a subscription to which the ESP or ESP personnel is subscribed to the emergency response application 260.

In some embodiments, an active communication link is a connection, or a potential connection (e.g., two corresponding endpoints), between two entities (e.g., an EMS and an ESP) through which data can be freely transmitted (i.e., without a recipient entity having to actively accept transmitted data). In some embodiments, an active communication link is a persistent communication link. In some embodiments, a persistent communication link is a communication link that endures for a period of time that is not dependent on the transmission of a particular packet of data. For example, in some embodiments, a persistent communication link between two entities (e.g., an EMS and an ESP) endures until the communication link is actively terminated by one of the entities, as opposed to passively terminating once a particular packet of data (e.g., a particular emergency alert) has been transmitted. In another example, a persistent communication link endures for a predetermined amount of time (e.g., five minutes or an hour). In another example, a persistent communication link established between an EMS and an ESP through an emergency response application endures until a login session on the emergency response application is terminated or the emergency response application itself is terminated. In some embodiments, a persistent communication link is a websocket connection. Web Socket is a type of computer communications protocol. A websocket connection is a longstanding or persistent internet connection between a client and a server that allows for bidirectional communication between the client and server without the client needing to send data requests to the server, which differentiates the Web Socket computer communications protocol from other types of computer communications protocols such as the HyperTextual Transfer Protocol (HTTP). The Web Socket protocol is often used by chat clients to facilitate user to user webchats. In some embodiments, the EMS establishes an active communication link with a computing device (e.g., an ESP console 130) in response to receiving an emergency data request. In some embodiments, the EMS establishes an active communication link with an ESP console when an ESP personnel logs into the emergency response application 260 at the ESP console. In some embodiments, the EMS establishes an active communication link with a responder device when an ESP personnel logs into the emergency response application 260 at the responder device. In some embodiments, an active communication link established between the EMS and a computing device associated with ESP personnel is maintained by the EMS for the duration of the ESP personnel's log-in session.

In some embodiments, the EMS automatically subscribes a recipient to a subscription (e.g., a particular device identifier or user identifier) in response to receiving an emergency data request including the subscription or an identifier of the subscription. For example, in some embodiments, when an ESP personnel sends an emergency data request including a phone number to the EMS through their ESP console (e.g., through the emergency response application 260), the EMS subscribes the ESP personnel to the phone number and establishes a persistent or active communication link with the ESP console. Then, whenever the clearinghouse 250 receives updated emergency data associated with the phone number, the EMS can automatically push the updated emergency data associated with the phone number to the ESP console. For example, an ESP personnel logs into an emergency response application 260 in communication with the EMS on the ESP personnel's ESP console. Subsequently, the ESP personnel receives a 9-1-1 call from a mobile phone and then generates and sends an emergency data request including the phone number of the mobile phone to the EMS through the emergency response application 260. The EMS then uses the phone number of the mobile phone to retrieve the most recent location associated with the mobile phone received by the clearinghouse and returns the most recent location associated with the mobile phone to the ESP personnel through the emergency response application 260. The EMS simultaneously subscribes the ESP personnel to the phone number of the mobile phone and establishes a websocket connection between the EMS and the ESP console and automatically pushes any updated emergency data (e.g., enhanced locations) associated with the phone number received by the clearinghouse to the emergency response application 260 as soon as the updated emergency data associated with the phone number is received by the clearinghouse 250.

In some embodiments, an ESP is associated with an identifier of the ESP (e.g., a unique ESP account ID; also referred to as an "ESP identifier") that an ESP or ESP personnel can subscribe to. The EMS can then establish a persistent or active communication link with a computing device associated with an ESP or ESP personnel subscribed to the unique ESP identifier and push emergency data associated with the unique ESP identifier to the computing device (e.g., through the emergency response application 260) whenever new or updated emergency data associated or tagged with the unique ESP identifier is received by the clearinghouse 250. For example, in some embodiments, when the clearinghouse 250 receives a location (e.g., an emergency location) associated with an emergency alert (e.g., when a person calls 9-1-1 from a mobile phone and the mobile phone responsively sends a current location of the mobile phone to the clearinghouse 250), the EMS retrieves one or more geofences (as described below) associated with each ESP registered with the EMS and determines which (if any) of the geofences that the location associated with the emergency alert falls within. The EMS then tags the location associated with the emergency alert with the unique ESP identifiers associated with each of the ESPs associated with geofences that the location associated with the emergency alert falls within. For example, if four ESPs are registered with the EMS—ESP A, ESP B, ESP C, and ESP D—and the clearinghouse 250 receives a location associated with an emergency that falls within the one or more of the geofences associated with ESP A and ESP D, the EMS can tag the location associated with the emergency alert with the unique ESP account ID associated with ESP A and the unique ESP account ID associated with ESP D. The EMS can then push the location associated with the emergency alert to any ESPs or ESP personnel with an established persistent or active communication link with the EMS and currently subscribed to either the unique ESP account ID for ESP A or the unique ESP account ID for ESP D. In some embodiments, when an ESP personnel logs into the emergency response application 260, a communication is sent to the EMS that includes one or more unique ESP account IDs that the ESP personnel or their respective ESP is currently subscribed to.

Emergency Data Geofencing

Figure 3:
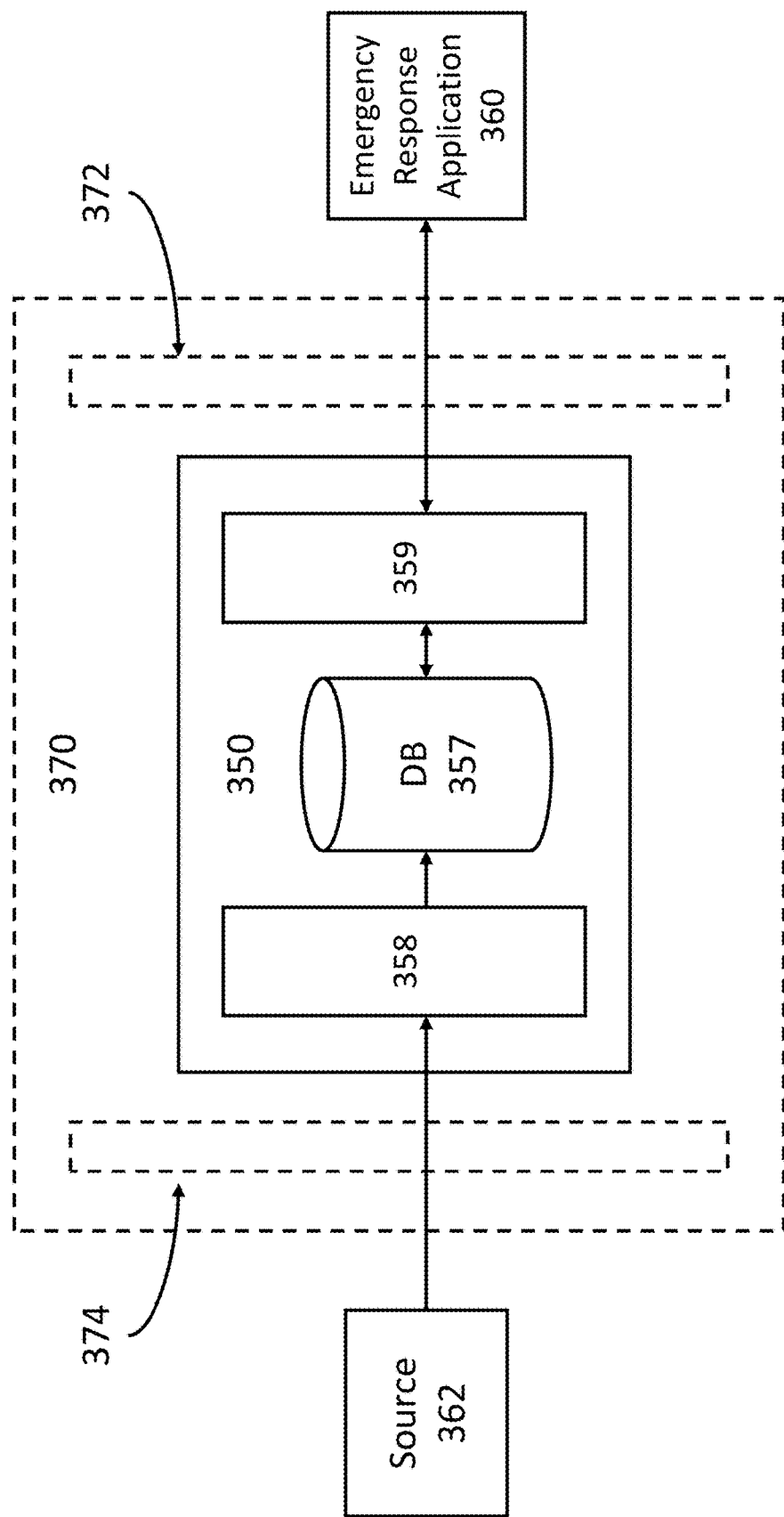
FIG. 3 depicts a diagram of a geofence system applied to a clearinghouse for emergency data in accordance with one embodiment of the present disclosure.

FIG. 3 depicts a diagram of a geofence applied to a clearinghouse for emergency data. In some embodiments, a geofence module 370 is applied to the clearinghouse 350 to protect potentially sensitive emergency data using geospatial analysis. In some embodiments, as described above with respect to FIG. 2, the clearinghouse 350 includes a set of ingestion modules 358 and a set of retrieval modules 359. The set of ingestion modules can receive emergency data, or other information that can be useful in responding to an emergency, from a variety of sources. For example, in some embodiments, a smartphone sends emergency data to the clearinghouse 350 in the form of an HTTP POST API call in response to a user of the smartphone initiating a 911 emergency call. As depicted in FIG. 3, in some embodiments, when emergency data (e.g., an emergency location or additional emergency data) is sent (directly or indirectly, such as through a third-party server) from an electronic device 310 to the clearinghouse 350, the emergency data is first processed by a geofence module 370 before being received by the set of ingestion modules 358 within the clearinghouse 350. Similarly, in some embodiments, when an emergency data request is sent from a requesting party (e.g., through an emergency response application 360, as described below), the emergency data request is processed by the geofence module 370 before being received by the set of retrieval modules 359.

In some embodiments, as mentioned above, a geofence module 370 is applied to the clearinghouse 350 to protect potentially sensitive emergency data using geofences. Generally, a geofence is a virtual perimeter for a real-world geographic area. A geofence can be dynamically generated—as in a radius around a point location—or a geofence can be a predefined set of boundaries (such as school zones or neighborhood boundaries). The use of a geofence is called geofencing, and one example of usage involves a location-aware device of a location-based service (LBS) user entering or exiting a geofence. Entry or exit from a geofence could trigger an alert to the device's user as well as messaging to the geofence operator. The geofence information, which could contain the location of the device, could be sent to a mobile telephone or an email account.

For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP), e.g., a police department, a fire department, a federal disaster management agency, national highway patrol, etc., which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

Geofences can be defined in various ways. For example, in some embodiments, a geofence comprises one or more of the following: a county boundary, a state boundary, a collection of postal/zip codes, a collection of cell sectors, simple shapes, complex polygons, or other shapes or areas. In some embodiments, geofences comprise approximations where the "approximated" geofence encloses an approximation of the authoritative region.

Updates to geofences may be required over time because the authoritative regions may change over time. Geofences may change over time (e.g., a new sub-division has cropped up) and require updates. In some embodiments, the systems and methods described herein allow geofences to be updated (e.g., a PSAP administrator can upload updated geofence GIS shapefiles).

For maintaining the privacy, security and integrity of the data, geofencing may be applied to emergency data. For example, applying geofence filters to the emergency data allows additional avenues for monitoring, both visibility and control, over the clearinghouse to detect anomalies/spikes and reduce the risk of security breaches.

In some embodiments, the emergency data is obtained or received from an emergency data source 362 (such as an electronic device or third-party server, as described above) by the clearinghouse 350. Then, geofencing can be applied to the emergency data in various ways. In some embodiments, an ingestion geofence 374 (also referred to as "upstream filtering") is applied to restrict sending of data from emergency data sources 362 to the clearinghouse 350 from geographical areas that are not covered by the "combined authoritative jurisdiction" (i.e., covered one or more provisioned geofences in the geofence database 376). In such an embodiment, the geofence module 370 identifies a location associated with the emergency data (e.g., a device-based hybrid location received from a mobile phone as part of an emergency alert) and determines if the location falls within any of the geofences stored within the geofence database 376. In some embodiments, the ingestion geofence (also referred to as an "ingress filter") is applied to the ingestion module 358 to protect against accidental breaches of privacy. In some embodiments, the ingestion module 358 of the clearinghouse 350 drops location payloads that do fall within the geographical region covered by the "combined authoritative region." In some embodiments, geofencing is applied to determine if a location associated with emergency data received by the clearinghouse 350 falls within any of the geofences stored within the geofence database 376, and, if so, which entity is associated with the geofence that the location falls within, as described below.

In some embodiments, the clearinghouse 350 comprises one or more databases 357 (e.g., a database storing emergency data). For example, in some embodiments, the retrieval module 359 obtains emergency data from a clearinghouse database 357 to send to an emergency data recipient (e.g., an ESP) in response to an emergency data request, as described above. In some embodiments, the retrieval geofence 372 (also referred to as an "egress filter") is applied at the retrieval module 359 of the clearinghouse 350. Applying geofencing to retrieved emergency data will protect against abuse and limit the scope of security breaches in cases where credentials have been compromised. In some embodiments, one or more geofences are associated with one or more credentials associated with an ESP agency or organization. In some embodiments, the credentials associated with an ESP agency or organization confers authorization to access data such as emergency data from the clearinghouse. In some embodiments, specific authorization to access data is granted individually to members of a PSAP through tokens derived from the credentials for that PSAP.

In some embodiments, when the retrieval module 359 checks the coordinates of current location data (within retrieved emergency data) associated with a device identifier with the geofence(s) associated with the credentials in an emergency data request. If the current location is within the geofence region (enclosed by the geofence(s)), the current location is returned to the ESP and displayed within the ESP console. If not, the module 359 will return a "not found" message (as opposed to the retrieved location is outside the geofence) to protect privacy.

In some embodiments, geofences can be used for reporting results for internal metrics and monitoring the system. For example, the number of emergency data requests, locations provided, "no location found" etc., can be obtained for a geofence(s) associated with a PSAP. Using single or combined geofences, the emergency data can be obtained on county-wide, city-wide, postal code, course grid (rectangle overlay), state-wide, or country-wide basis. In some embodiments, ingress and egress counters (i.e., percent of emergency sessions where the location data was received, but not queried) and other similar metrics can be calculated and analyzed to identify problems and spikes. In some embodiments, different geofences are used for retrieval and for reporting.

In some embodiments, a location associated with a given emergency can be determined to fall within a plurality of geofences, as described below. In some embodiments, emergency data for the emergency is pushed to each PSAP having a geofence that the emergency (e.g., the location associated with the emergency) falls within. In some embodiments, emergency data for the emergency is transmitted to a subset of PSAPs having a geofence that encloses or encompasses the location associated with the emergency. In some embodiments, the location data of an individual device identifier is not transmitted to more than one PSAP at one time. Thus, in some implementations, the emergency data is only transmitted to one PSAP (i.e., a primary agency), but may be transmitted to multiple secondary agencies (e.g., police departments) and regional agencies. In some embodiments, the emergency data is transmitted to one or more emergency responders who may be associated with an ESP (e.g., police officers working for a police department). In some embodiments, wherein a device identifier egresses a geofence in which communication began and ingresses into a neighboring geofence, the location data is automatically transmitted to the neighboring PSAP with jurisdiction over the ingress geofence.

In some embodiments, to determine the appropriate ESP(s) for sharing emergency data, the authoritative jurisdiction (defined by one or more geofences) of an ESP (e.g., primary agency) must be evaluated before it is used by the geofence module 370. In case of irregularities (e.g., overlaps, islands, or other irregular features), steps may be taken to check with respective agency, geographical boundaries (national and international borders, county lines, rivers, hills, etc.), or other authority. In some embodiments, call routing data may be analyzed to see which ESP is answering the emergency call.

Raw geofences may be pre-processed to generate processed geofences using a variety of techniques. For removing irregularities, a geofence may be processed to resolve overlaps, remove islands and projections, smooth boundaries, modifying the file format or size, etc.

In some cases, there may be overlap between geofences of two or more ESPs. In some embodiments, the emergency data may be shared with the two or more ESPs to err on the side of making mission critical information to all entities that may be involved in the emergency response. In some embodiments, the two or more ESPs are primary agencies (e.g., PSAPs) and the emergency data has to be shared with one appropriate ESP. To determine the appropriate ESP(s) for sharing emergency data, the authoritative jurisdiction (defined by one or more geofences) of the overlapping ESPs by checking with respective agency, geographical boundaries (national and international borders, county lines, rivers, hills, etc.), sample routing data, etc. In contrast, if the overlapping ESPs include one or more secondary ESPs, the overlap may be retained and emergency data may be shared with one or more ESPs (e.g., one primary agency and two secondary agencies).

In some embodiments, a buffer (e.g., +10 km) is added to the geofence(s) so that results within the buffer zone are also returned. In many cases, PSAPs have discretion and incentive to respond to emergencies that are beyond their authoritative jurisdiction. As an example, a geofence that is a circular area with a radius of 10 km would have an area of 100π or ~314 km2, whereas the same area with a 10 km buffer around its circumference would have yield a combined radius of 20 km and a combined area of 400π or 1256 km2. In some embodiments, the buffer is from 0.5 km to 5 km, from 0.5 km to 10 km, from 0.5 km to 15 km, from 0.5 km to 20 km, from 0.5 km to 25 km, or from 0.5 km to 30 km. In some embodiments, the buffer is from 1 km to 5 km, from 1 km to 10 km, from 1 km to 15 km, from 1 km to 20 km, or from 1 km to 30 km. In some embodiments, the buffer is at least 0.1 km, at least 0.2 km, at least 0.3 km, at least 0.4 km, at least 0.5 km, at least 0.6 km, at least 0.7 km, at least 0.8 km, at least 0.9 km, at least 1 km, at least 2 km, at least 3 km, at least 4 km, at least 5 km, at least 6 km, at least 7 km, at least 8 km, at least 9 km, at least 10 km, at least 11 km, at least 12 km, at least 9 km, at least 14 km, at least 15 km, at least 16 km, at least 17 km, at least 18 km, at least 19 km, at least 20 km, at least 25 km, or at least 30 km. In some embodiments, the buffer is no more than 0.1 km, no more than 0.2 km, no more than 0.3 km, no more than 0.4 km, no more than 0.5 km, no more than 0.6 km, no more than 0.7 km, no more than 0.8 km, no more than 0.9 km, no more than 1 km, no more than 2 km, no more than 3 km, no more than 4 km, no more than 5 km, no more than 6 km, no more than 7 km, no more than 8 km, no more than 9 km, no more than 10 km, no more than 11 km, no more than 12 km, no more than 9 km, no more than 14 km, no more than 15 km, no more than 16 km, no more than 17 km, no more than 18 km, no more than 19 km, no more than 20 km, no more than 25 km, or no more than 30 km.

Figure 4:
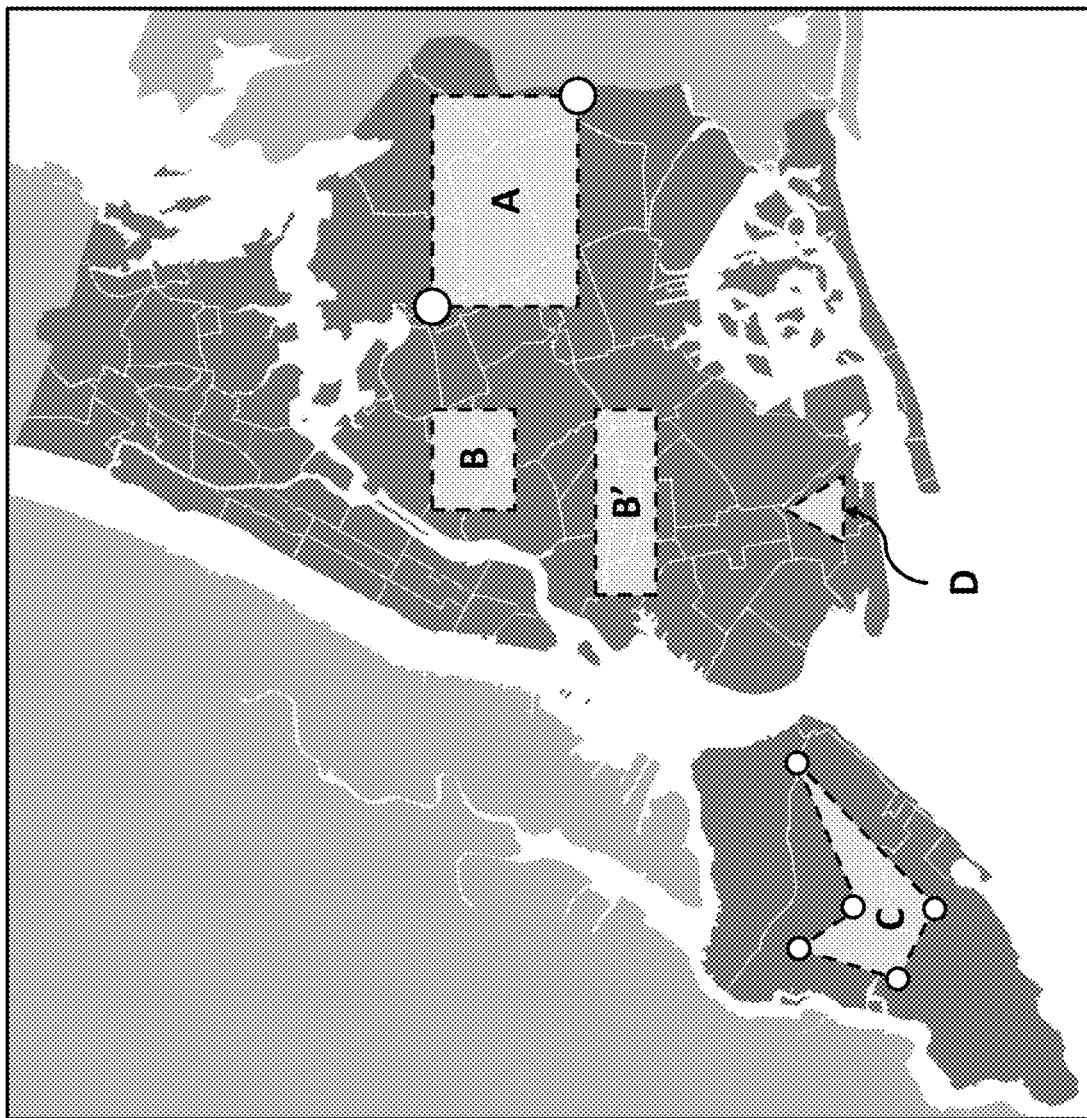
FIG. 4 illustrates a map of non-limiting examples of geofence approximations in accordance with one embodiment of the present disclosure.
Figure 5:
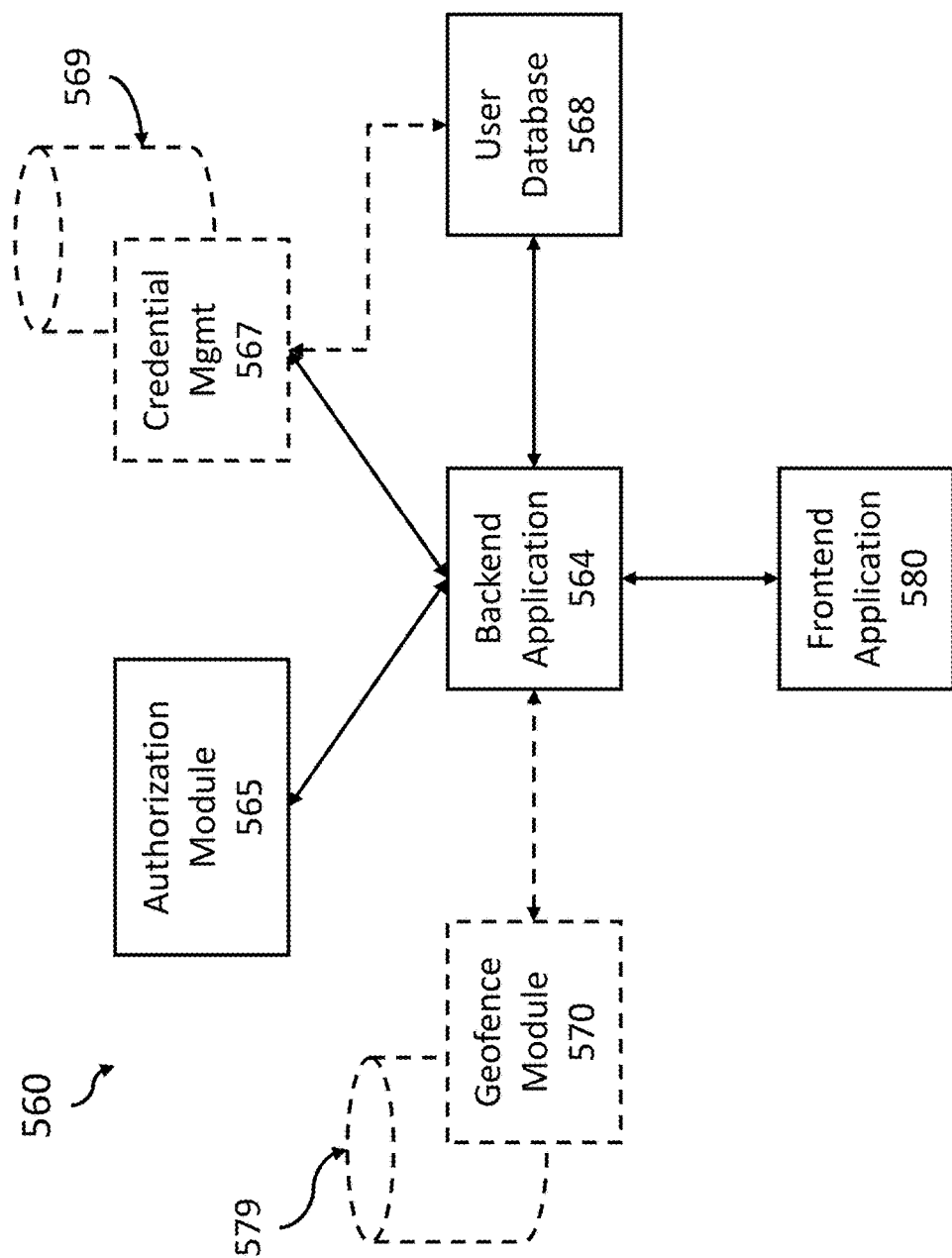
FIG. 5 depicts a diagram of an emergency response application in accordance with one embodiment of the present disclosure.

FIG. 4 illustrates non-limiting examples of geofence approximations that may be submitted as an "authoritative jurisdiction" for an ESP. One or more geofences enclose the geofenced region which is under the authoritative jurisdiction of an ESP. In some cases, the geofenced region may be a complex polygon, but it may be approximated using an appropriate shape. For example, a rectangle (A), two disjointed rectangles (B, B'), a polygon with several sides (C) and a triangle (D), may represent different geofenced regions (defined by one or more geofences).

In some embodiments, an administrator of a PSAP submits the complex authoritative jurisdiction as one or more approximate geofence(s) by specifying points. For example, the PSAP administrator can submit geofenced region A by specifying two points—the north-west corner and the southeast corner using a drawing tool provided by the GUI of an emergency response application. In this example, the two points of the geofenced region are set using two latitude-longitude coordinates. In another example, the multiple-sided polygon C is submitted by specifying the five corners. In some embodiments, a PSAP administrator approximates a geofence for a PSAP by drawing one or more polygons using a drawing tool provided by the GUI of the emergency response application. In some embodiments, a geofence is generated using a series of points that are connected (e.g., entering three longitude-latitude points on a map to form a triangular geofence).

Approximating a complex geofenced region has several advantages. The geofence(s) are simple and the calculations can be quicker and less cumbersome for applications where exact calculations are not needed.

In some embodiments, a PSAP administrator can submit a GIS file (e.g., a shapefile) that represents the actual authoritative jurisdiction of the PSAP, which may then be provisioned in a geofence database. It is appreciated that a GIS file defining the authoritative jurisdiction may be saved in one or more industry-acceptable formats such as a shapefile, a GeoJSON file, KML file, etc. In some embodiments, the GIS file includes one or more features such as points, lines, polygons, density, and other shapes. A GeoJSON is open standard GIS file representing geographical features and non-spatial attributes based on JavaScript Object Notation. Some non-limiting examples of features include points (such as addresses and locations), line strings (streets, highways, and boundaries), polygons (countries, provinces, tracts of land), and multi-part collections of these types. A Keyhole Markup Language (KML) file includes geographic annotations and visualization on internet-based maps on Earth browsers. A shapefile is a vector data format for storing the location, shape, and attributes of geographic features. A shapefile is stored in a set of related files, each of which may contain one feature class (e.g., lines, points, polygons, etc.). In some embodiments, the shapefile is a file with extension .SHP in ESRI file format where SHP is the feature geometry, SHX is the shape index position and DBF is the attribute data.

Various embodiments of the geofence database are contemplated. In some embodiments, one or more databases are searchable using a PSAP identifier, credentials, or other information. In some embodiments, an emergency location is searched through several geofences in the geofence database. In some cases, the geofenced region is shrunk for ease of storage and to simplify calculations.

Emergency Response Application

As mentioned above, in some embodiments, data and information is shared between the emergency management system (EMS) and an emergency service provider (ESP) through an emergency response application. In some embodiments, as described in further detail below, the emergency response application may additionally be provided to an ESP to: a) facilitate communications between the ESP and an emergency caller (e.g., a person requesting emergency assistance) or b) facilitate communications between the ESP and one or more other ESPs. In some embodiments, the emergency response application is a software application either installed on a computing device at the ESP or accessed via the internet through a web browser on the computing device (e.g., the emergency response application is hosted on a cloud computing system by the EMS). Generally, the emergency response application functions to both facilitate a two-way communication link between the EMS and the ESP and visualize data (e.g., emergency data) received by the ESP from the EMS. The emergency response application 560 optionally includes various components, such as a frontend application (hereinafter "graphical user interface" or "GUI") 580, a backend application 564, an authorization module 565, and a user database 568. In some embodiments, the emergency response application 560 additionally or alternatively includes a credential management system 567 or a geofence module 570 (may be include or be otherwise communicatively coupled to a credentials database 569 or a geofence database 579, respectively). In some embodiments, the credential management system 567 and the geofence module 570 are external to the emergency response application 560 and communicatively coupled to the emergency response application 560 (e.g., the credential management system 567 or geofence module 570 can be housed or hosted on a cloud computing system by the EMS). Any or all of the components of the emergency response application 560 may be hosted on a cloud computing system by the EMS, a computing device at an ESP, or some combination thereof.

In addition to one or more jurisdictional boundaries, an ESP account may be associated with one or more transfer rules as described herein. In some embodiments, the emergency response application 560 is a webpage or web application that can be accessed through an internet or web browser. In such embodiments, the emergency response application 560 can be quickly and easily integrated into the systems used by emergency service providers (ESPs), such as public safety answering points (PSAPs), because accessing and using emergency response application 560 requires no additional software or hardware outside of standard computing devices and networks. As previously discussed, one of the greatest hinderances that PSAPs face in providing emergency assistance to people experiencing emergency situations is in acquiring accurate locations of the emergencies and the people involved, because PSAPs are currently typically limited to verbally asking for and verbally receiving locations from callers. In some embodiments, the clearinghouse is capable of receiving accurate locations (as well as additional emergency data, as described above) from electronic devices such as smartphones and delivering the accurate locations to the appropriate PSAPs during emergency situations. Therefore, it is advantageous to provide the emergency response application 560 to PSAPs in the form of a webpage accessible through a standard web browser, in order to provide the potentially life-saving information stored within the clearinghouse to those capable of providing emergency assistance as quickly and easily as possible. However, in some embodiments, the emergency response application 560 is a software application installed on a computing device at an ESP. The emergency response application 560 may be provided by the EMS or by a third-party.

Credential Management & Roles

To ensure the security, privacy and integrity of the data provided to the ESP (e.g., a regional agency), proper authentication may be required at various steps. The authorization process may require the ESP user of the jurisdictional view display (shown in FIG. 6) to verify their identity through the use of credentials such as log-in password, config file (e.g., a configuration created in a third-party system), etc. In some embodiments, the ESP user provides fingerprint, voice command, etc. to log-in, which can be verified.

Various types of credentials may be utilized as a part of the authentication process. Credentials may be generated, stored, verified and validated by the EMS. For example, the credentials may be generated, but must be verified (e.g. phone verification) before use. In some embodiments, the credentials are valid for a specific duration of time (e.g. 1 minute, 5 minutes, 1 hour, 24 hours). Some exemplary credentials that may be used are access keys, admin credentials, time-limited tokens, etc. In some embodiments, credentials are transmitted through secure pathways (e.g. using encryption).

In some embodiments, credentials are used in a two-step authentication process. For example, the authentication may require: (i) a log-in and password for the ESP member (e.g., regional agency user) to log-in the ESP system and (ii) a time-limited token to be generated based on an authentication request. In some embodiments, a role (as described above) may be combined with to create a three-step authentication process. For example, an administrator of the ESP could have designated roles for various ESP members and selected specific data categories to be made accessible for each role.

In contrast to system-generated credentials which must be created, stored and managed in specific ways, roles can be assigned by the admin to each member of the ESP. For example, roles can include admin, agent, call taker, supervisor, manager, etc. In contrast to credentials, roles do not need to be verified by system as they are usually admin-defined. In addition, the admin can update the role of an ESP member to accurately reflect changes in jobs, positions and responsibilities. In this way, the use of the roles allows the admin to customize the management portal to reflect the organizations under their supervision. In some embodiments, an ESP member can have multiple admin-defined roles.

In some embodiments, the credentials are verified when an ESP user logs in to the emergency response application. The credentials have to be valid and not expired. In some embodiments, the ESP member or user is subscribed to the emergency data received within the ESP jurisdiction. In this way, the credential system ensures that emergency data that is relevant for the ESP member is accessible and updates are available quickly and efficiently.

Due to the diversity of types of ESP agencies, the need for accurate and relevant data for their coverage area can be challenging. Although system-defined credentials may also be used to restrict access to emergency data, admin-defined roles were incorporated to allow the customization needed for different regional users (e.g., supervisor/manager v. analyst). In this way, the present system allows for both secure authentication and significant customizations for managing access to emergency data for various members of an ESP agency.

In some embodiments, when an ESP administrator (e.g., a PSAP administrator) requests access to the emergency response application on behalf of the agency (also referred to as an "org") and an organization may be created for agency within the credential management system. Concurrently, an organization identifier (also referred to as an "org ID") is created for the organization (i.e., the PSAP) within the credential management system 567.

When a credential request is granted, a long-lived credential (hereinafter, "credential") is created for the ESP agency within the credential management system 567. In some embodiments, the credential never expires. In some embodiments, the credential expires after an extended period of time, such as a year. In some embodiments, multiple credentials are created for a single organization. As an example, in the event that a credential is compromised, the credential is deactivated, and a new credential is created for the organization. Alternatively, multiple credentials are created for a single organization, and in some embodiments, the credential management system 567 periodically cycles through the credentials by activating one and deactivating the others to provide an additional layer of security.

In some embodiments, whenever an account is created within the emergency response application, the account is stored within an ESP database and populated with information regarding the account, such as a name of the user, associated agency, type of agency (primary, secondary, regional or temporary). In some embodiments, a temporary password is created for and stored with the account in the agency database. An account node may be created within the credential management system 567 and a system ID is generated for the account node. The emergency response application then stores the system ID in the account stored within the ESP database. In this way, the system ID serves as a link between an account stored within the ESP database and a correlated account node stored within the credential management system. An emergency response application then requests information regarding an account node stored within the credential management system using the system ID associated with the account node, as described below. In some embodiments, organizations, organization IDs, users, and system IDs, and credentials are stored within a credential management system database. In some embodiments, the credential management system is a software module included in the EMS. In some embodiments, the credential management system is a third-party service. As an example, an API management service, such as Apigee, is used as a credential management system.

In some embodiments, the communication device (or communication module of the device) communicates with a recipient through one or more data channels. In some embodiments, the recipient is an emergency management system. In some embodiments, the EMS routes communications to an appropriate ESP using a routing map based on jurisdictional boundaries (e.g., geofences) as described in reference to FIGS. 3 & 4.

Figure 6:
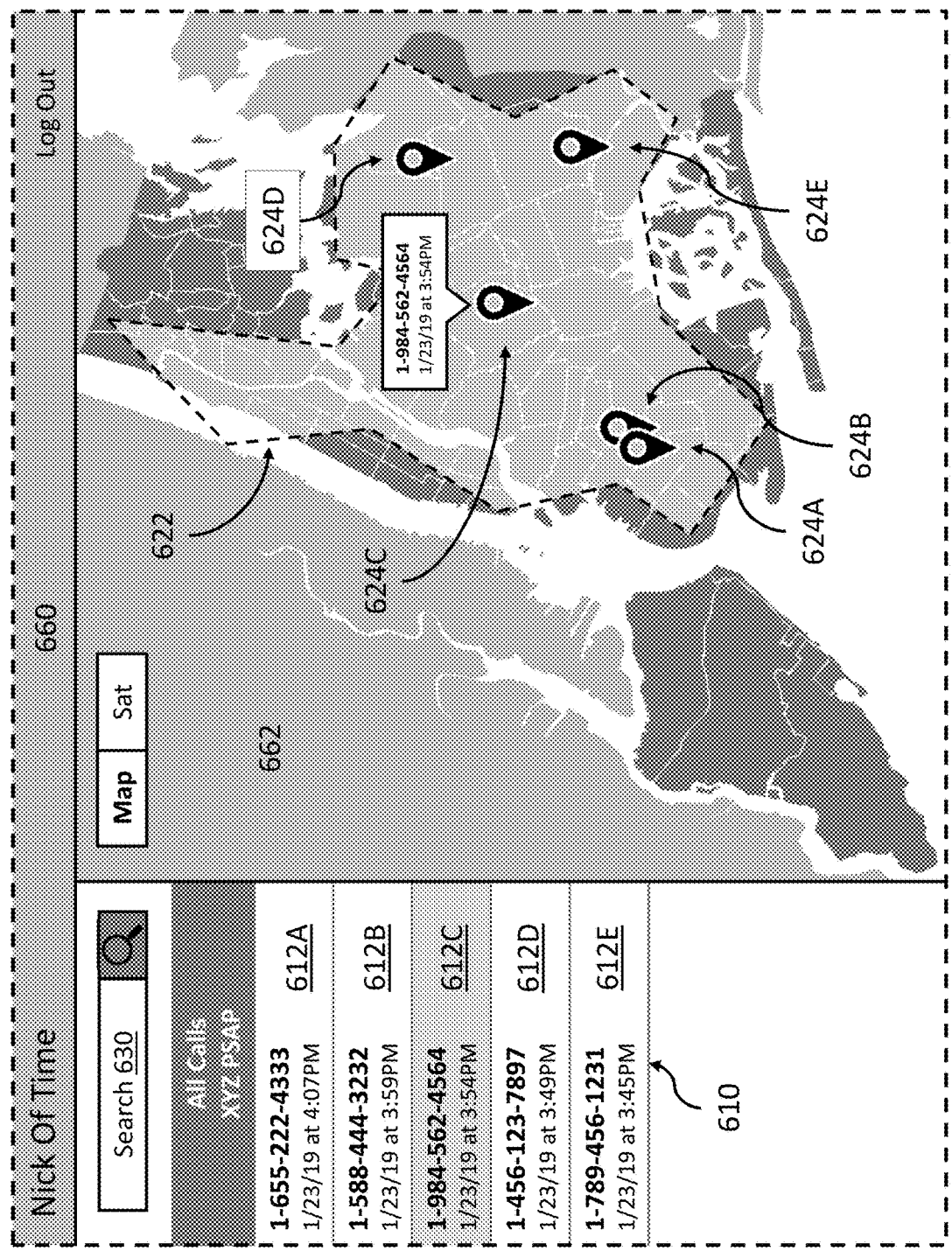
FIG. 6 illustrates an example of a graphical user interface (GUI) of an emergency response application in accordance with one embodiment of the present disclosure.

FIG. 6 illustrates an embodiment of a graphical user interface (GUI) provided by an emergency response application 660. The dashboard is a page within the GUI that provides interactive elements that allow a user at an ESP to receive data from the EMS, visualize data received from the EMS, and transmit data to the EMS. For example, in some embodiments, the dashboard includes an entry field 630 through which a user can submit a device identifier, such as by typing or pasting the device identifier into the entry field 630. In some embodiments, after submitting a device identifier through the entry field 630, the user can prompt the emergency response application to generate and send an emergency data request by selecting a search button. The emergency response application 660 then generates an emergency data request including the device identifier and any other necessary information (e.g., a temporary access token) and transmits the emergency data request to the EMS. The EMS can then return any available emergency data associated with the device identifier to the emergency response application 660, as described above and below. In another example, in some embodiments, the emergency response application 660 can automatically receive emergency data from the EMS for emergencies relevant to an ESP (e.g., emergencies located within the jurisdiction of the ESP) without requiring a user to generate an emergency data request, as described above and below. After receiving emergency data from the EMS, the emergency response application 660 can then visualize the emergency data within the GUI of the emergency response application 660. For example, in some embodiments, the emergency response application 660 includes a list of incidents 610 and an interactive map 662, as illustrated by FIG. 6. As shown, in some embodiments, when the emergency response application 660 receives a location (e.g., an emergency location) and a device identifier associated with an emergency occurring within the jurisdiction 622 of the receiving ESP, the emergency response application 660 displays the location associated with the emergency within the interactive map 662 as a location marker 624 (also referred to as an "incident location") and displays the device identifier associated with the emergency within the list of incidents 610 as an incident 612.

In addition to emergency locations, the emergency response application 660 can receive and visualize numerous types of emergency data from the EMS. For example, the emergency response application 660 can receive additional data regarding an emergency, such as demographic or medical data associated with a person involved in the emergency (e.g., an emergency caller). In another example, the emergency response application 660 can receive data from sensors associated with the emergency, such as heart-rate data collected by a sensor on an emergency caller's smartwatch. Or, for example, the emergency response application 660 can receive data regarding emergency response assets available for an emergency, as described below. In some embodiments, the emergency response application receives and visualizes messages received from emergency callers or other ESPs, as described below. The emergency response application 660 can visualize any emergency data received from the EMS within the GUI of the emergency response application.

Emergency Data Transmission—Requests & Subscriptions

Figure 7A:
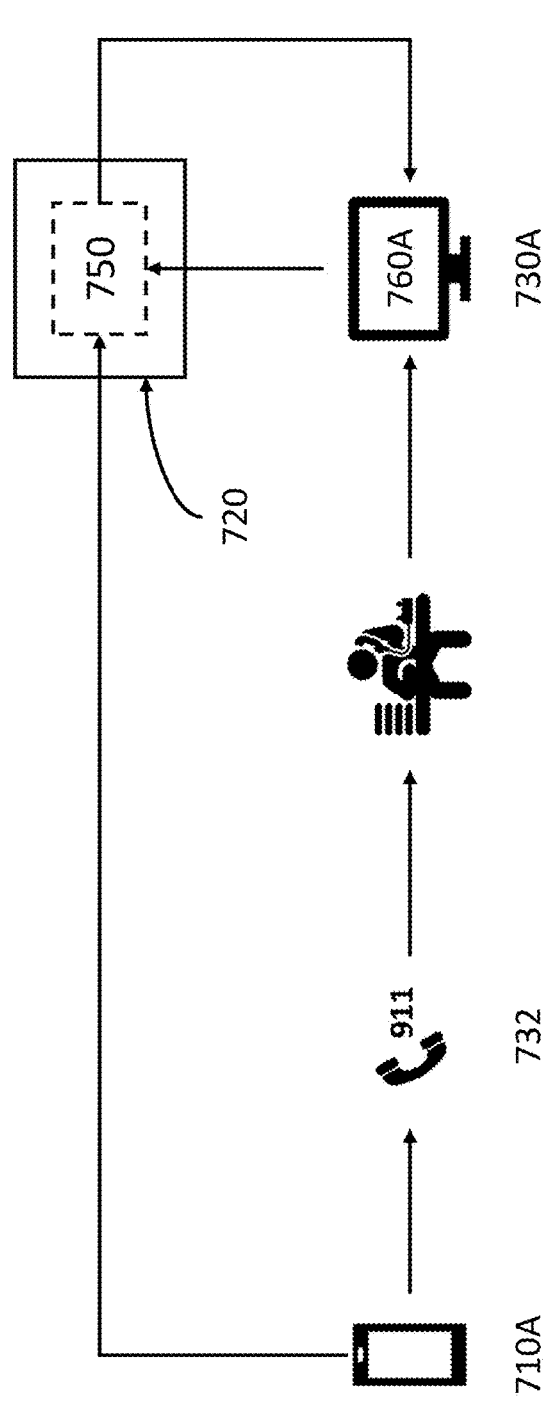
FIG. 7A and FIG. 7B depict flow diagrams of methods for providing emergency response assistance by an emergency management system (EMS) in accordance with some embodiments of the present disclosure.
Figure 7B:
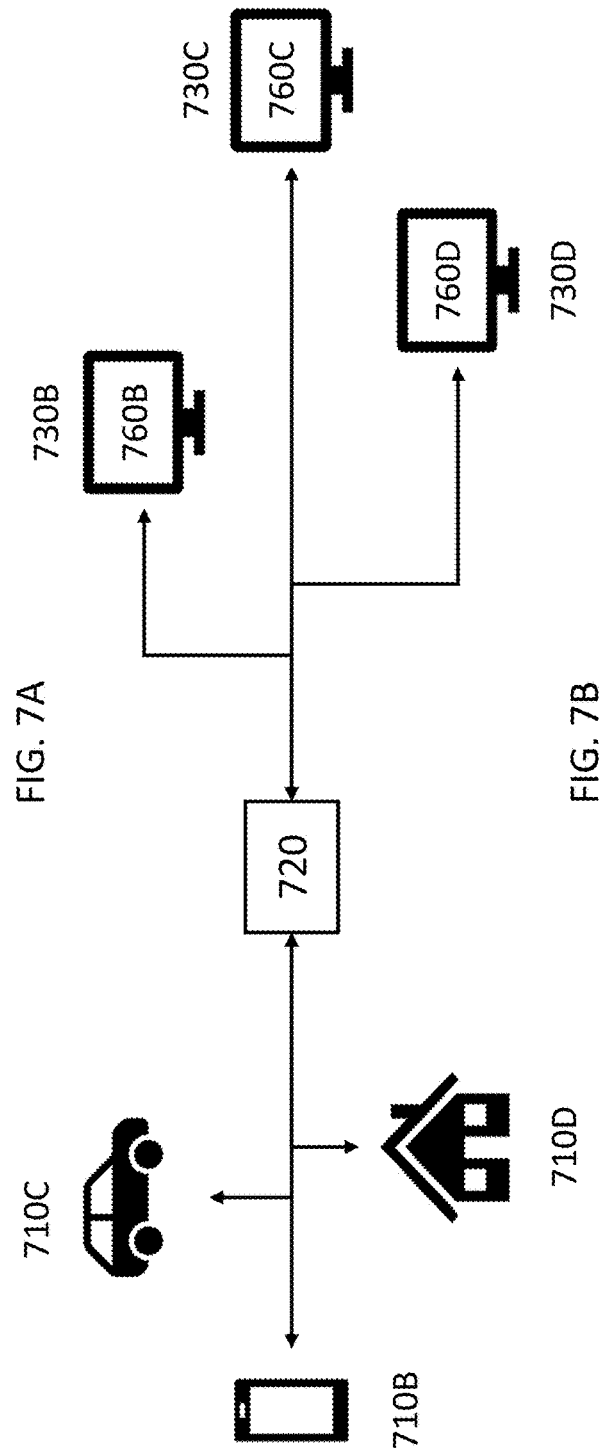

FIGS. 7A and 7B depict systems and processes for receiving and transmitting emergency data by an emergency management system in accordance with some embodiments of the present disclosure. As described above, in some embodiments, an emergency management system (EMS) maintains a clearinghouse that obtains and shares emergency data to aid emergency service providers (ESPs) in responding to emergencies. For example, as depicted in FIG. 7A, during an emergency, an ESP 730A can send an emergency data request to the EMS 720 (e.g., through an emergency response application 760A) for a particular emergency, and, in response, the EMS 720 can send any available emergency data associated with the emergency back to the emergency response application 760A. In some embodiments, as described above, the emergency response application 760A includes an identifier associated with an emergency alert in the emergency data request. The EMS 720 can then use the identifier associated with the emergency alert to retrieve emergency data associated with the emergency alert from the clearinghouse 750. For example, as described above, an ESP 730A (e.g., a public safety answering point (PSAP)) can receive an emergency alert in the form of a 9-1-1 phone call 732 (representative of an emergency or potential emergency) from a mobile phone 710A associated with a phone number (e.g., (555) 555-5555). The ESP 730A can then send an emergency data request including the phone number (i.e., the identifier associated with the emergency alert) to the EMS 720, which can then retrieve any emergency data within the clearinghouse 750 associated with the phone number and return the available emergency data to the requesting ESP 730A. This process of returning emergency data to an ESP in response to an emergency data request is referred to as "pulling" emergency data from the clearinghouse.

As described above, in some embodiments, the emergency management system (EMS) can "push" emergency data from the Emergency Clearinghouse to emergency service providers (ESPs), such as by using an emergency data subscription system (hereinafter, "subscription system"). FIG. 7B depicts a flow diagram of a process for pushing emergency data from the Emergency Clearinghouse to one or more ESPs. In some embodiments, a member of an ESP (e.g., a PSAP staff member) logs into the emergency response application 760B at an ESP console 730B (e.g., a computing device associated with the ESP) by accessing the emergency response application 760B (e.g., by navigating to the emergency response application 760B through a web browser) and submitting their login information through the GUI of the emergency response application 760B. In some embodiments, when the ESP member logs into the emergency response application 760B by submitting their login information, the emergency response application 760B or EMS 720 then determines an ESP account ID associated with the ESP member's account and establishes a persistent or active communication link (e.g., a websocket connection) with the ESP console 730B, thereby automatically subscribing the ESP console to the ESP account ID for the duration of their login session. Then, as described above, when the EMS 720 receives an emergency alert including a location (e.g., when an emergency call is made from an electronic device 710B and sends an emergency alert to the EMS 720 including a location generated by the electronic device 710B), the EMS 720 retrieves a geofence associated with every ESP registered with the EMS 720 and determines if the location falls within any of the geofences. In response to determining that the location falls within a geofence associated with the ESP associated with the ESP account ID, the EMS 720 then associates the location with the ESP account ID, determines if there are any active or persistent communication links between the EMS 720 and any computing devices subscribed to the ESP account ID. In this instance, because the ESP console 730B is subscribed to the ESP account ID and actively linked to the EMS 720 through the persistent or active communication link, the EMS 720 automatically pushes (e.g., from the clearinghouse) the emergency alert or emergency data associated with the emergency alert (e.g., the location, a phone number, etc.) to the ESP console 730B for display within the emergency response application 760B. In some embodiments, emergency alerts or emergency data associated with emergency alerts that have been pushed to an ESP are displayed within a jurisdictional awareness view, as described below.

For example, ESP console 730B and ESP console 730C are two different ESP consoles associated with the same ESP (e.g., two computing devices at the same public safety answering point (PSAP)), PSAP A. ESP console 730D is associated with a second ESP, PSAP B. One day, PSAP call-takers access and successfully log into the emergency response application 760 (emergency response application 760D-760D) at each of the three ESP consoles (ESP console 730B-730D), thereby establishing three separate active communication links, one active communication link between the EMS 720 and each of the three ESP consoles. The ESP consoles are automatically subscribed by the EMS 720 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap. The geofences have previously been tagged within the EMS 720 with their respective ESP account IDs (e.g., during a registration process for the emergency response application).

Later that day, an emergency call is made from communication device 710B, which causes communication device 710B to generate a first emergency alert including a first location of the communication device 710B and transmit the first emergency alert to the EMS 720. When the EMS 720 receives the first emergency alert, the EMS 720 retrieves some or all of the geofences stored within the EMS 720 and determines if the first location falls within any of the geofences stored within the EMS 720. In this example, the EMS 720 determines that the first location falls within geofence A, associated with PSAP A. In response, the EMS 720 tags the first location with the ESP account ID associated with geofence A, ESP ID A. The EMS 720 then determines if there are any active communication links between the EMS and any ESP consoles subscribed to ESP ID A and automatically pushes (e.g., from the clearinghouse) the first emergency alert to those ESP consoles. In this example, both ESP console 730B and ESP console 730C are subscribed to ESP ID A, so the EMS 720 automatically pushes the first emergency alert to both ESP console 730B and ESP console 730C for display within emergency response applications 760B and 760C, respectively, such as through a jurisdictional awareness view (as described below). The first location does not fall within geofence B, because geofence A and geofence B do not overlap, so the first emergency alert is not pushed to ESP console 730D, even though an active communication link has been established between the EMS 720 and ESP console 730D.

Three minutes later, the EMS 720 receives an emergency alert from electronic device 710D (e.g., a home security system) including a second location of the electronic device 710D. When the EMS 720 receives the second emergency alert, the EMS again retrieves some or all of the geofences stored within the EMS 720 and determines if the second location falls within any of the geofences stored within the EMS 720. In this example, the EMS 720 determines that the second location falls within geofence B, associated with PSAP B. In response, the EMS 720 tags the second location within the ESP account associated with geofence B, ESP ID B and automatically pushes the second emergency alert to ESP console 730D for display within emergency response application 760D, because ESP console 730D has an active communication link established with the EMS 720 and ESP console 730D is subscribed to ESP ID B. The EMS 720 does not push the second emergency alert to ESP console 730B or ESP console 730C. Although ESP console 730B and ESP console 730C have active communication links established with the EMS 720, they are not subscribed to ESP ID B, and geofence A and geofence B do not overlap, meaning the second location does not fall within geofence A. Two minutes after that, the EMS 720 receives an emergency alert from electronic device 710C (e.g., an intelligent vehicle system) including a third location of the electronic device 710C. The EMS 720 determines that the third locations falls within geofence A (like the first location included in the first emergency alert) and thus automatically pushes the third emergency alert to both ESP console 730B and ESP console 730C for display within emergency response application 760B and 760C. In some embodiments, emergency response application 760B and emergency response application 760C display the first emergency alert and the third emergency alert simultaneously, such as through a jurisdictional awareness view, as described below.

Jurisdictional Awareness View

Typically, as mentioned above, emergency service providers (ESPs; e.g., public safety answering points) are only capable of receiving verbal requests for emergency service (hereinafter, "traditional emergency service requests") through telephone calls. For example, typically, when a person in the United States experiences an emergency, they must dial 9-1-1 using a telephone to be connected to emergency service providers. Then, after dialing 9-1-1 and being connected to an emergency service provider, they must verbally relay the nature of their emergency as well as any additional relevant information (such as their location or medical history) to the emergency service provider over the phone. In one implementation to reduce verbal communications, emergency data regarding the emergency can be transmitted to the appropriate ESP through an alternate pathway while the emergency call is transmitted through traditional pathways (see FIG. 6).

In some embodiments, the systems, applications, servers, devices, methods, and media of the instant application provide a jurisdictional awareness view within the emergency response application. In some embodiments, the jurisdictional awareness view enables an ESP to view one or more ongoing or recently received emergency alerts (e.g., emergency calls) within one or more geofenced jurisdictions. FIG. 6 illustrates the jurisdictional awareness view displayed within the emergency response application. In some embodiments, the jurisdictional awareness view includes a list of incidents 610 that displays one or more incidents 612 associated with one or more device identifiers (e.g. phone numbers, IP addresses). In some embodiments, the jurisdictional awareness view additionally or alternatively includes an interactive map 620 that displays one or more incident locations 624 associated with the one or more incidents 612 associated with the one or more device identifiers, as described below. In some embodiments, the jurisdictional awareness view displays incidents and incident locations only for emergencies occurring within the jurisdiction 622 of the ESP at which the emergency response application 660 is being accessed.

For example, in the example illustrated in FIG. 6, an ESP has accessed an emergency response application 660 provided by the EMS. In this example, the EMS has pushed emergency data associated with five different emergency alerts to the ESP (as described above) through the emergency response application 660. Accordingly, the emergency response application displays five different incidents 612 (e.g., incidents 612A-612E) within the list of incidents 610 and five corresponding incident locations 524 (e.g., incident locations 524A-524E) within the interactive map 662. As illustrated by FIG. 6, in some embodiments, incidents 612 and incident locations 624 may be selected or hovered over to highlight a particular incident 612. In this example, incident 612C and its corresponding incident location 624C have been selected and highlighted. In some embodiments, selecting a particular incident 612 or corresponding incident location 624 prompts the emergency response application 660 to display additional information associated with the particular incident 612 (e.g., additional emergency data or information associated with the emergency alert for which the particular incident 612 was created). Because the jurisdiction view can show an ESP numerous incidents 612 occurring within the jurisdiction 622 of the ESP simultaneously, the jurisdiction view can provide the ESP with situational awareness that the ESP otherwise would not have. For example, with the knowledge that incidents 612A and 612B originated in close proximity and at approximately the same time, an ESP personnel (e.g., a call taker at a public safety answering point) can determine that the two incidents may be related.

Enhanced Emergency Service Provider (ESP) Communications

Figure 8:
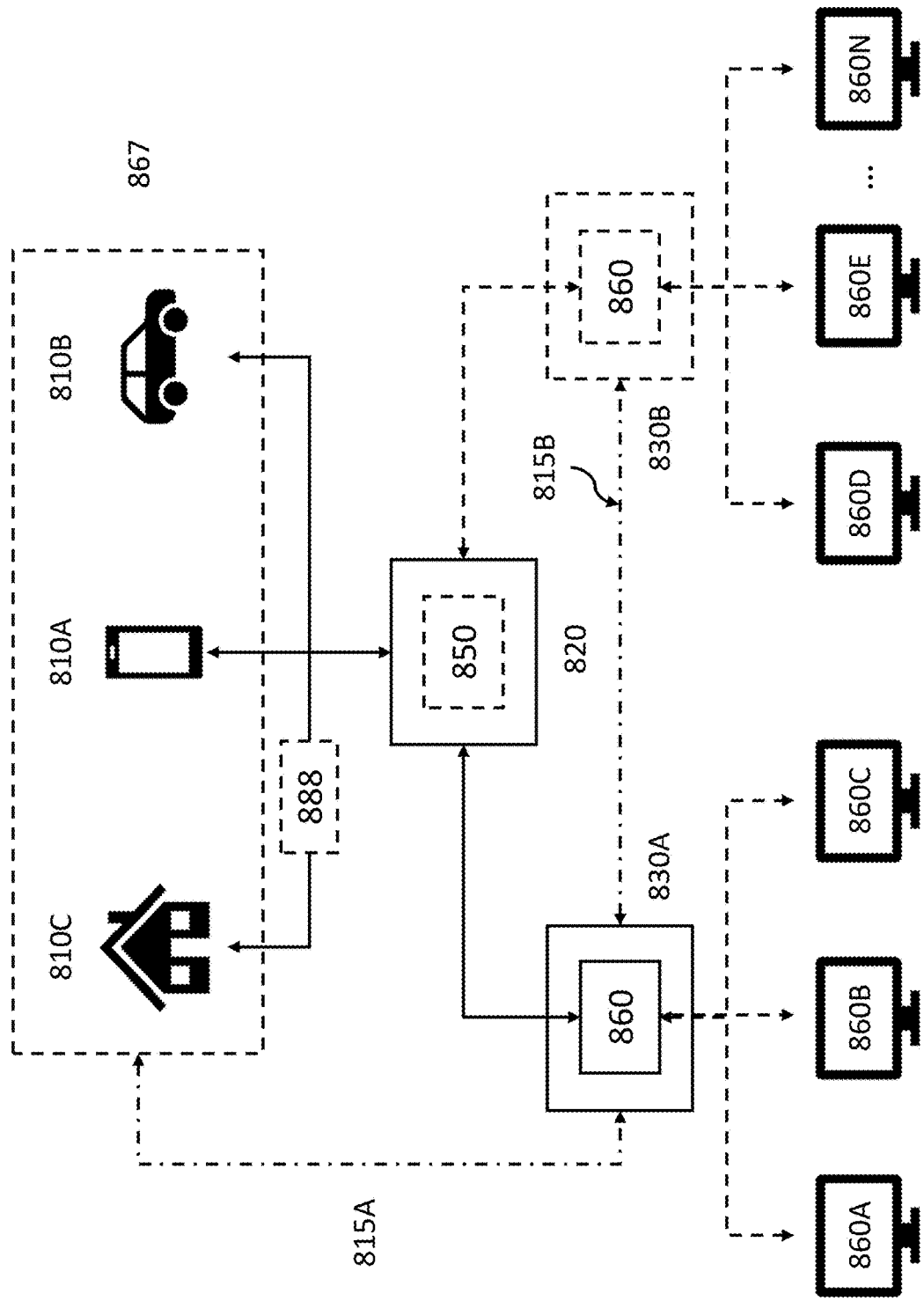
FIG. 8 depicts a diagram of a system for facilitating enhanced ESP communications in accordance with one embodiment of the present disclosure.

As mentioned above, in some embodiments, an emergency management system (EMS) provides an emergency response application to an emergency service providers (ESP) in order to facilitate communications (hereinafter, "ESP communications") between a) the ESP and an emergency caller (e.g., a person requesting emergency assistance) or b) the ESP and one or more other ESPs. FIG. 8 depicts a diagram of a system for facilitating ESP communications by an EMS. As depicted in FIG. 8, in some embodiments, an emergency management system (EMS) 820 (which may include an emergency clearinghouse 850, as described above) is communicatively coupled to one or more alert sources 867 (e.g., mobile phone 810A, vehicle telematics system 810B, or home security system 810C) and one or more emergency service providers (ESPs) 830. As described above, in some embodiments, when an alert source 867 generates an emergency alert, the alert source 867 transmits the emergency alert (and any associated emergency data) to the EMS 820. In some embodiments, the emergency alert (and any associated emergency data) is first received by an alert aggregator 888 before being forwarded to the EMS 820. In parallel to transmitting the emergency alert to the EMS 820, the alert source 867 may also transmit a notification (e.g., an emergency call) directly to an ESP 830. Once the EMS 820 has received the emergency alert (and any associated emergency data), the EMS 820 can transmit the emergency alert (and any associated emergency data) to an appropriate ESP 820, as described in detail above.

As described above, in some embodiments, the EMS 820 additionally provides an emergency response application 860 that can be accessed and utilized by the one or more ESPs 830 for the purpose of visualizing emergency data. An individual ESP 830 may have one or more computing devices (e.g., multiple workstations for multiple call-takers) that may each access an instance of the emergency response application 860. For example, as depicted in FIG. 8, a first ESP, ESP 830A, includes three computing devices, each of which can access its own instance of the emergency response application: a first instance (emergency response application 860A), a second instance (emergency response application 860B), and a third instance (emergency response application 860C), respectively. Or for example, as depicted in FIG. 8, a second ESP, ESP 830B, includes an indefinite number of computing devices each accessing its own instance of the emergency response application: a fourth instance (emergency response application 860D), a fifth instance (emergency response application 860E), up through an nth instance (emergency response application 860N). Individual instances of the emergency response application 860 may be accessed at different times or simultaneously. As depicted by FIG. 8, the EMS 820 thus effectively functions as a central hub between an alert source 867 and an ESP 830 as well as two or more ESPs 830. By virtue of being communicatively coupled to both an alert source 867 and an ESP 830, the EMS 820 can establish an indirect communication link 815A between the alert source 867 and the ESP 830. Similarly, by virtue of being communicatively coupled to both a first ESP (e.g., ESP 830A) and a second ESP (e.g., ESP 830B), the EMS 820 can establish an indirect communication link 815B between the first and second ESPs.

Types of ESP Agencies

Often, various ESP agencies work together to respond to an emergency. Currently, interagency communication is challenging due to software incompatibility, legacy infrastructure and variability in how different agencies are setup and operated. As a result, communication and coordination between agencies, even neighboring agencies can be difficult. Traditionally, many agencies communicated verbally with other agencies and did not have ability to communicate via text-based channels. Disclosed herein are systems, methods, apparatus for text-based communication between agencies designed to enhance effective and efficient emergency response. In some embodiments, the ability to share multimedia files or share links to the same are also disclosed. For this purpose, the EMS 930 can allow sharing and broadcast of emergency incidents, transfer of incidents, and chat capabilities.

Figure 9:
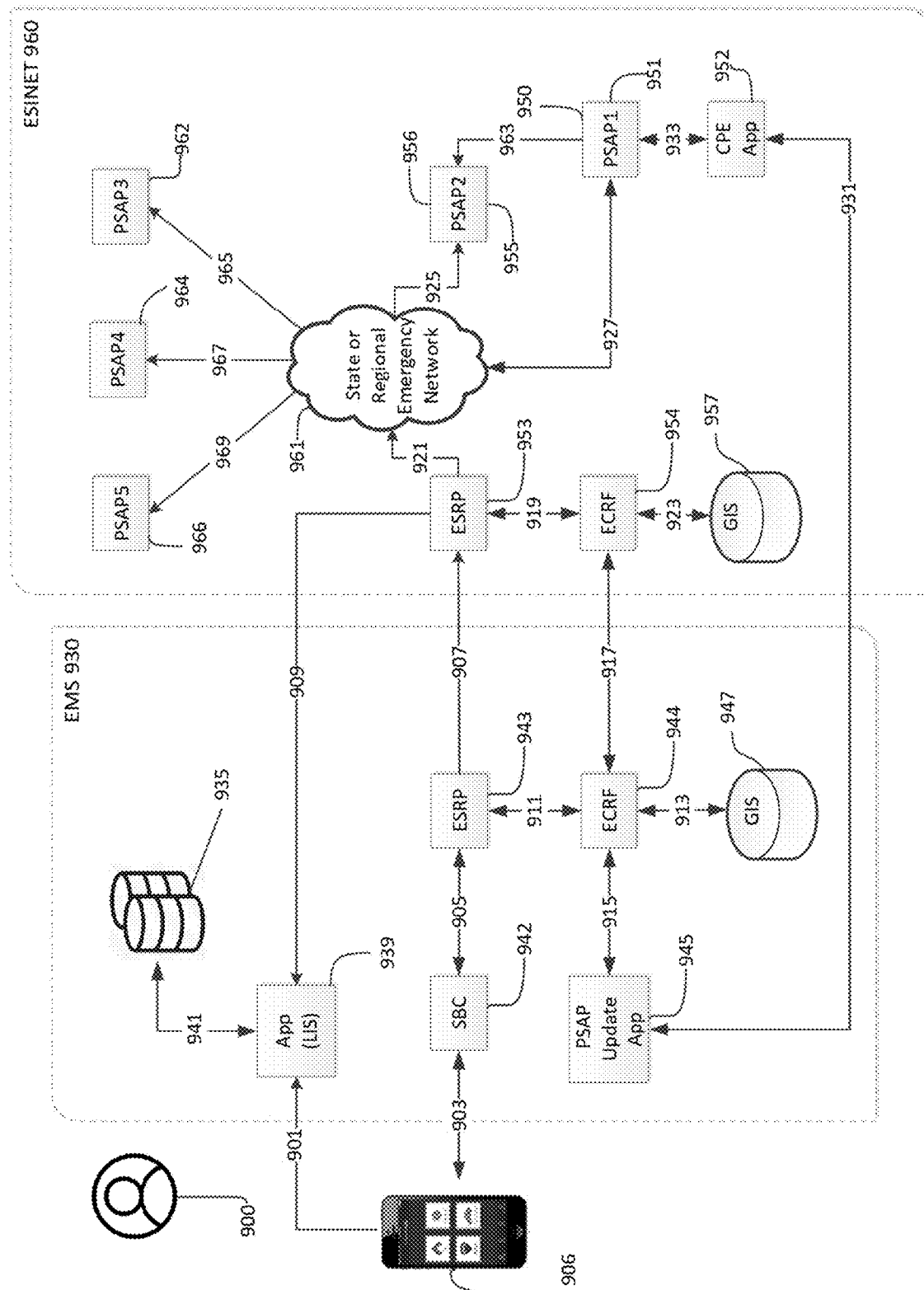
FIG. 9 illustrates how emergency calls are routed to a primary ESP agency (PSAP1) and transferred to another primary ESP agency (PSAP2)

As shown in FIG. 9, a regional agency (such as a state emergency management entity 925) may be responsible for planning and overseeing PSAP 1 (950), 2 (955) and 3 (962) (in some embodiments, a PSAP is considered to be a "primary agency" or a "primary emergency response agency"). In addition, PSAP 1, 2 and 3, may dispatch to one or more secondary agencies (also referred to as "non-primary emergency response agencies" or "secondary emergency response agencies") for responding to emergencies within the coverage area of the regional agency. In some cases, a primary agency (e.g., PSAP 1) may select an appropriate secondary agency to respond to the emergency. In some embodiments, a federal agency such as the Center for Disease Control (CDC) is planning and overseeing various state and local ESP agencies for dealing with outbreak of infectious diseases.

In some implementations, the emergency service request, such as an emergency call, may be retained by the primary agency while the secondary agency dispatches emergency responders to the emergency location. Specifically, an emergency service request may be dispatched from a primary to a secondary agency following one or more delegation rules as described below. In other implementations, the emergency service request, such as an emergency call is transferred to the appropriate secondary agency based on emergency location, type and priority of the emergency, availability and capabilities of the secondary agency.

A primary agency may be responsible for handling emergency service requests (such as traditional emergency calls and digital requests) within an "authoritative jurisdiction", which may be defined by one or more geofences. A buffer region beyond the geofence may be between 1-20 miles, preferably 10 miles beyond the geofence boundary. In some cases, the ESP may have the option to respond to emergencies in the buffer region, but may not be required to do so ("optional jurisdiction").

A non-primary agency may be a secondary agency or other agency. A non-primary agency may be associated with one or more geofences, which defines the area of operation, but the service request regarding an emergency is initiated by a primary agency, which may be responsible for answering calls and service requests within its authoritative jurisdiction.

In addition, other types of ESP agencies are also contemplated. For example, ESPs may be temporarily set up to address a particular threat or a natural disaster, such as a command center to respond to a hurricane. The constituting ESP agencies for such as "temporary ESP agency" may be the area that might be impacted by the threat or natural disaster. It is also contemplated that ESP agencies may be both public and private entities such as corporate security, university police, call center, etc.

For example, PSAP 1 may be NYPD, which is a primary agency responsible for handling 911 calls in New York city. Depending on the location and type of emergency, the NYPD will transfer the emergency call to various secondary agencies. For fire emergencies, the emergency call may be transferred to FDNY for dispatching firefighters to the emergency location. In addition, the present system allows one or more mechanism to transfer the emergency service request to another ESP agency for dispatch (also referred to as "interagency delegation") as described in reference to FIG. 10B.

In another example, an emergency service request may need to be transferred from one ESP to an "appropriate ESP." As shown in FIG. 9B, the emergency request can be transferred from one primary ESP to another primary ESP. In some cases, the emergency call may be misrouted to a wrong PSAP for various reasons, as described in relation to FIG. 10A. In some cases, the location of the emergency may be changing, as described in relation to FIGS. 10A & 10B.

For traditional emergency service requests, the current location data may be used for routing the emergency call or emergency session. As depicted in FIG. 9, an emergency call received at a switch in a selective routing database (SRDB) is routed to an appropriate ESP (here, referred to as an emergency dispatch center (EDC)). In some embodiments, the EMS 930 includes an ECRF for routing the call based on jurisdictional boundaries provided in a GIS database 947 (also referred to as the "geofencing system"). For example, in some embodiments, the database 935 provides the EMS 930 with an indication or warning that the user and the communication device 906 are moving (or will soon move, e.g., within the next 1, 5, or 10 minutes) from the service area of PSAP 1 (950) (with dispatcher system 951) into the service area of PSAP 2 (955) (with dispatcher system 956). In some embodiments, once the EMS 930 receives the information about PSAP 2 (955), the EMS 930 uses an ECRF (not shown) to identify appropriate PSAP 2 (955) as the appropriate EDC.

Delegation Rules

Various ESP agencies may have to transfer emergency service requests to other ESP agencies following some delegation rules. In some embodiments, the EMS 230 acts based on a set of delegation rules depending on various factors such as state or regional laws, standard operating procedures, type of emergency service request, ESP system capabilities, etc.

For example, for dispatching responders (i.e., delegation), the location and type of emergency may be instructive. The service request has to be transferred to an ESP agency with the capability to respond to that type of emergency. For example, if it is a medical emergency, the ESP agency must have medical capabilities.

As another example, the emergency call is transferred to the second PSAP (e.g., via a VoIP call), if the first PSAP has not answered the call. In further embodiments, there is a timer that must elapse before the call is transferred to another EDC (e.g., another agency) when the first PSAP has not answered the call. In some embodiments, the EMS 930 initiates an emergency call or emergency session with PSAP 1 (950) via communication link 926. Even when there is minimal integration with first PSAP, in some embodiments, the EMS 930 monitors the emergency call using SIP signals for a VoIP call on link 926. Specifically, if the SIP responses indicate that the emergency call has not been successfully connected to PSAP 1, in some embodiments, the emergency call is transferred to PSAP 2 (955) via communication link 936. In some embodiments, SIP signals or response codes indicate that the emergency call has not been connected, and include, for example, "provisional responses" (e.g., 100 Trying, 180 Ringing, 181 Call is being forwarded, 182 Queued, etc.), "redirection responses", "client failure responses", "server failure responses", and/or "global failure responses". For example, as shown in FIG. 10B, when a vehicle is crossing a jurisdictional border, in some embodiments, the EMS 930 detects a PSAP change. In some embodiments, if the call has not been answered at PSAP 1, it is transferred to a neighboring PSAP 2 to ensure that emergency response is dispatched quickly.

In some cases, the emergency call is transferred when the appropriate PSAP (e.g., PSAP 1) has not answered even after a timer delay has passed, e.g., 5, 10, 20, 30, 40, 50, 60 seconds. The EMS 930 uses various methods to identify and assign the emergency call to another PSAP (e.g., PSAP 2) including proximity to the emergency, type of emergency, severity of the emergency, resources available to the new PSAP, or state or regional laws and policies. In some embodiments, the closest PSAP to the emergency location in the same regional or state network is preferred. In some embodiments, some PSAPs may designate neighboring PSAPs as backup or overflow resources, where the call will be diverted to if the PSAP does not answer or the lines are busy.

Figure 10A:
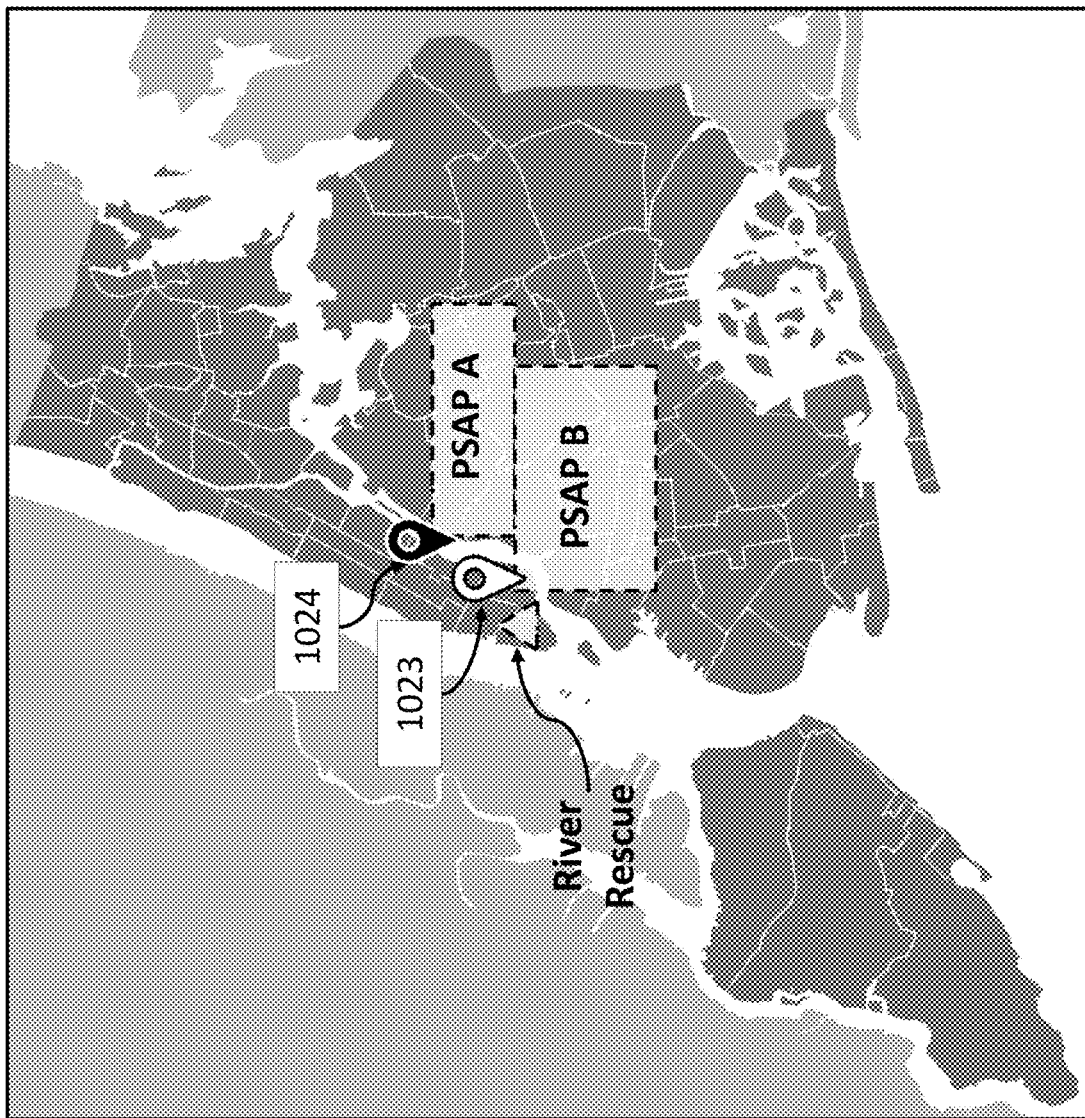
FIG. 10A and FIG. 10B illustrate exemplary graphical user interface (GUI) of an emergency response application for dispatching, transferring or sharing data about an emergency.
Figure 10B:
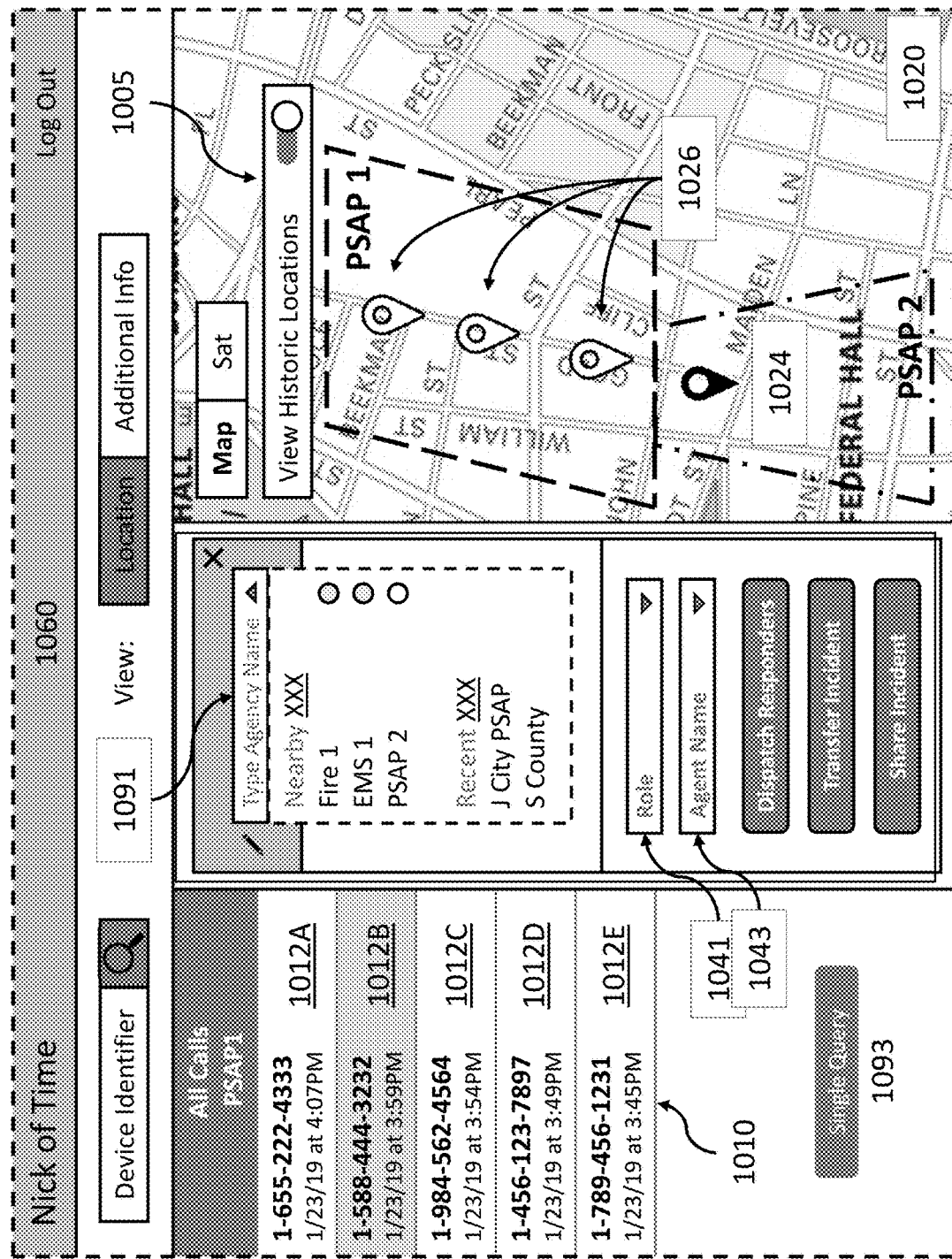

FIGS. 10A & 10B illustrate various examples of an enhanced ESP communication interagency function. As shown in FIG. 10A, an emergency service request in the form of emergency call has come to PSAP B. The cellular network has determined the location to be 1023, which is on one side of River A and within the jurisdictional area of PSAP B.

While on the call, a call taker in PSAP B clicks on the user identifier (e.g., 1012B in FIG. 10B) and gets an updated location 1024 of the emergency, which is nearer to the jurisdiction of PSAP A. If the person is in the River A and needs rescue, the appropriate ESP may be River Rescue. To ensure that the other two ESPs—PSAP A and River Rescue is aware of the emergency, the call taker finds the nearby agencies within the emergency response application (as shown in FIG. 10B) and presses the "Share Incident" button to share the location of the emergency with PSAP A and River Rescue. In this case, an administrator in PSAP A may have authorized sharing of incidents to PSAP A and River Rescue as they are neighboring agencies. In some embodiments, PSAP B can also view the jurisdictional boundaries of PSAP A and River Rescue.

When the call comes in, the caller indicates that he is stranded on a lifeboat in the river and River Rescue is needed. If the delegation rules allow, the call taker can "dispatch responders" from River Rescue. Otherwise, the transfer emergency function will allow the emergency request to be transferred to River Rescue, wherein the emergency call is transferred via a VoIP call. Although the CAD system for PSAP A is not compatible with River Rescue, the emergency data (including call notes) can be shared via CAD-to-CAD transfer via the EMS, which will convert the data into a format that can be accessed by other CAD systems.

Referring to FIG. 10B, an abduction attempt is on-going within a moving vehicle traveling from PSAP 1 to PSAP 2. Initially, the emergency alert was triggered by a driver in the vehicle and the alert was routed to PSAP 1 based on a historical location 1026. In PSAP 1, an ESP personnel accepts the emergency alert and notices that the emergency location is moving along a trajectory following a major road in the city. The current location 1024 indicates that the emergency is outside the jurisdiction of PSAP 1, and emergency response cannot be dispatched (by selecting the "Dispatch Responders" button).

As a follow-up, the ESP personnel views the boundary of PSAP 2, which is a pre-approved ESP for sharing data and confirms visually that the emergency is within its jurisdictional boundary. The system allows the ESP personnel to select the incident (emergency alert from 1-588-444-3232) and share with a pre-approved list of agencies using the "Share Incident" button. The list of agencies for sharing emergency incidents may be limited to less than 10, preferably 5 or less.

In some embodiments, PSAP 1 can transfer the incident to PSAP 2 by transferring responsibility for the response to PSAP 2. The system may check if PSAP 2 is online and available to receive the incident. In some embodiments, PSAP 2 has a limited amount of time to accept the incident and respond to the emergency.

It is contemplated, that there could be designated person(s) within PSAP 2 for receiving emergency data on behalf of an agency. Alternatively, all ESP users associated with the agency may receive the emergency data. In some embodiments, the ESP user in PSAP 2 can be specified for sharing or transferring the emergency incident. In some embodiments, the role of the ESP user such as call taker, dispatcher, supervisor, admin can be specified and all ESP users with that role may receive the data.

Incident Sharing

As mentioned above, there are many instances in which a first emergency service provider (ESP) would be interested in communicating and/or sharing emergency data with a second ESP. For example, when responding to a large-scale emergency (e.g., a mass emergency), an ESP may wish to request additional emergency response resources from other ESPs. Or for example, when responding to an emergency that moves from within the jurisdiction of a first ESP into the jurisdiction of a second ESP, the first ESP may wish to share the details of the emergency with the second ESP. However, as mentioned above, tools currently used for ESPs to communicate with one another lack sophistication and flexibility. Described herein are methods and systems for ESPs to communicate and share emergency data more effectively.

Figure 11A:
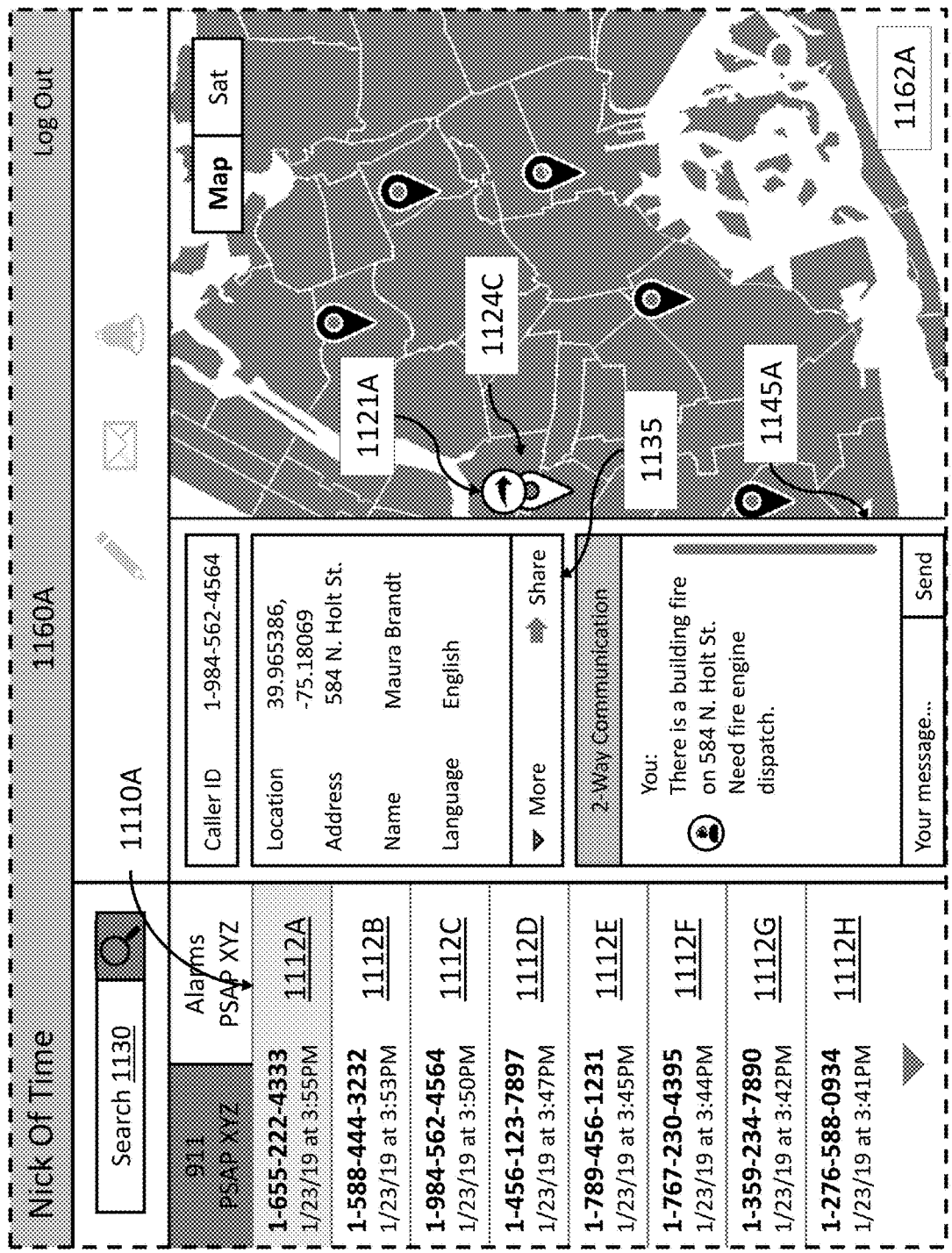
FIG. 11A and FIG. 11B illustrate examples of a graphical user interface of an emergency response application in accordance with one embodiment of the present disclosure.
Figure 11B:
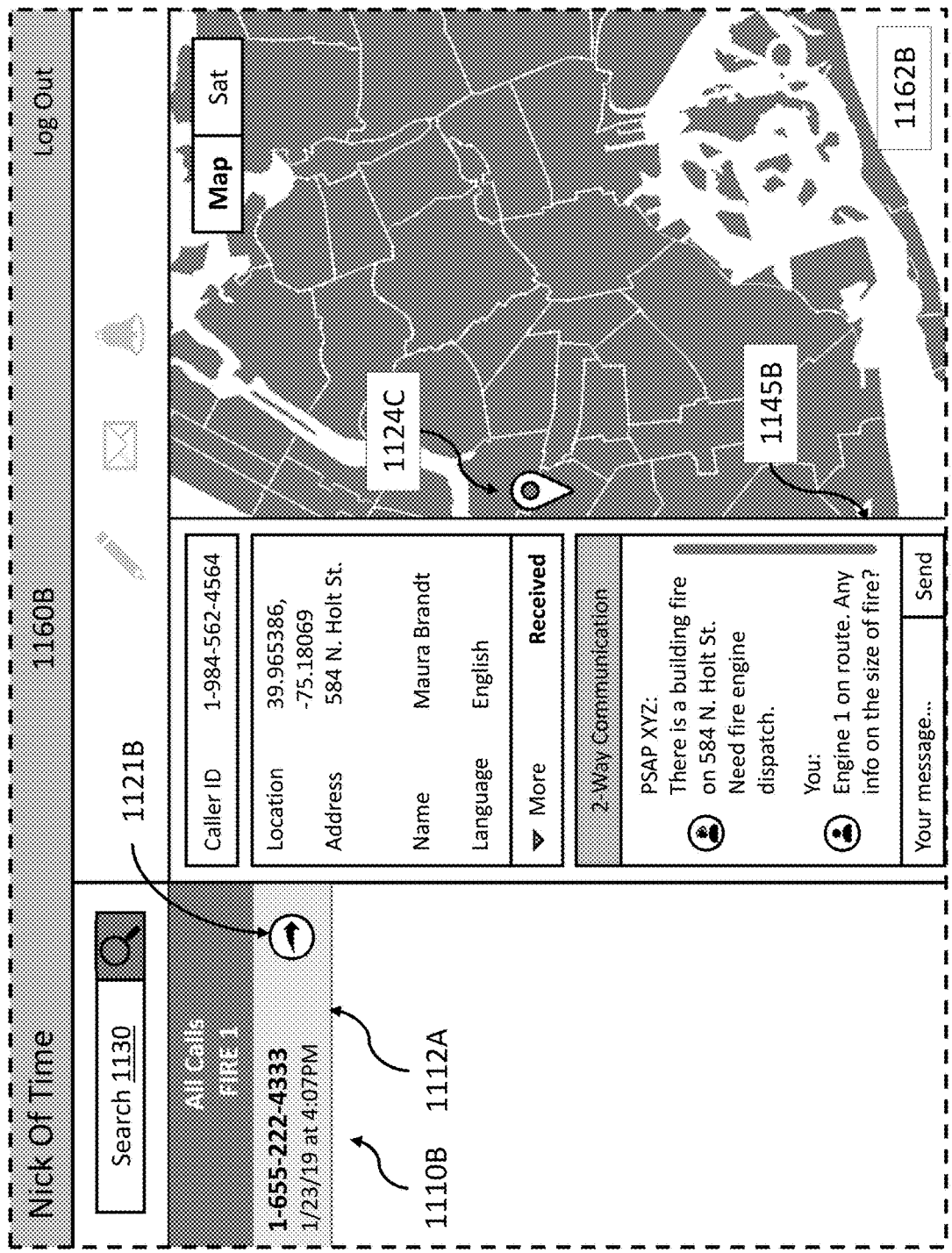

FIGS. 11A & 11B illustrate two exemplary instances of an emergency response application, in accordance with one embodiment of the present disclosure. In some embodiments, as described above, an emergency management system (EMS) provides an emergency response application 1160 to emergency service providers (ESPs) for ESPs to receive and visualize emergency data. As described above, the EMS can provide multiple instances of the emergency response application to multiple respective ESPs simultaneously, and even multiple instances of the emergency response application to individual ESPs. As described above, in some embodiments, when the EMS receives emergency data associated with an emergency location that falls within a geofence associated with an ESP, the EMS can automatically transmit (i.e., "push") the emergency data to the ESP via a communication link established between the EMS and the ESP through an instance of the emergency response application. Or, in some embodiments, as described above, an ESP can transmit an emergency data request to the EMS by submitting an identifier (e.g., a phone number, an email address, an ESP identifier, etc.) through the graphical user interface (GUI) provided by an instance of the emergency response application.

By providing a first instance of the emergency response application to a first ESP and a second instance of the emergency response application to a second ESP (and thereby establishing a communication link with both ESPs, as described above), the EMS can function as a communication bridge (or, alternatively, an indirect communication link) between the two ESPs. In some embodiments, through such a communication bridge established between two ESPs by the EMS, the two ESPs can communicate and/or share emergency data. For example, FIG. 11A illustrates a first instance of the emergency response application, provided by the EMS to PSAP XYZ. In this example, the GUI of the first instance of the emergency response application 1160A provides a jurisdictional awareness view (as described above) to PSAP XYZ, wherein emergency alerts associated with emergency locations 1124 that fall within a geofence associated with PSAP XYZ (not shown) are automatically pushed by the EMS to PSAP XYZ and displayed within the GUI of the first instance of the emergency response application 1160A as incidents 1112 within a list of incidents 1110. The emergency locations associated with those emergency alerts are displayed within the GUI of the first instance of the emergency response application 1160A as incident locations 1124 within an interactive map 1162. In this example, a user of the first instance of the emergency response application 1160A (e.g., a call taker at PSAP XYZ) can choose to share an incident 1112 (and emergency data associated with the incident) with a second ESP by selecting the incident (or the incident location associated with the incident) and selecting a share button. For example, as illustrated in FIG. 11A, a user of the first instance of the emergency response application 1160A has selected incident 1112C, selected the share button 1135, and shared incident 1112C with Fire 1 (e.g., a fire department nearby PSAP XYZ), as illustrated in FIG. 11B.

Figure 12A:
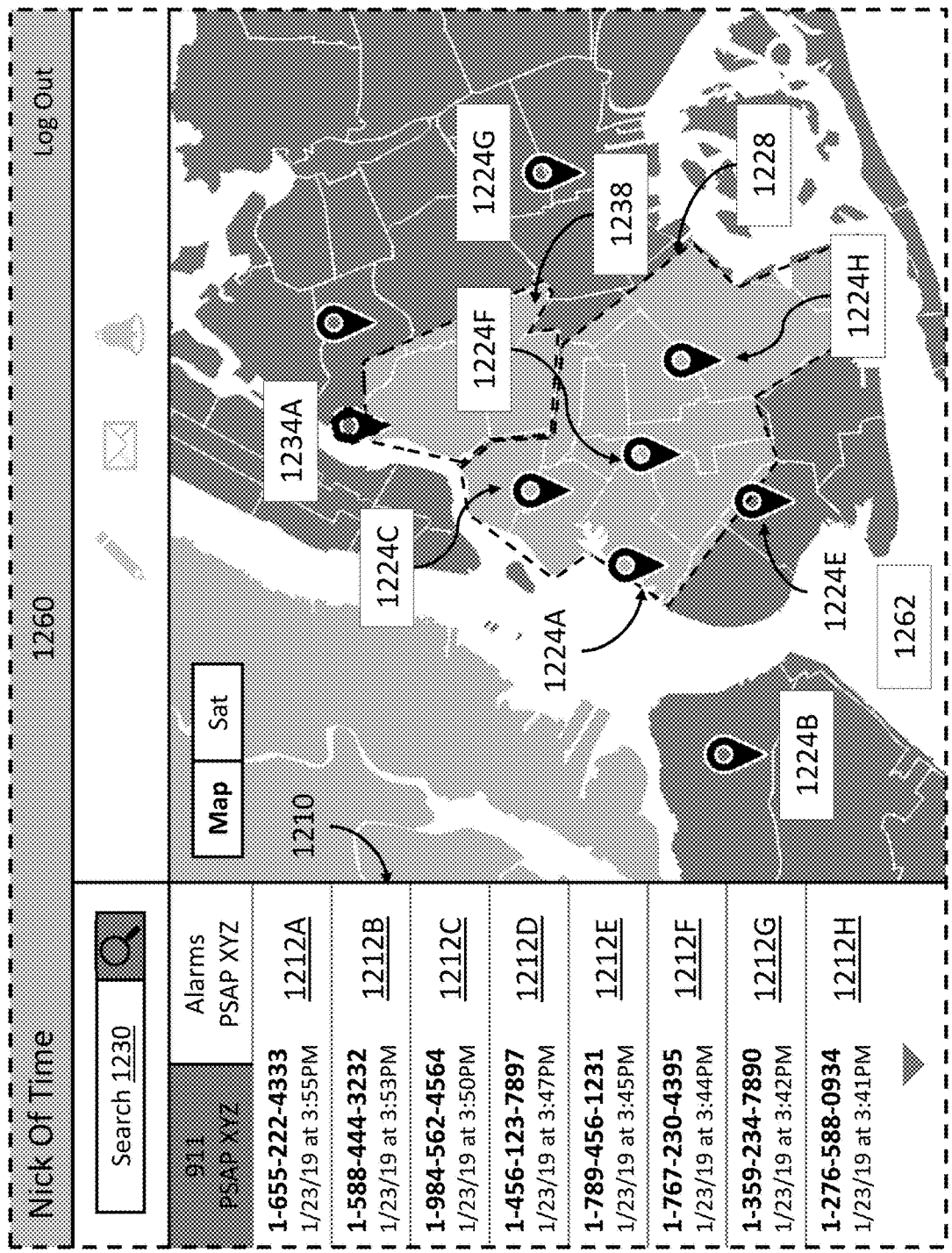
FIG. 12A and FIG. 12B illustrate an example of a graphical user interface (GUI) of an emergency response application in accordance with one embodiment of the present disclosure.
Figure 12B:
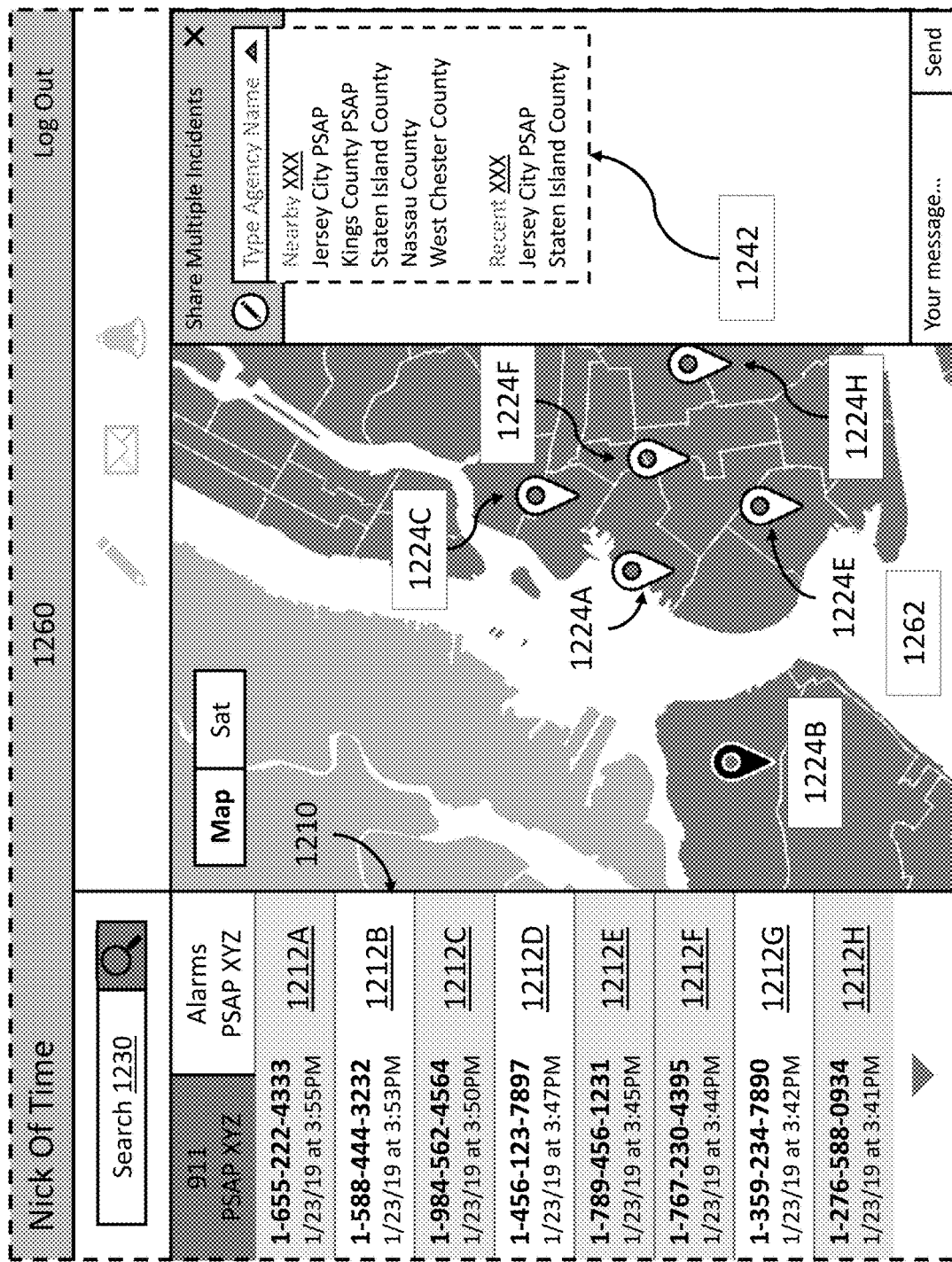

In some embodiments, when a user associated with a first ESP selects to share an incident with a second ESP, the emergency response application displays a list of ESPs for the user to choose from (e.g., the list of ESPs 1242, as illustrated in FIG. 12B; or the list of ESPs 1091, as illustrated in FIG. 10B). For example, in some embodiments, the emergency response application displays a pre-approved list of ESPs for the user to choose from. In some embodiments, an incident may not be shared from a first ESP to a second ESP if the second ESP has not been previously added to a pre-approved list of ESPs for the first ESP. In some embodiments, the emergency response application includes an ESP relationship management portal (not shown) wherein a user of the emergency response application (e.g., an administrator of a PSAP) can add or remove ESPs to a pre-approved list of ESPs. In some embodiments, the emergency response application allows a user to share an incident to a second ESP that is not pre-approved, and approval is implicitly given when the user chooses to share the incident. In some embodiments, the emergency response application prepopulates the list of ESPs based on proximity to the first ESP or proximity to an emergency location associated with the incident selected to be shared. In some embodiments, a second ESP is listed in the list of ESPs only if a user associated with the second ESP is actively logged into a second instance of the emergency response application.

In some embodiments, in response to receiving, through the GUI of the emergency response application, a selection to share an incident with a second ESP, the EMS transmits the incident (and any associated emergency data) to the second ESP and displays the incident within a list of incidents within the GUI of a second instance of the emergency response application accessed by the second ESP. For example, FIG. 11B illustrates a second instance of the emergency response application, provided by the EMS to Fire 1. In this example, PSAP XYZ (from the example illustrated in FIG. 11A) has selected to share incident 1112A (represented by the phone number 1-655-222-4333) with Fire 1 (e.g., by selecting the share button 1135). As illustrated in FIG. 11B, the EMS has subsequently transmitted the incident 1112A (and any associated emergency data) to Fire 1, and the incident 1112A is now displayed within the list of incidents 1110B. In addition, in this example, the emergency location associated with the incident 1112A is displayed within the interactive map 1162B as an incident location 1124C. In some embodiments, when the second instance of the emergency response application receives a shared incident, the second instance of the emergency response application prompts the computing device on which the second ESP is accessing the second instance of the emergency response application to emit an audible sound. In some embodiments, incident locations associated with shared incidents are displayed within the interactive map of the emergency response application in a color different to that of incident locations associated with incidents that have not been shared.

In some embodiments, when a first ESP selects to share an incident with a second ESP, the EMS initiates and facilitates a text-based communication session 1145 between the two ESPs through a first instance of the emergency response application accessed by the first ESP and a second instance of the emergency response application accessed by the second ESP. For example, as illustrated in FIG. 11B, after incident 1112A was shared by PSAP XYZ with Fire 1, the EMS initiated and facilitated text-based emergency communication session 1145B, wherein each ESP has sent one message to the other. In some embodiments, the text-based emergency communication session 1145 is initiated only after the shared incident has been selected within the second instance of the emergency response application. In some embodiments, as illustrated in FIG. 11A, the first instance of the emergency response application allows a user to submit an initial message for a text-based communication session 1145A to be included along with the incident to be shared. In some embodiments, if a third instance of the emergency response application is accessed by a third user associated with either the first ESP or the second ESP, and the third user selects the shared incident within the third instance of the emergency response application, the EMS will facilitate a text-based communication session 1145 including all three instances of the emergency response application. However, in this way, the EMS can facilitate a text-based communication session 1145 with any number instances of the emergency response application. In some embodiments, when an incident is shared, a shared icon 1121 is displayed over top the incident (e.g., shared icon 1121B, as illustrated in FIG. 11B) or the incident location associated with the incident (e.g., shared icon 1121A, as illustrated in FIG. 11A).

In some embodiments, after a first ESP selects to share an incident with a second ESP, the incident remains in a "sharing" state until the incident is selected by the second ESP within the GUI of the second instance of the emergency response application accessed by the second ESP. When the incident is selected by the second ESP, the incident transitions from a "sharing" state into a "shared" state. In some embodiments, a shared icon 1121 is only displayed over an incident (or an incident location associated with the incident) if the incident is in the "shared" state. In some embodiments, when the second ESP first selects the shared incident (thereby taking the incident from the "sharing" state to the "shared" state), the EMS notifies the first ESP of receipt of the incident. In some embodiments, the EMS notifies the first ESP of receipt of the incident by displaying a shared icon 1121 over the incident (or the incident location associated with the incident) within the GUI of the first instance of the emergency response application accessed by the first ESP. In some embodiments, the EMS notifies the first ESP of receipt of the incident by displaying a banner within the GUI of the first instance of the emergency response application. In some embodiments, the EMS notifies the first ESP of receipt of the incident by prompting, via the first instance of the emergency response application, the computing device on which the first ESP is accessing the first instance of the emergency response application to emit an audible sound. In some embodiments, if an incident remains in the "sharing" state longer than a threshold period of time (e.g., the second ESP does not select the incident within one or two minutes), the EMS notifies the first ESP of a failed receipt of the incident. In some embodiments, the EMS notifies the first ESP of a failed receipt of an incident by displaying a failed share icon over the incident (or the incident location associated with the incident) within the GUI of the first instance of the emergency response application. In some embodiments, the EMS notifies the first ESP of a failed receipt of an incident by displaying a banner within the GUI of the first instance of the emergency response application. In some embodiments, the EMS notifies the first ESP of a failed receipt of an incident by prompting, via the first instance of the emergency response application, the computing device on which the first ESP is accessing the first instance of the emergency response application to emit an audible sound.

As described above, in some embodiments, ESPs may be recognized by the EMS as either primary agencies or non-primary agencies. Primary agencies and non-primary agencies may have different access levels to features within the emergency response application. For example, in some embodiments, only primary agencies may share incidents with other agencies via the emergency response application. Or for example, in some embodiments, only primary agencies may access a jurisdictional awareness view (as described above) within the emergency response application (e.g., the EMS will push emergency data as it is received by the EMS to only primary agencies). In some embodiments, when a non-primary agency is not allowed to access a jurisdictional awareness view, the non-primary agency may still be able to access the emergency response application and use the emergency response application to send emergency data requests (as described above) to the EMS. In such an embodiment, the non-primary agency may still be able to use the emergency response application to receive shared incidents. For example, as illustrated in FIGS. 11A and 11B, PSAP XYZ is a primary emergency response agency and therefore has access to a jurisdictional awareness view within the first instance of the emergency response application 1160A, while Fire 1 is a non-primary emergency response agency and therefore does not have access to a jurisdictional awareness view within the second instance of the emergency response application 1160B. However, Fire 1 can still submit emergency data requests to the EMS (e.g., by searching for a phone number within the search bar 1130) and receive shared incidents (e.g., shared incident 1112A) through the second instance of the emergency response application 1160B. In some embodiments, when a non-primary agency submits an emergency data request through the emergency response application (as described above) including an identifier associated with an existing incident already created for a primary agency, the EMS notifies the primary agency of the emergency data request (e.g., by displaying a banner within the instance of the emergency response application accessed by the primary agency) requesting approval from the primary agency. In such an embodiment, the EMS will only return emergency data associated with the identifier to the non-primary agency if the primary agency approves the emergency data request.

In some embodiments, the emergency response application can be accessed and used by an emergency responder (e.g., a fireman or a police officer) in similar ways. For example, in some embodiments, an emergency responder can access and use the emergency response application to receive shared incidents, share incidents, or transmit emergency data requests to the EMS.

In some implementations, a method for sharing information regarding an emergency with a requesting party (e.g., an emergency responder, a user at another ESP agency) is disclosed. For example, an emergency responder may have been dispatched via a traditional method of dispatch such as a radio dispatch, phone dispatch, etc. In many such cases, the emergency responder may have limited information that was verbally communicated and will need to stay on the line to receive updated information (e.g., updated location of a person in an emergency, relevant sensor data, information about accessing the location, etc.), which can be important for effective response. Even when electronic display of the emergency can be provided, the emergency responder may not be able to access the relevant data due software incompatibility, lack of permissions, etc. To get relevant and updated emergency data, the emergency responder may send a request for data regarding the emergency. In some embodiments, the emergency data may be obtained from two or more sources, e.g., data from one or more user devices, user information from one or more databases such as an emergency profile.

For example, the emergency management system (EMS) may receive a data request from an emergency responder via various pathways including a web portal (e.g., query view screen in FIG. 11B), an SMS message, other type of messaging, API call, etc. In some cases, the EMS will verify the identity of the requesting party by various standard methods. For example, the data request may include the credentials of the requesting party. In some cases, the requesting party has to register before being able to use the system by going through a verification process.

The emergency data request may include a device identifier. The device identifier may be a phone number, SIM card number, IMEI number, etc. In some embodiments, the device identifier is associated with the user's information such as user account information, user name, physical address, email address, social security number, driver's license, medical ID, etc.

The EMS may gather the emergency data by using the device identifier and searching in one or more databases or third-party systems. For example, emergency data may be gathered by querying the device identifier (e.g., phone number, name of the person in the emergency) in a clearinghouse as shown in FIG. 2. A query may be sent to a LIS App for location information while an ADR App can accept request for additional information. Emergency data in the form of location data (e.g., lat/lon, dispatchable address) may be returned. Additional information such as user information (e.g., user's medical conditions) may be returned, which may be relevant for medical emergencies.

When the location of the emergency has been returned, the EMS may identify the primary ESP agency that is responsible for providing emergency assistance in the area. For example, the location of the emergency falls within the jurisdictional boundaries of the ESP. In some embodiments, a geofencing system may be used to make this determination. In other embodiments, a database service may provide information about the primary ESP agency.

The EMS may obtain electronic approval from the primary ESP to share the emergency data. In some embodiments, the approval is obtained in real-time after receiving the data request, by for e.g., providing a prompt for an ESP user to click on a button to grant approval for sharing. In some embodiments, the EMS will search for pre-approvals of particular ESPs (wherein the emergency responder may be associated with a pre-approved ESP) that have been authorized to share data by the primary ESP agency. In some embodiments, the user at the primary ESP granting approval is an administrator of the account. In the interests of time, any available user at the primary ESP may grant approval for sharing.

Once approval is obtained, the EMS may provide access to the emergency data to the requesting party (e.g., an emergency responder, a user at another ESP agency). By obtaining approval from the primary ESP agency, the security and privacy of the emergency data can be while allowing a mechanism for emergency personnel to access relevant emergency data in a timely and efficient manner.

In some embodiments, the emergency data request will automatically be approved if the non-primary agency has previously been added to a pre-approved list of ESPs for the primary agency. In some embodiments, a primary agency may share an incident with another primary agency only if the two primary agencies are associated with bordering geofences. Primary agencies associated with bordering geofences may be considered "neighboring agencies."

FIG. 12A depicts how agencies can view emergencies in neighboring or pre-approved agencies. It is advantageous for an agency to be able to view incidents within neighboring jurisdiction as the incident may impact its own jurisdiction. Here, PSAP XYZ can view incidents 1224 A-F within its geofence boundary 1228. In addition, PSAP XYZ has provided the geofence file of another jurisdiction, PSAP ABC 1234A (shown in a different design) within geofence boundary 1238.

Figure 14A:
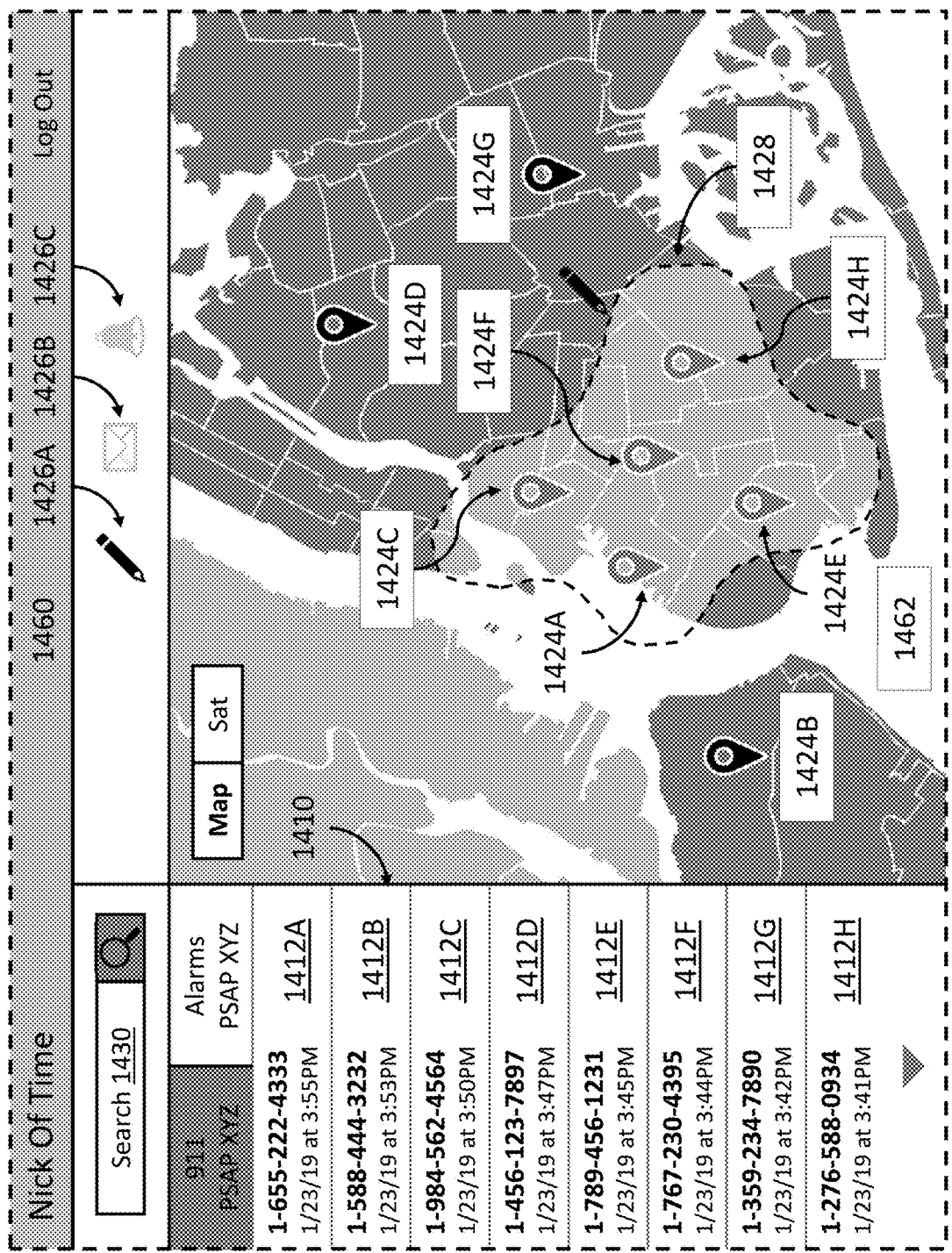
FIG. 14A and FIG. 14B illustrate examples of a graphical user interface of an emergency response application in accordance with one embodiment of the present disclosure.
Figure 14B:
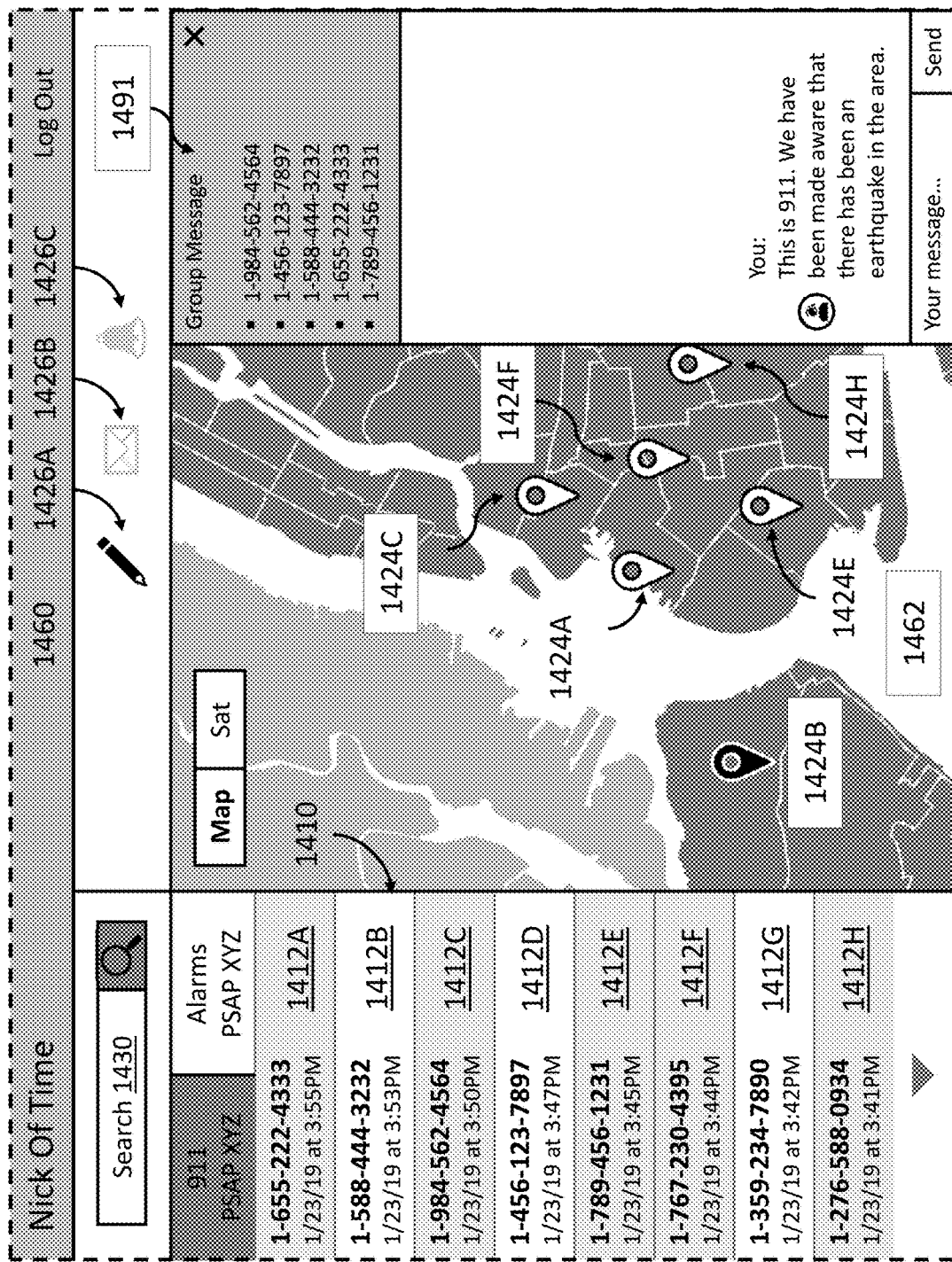

FIG. 12B depicts an exemplary screen for sharing a group of emergency incidents using the emergency response application at PSAP XYZ. For example, a group of emergency incidents may be related to a shooter incident. After selecting a group of emergency incidents 1224A, 1224C, 1224E, 1224F, 122411, the incidents can be shared with another agency from a pre-approved list 1242. The emergency incidents may be selected by using a drawing tool by selecting from the queue (as shown in FIGS. 14A & 14B).
Supplemental Data for Traditional Emergency Service Requests & Digital Emergency Service Requests Traditionally, a person may only submit a request for emergency service (also referred to as an "emergency service request") to an emergency service provider (e.g., a public safety answering point (PSAP)) verbally, such as by dialing 9-1-1 in the United States and verbally articulating the details of their emergency over a phone call. This process takes time away from providing emergency response, is prone to human error, and requires that the person is physically able to verbally articulate the details of their emergency, which is far from a given. Even in the case of a home security alarm, the alarm is typically sent to a monitoring center where a call taker must call an emergency service provider and verbally articulate the details of the potential emergency. Provided herein are systems and methods for delivering digital emergency service requests to emergency service providers. By delivering digital emergency service requests to emergency service providers, as opposed to verbally delivering emergency service requests (e.g., emergency phone calls), significant time can be saved in providing emergency response, human error can be eliminated, and people who are not able (physically, such as when a person has fallen unconscious, or otherwise, such as when a person is kidnapped and fearing for their life) to verbally articulate the details of their emergency may still submit an emergency service request to an emergency service provider. Traditional emergency service requests (e.g., emergency calls) can and typically must be serviced by an emergency service provider (e.g., a call taker at a PSAP can and typically must answer an emergency call received by the PSAP). Similarly, a digital emergency service request must provide one or more options for servicing (e.g., the ability to be claimed or ignored, as described below).

FIGS. 12A & 12B depict a GUI at an ESP with a dual queue for emergencies—"911" where a traditional emergency service request (such as an emergency call) are arriving and "alarms" where a digital emergency service request from a home alarm, panic button, car console, etc. are arriving without an accompanying emergency call.

FIGS. 12A & 12B illustrate an instance of an emergency response application 1260, wherein emergency data from emergency calls and digital service requests are displayed at an appropriate ESP. In some embodiments, an instance of the emergency response application 1260 is accessed when a user navigates within a standard web browser to a URL where the emergency response application 1260 is hosted as a website or a web application. In some embodiments, an instance of the emergency response application 1260 is accessed when a user opens and loads the emergency response application 1260 as a software application downloaded and installed on a computing device. In the example illustrated by FIGS. 12A & 12B, the ESP accessing the instance of the emergency response application 1260 has received emergency data regarding at least eight different emergency alerts, represented by incidents 1212A-1212H within the list of incidents 1210. In some embodiments, the list of incidents 1210 has two tabs: one for supplemental emergency data associated with emergency calls, and another for digital emergency service requests (not selected). Each of the incidents 1212A-1212E have an associated emergency location represented by incident locations 1224A-1224E, respectively.

Figure 13A:
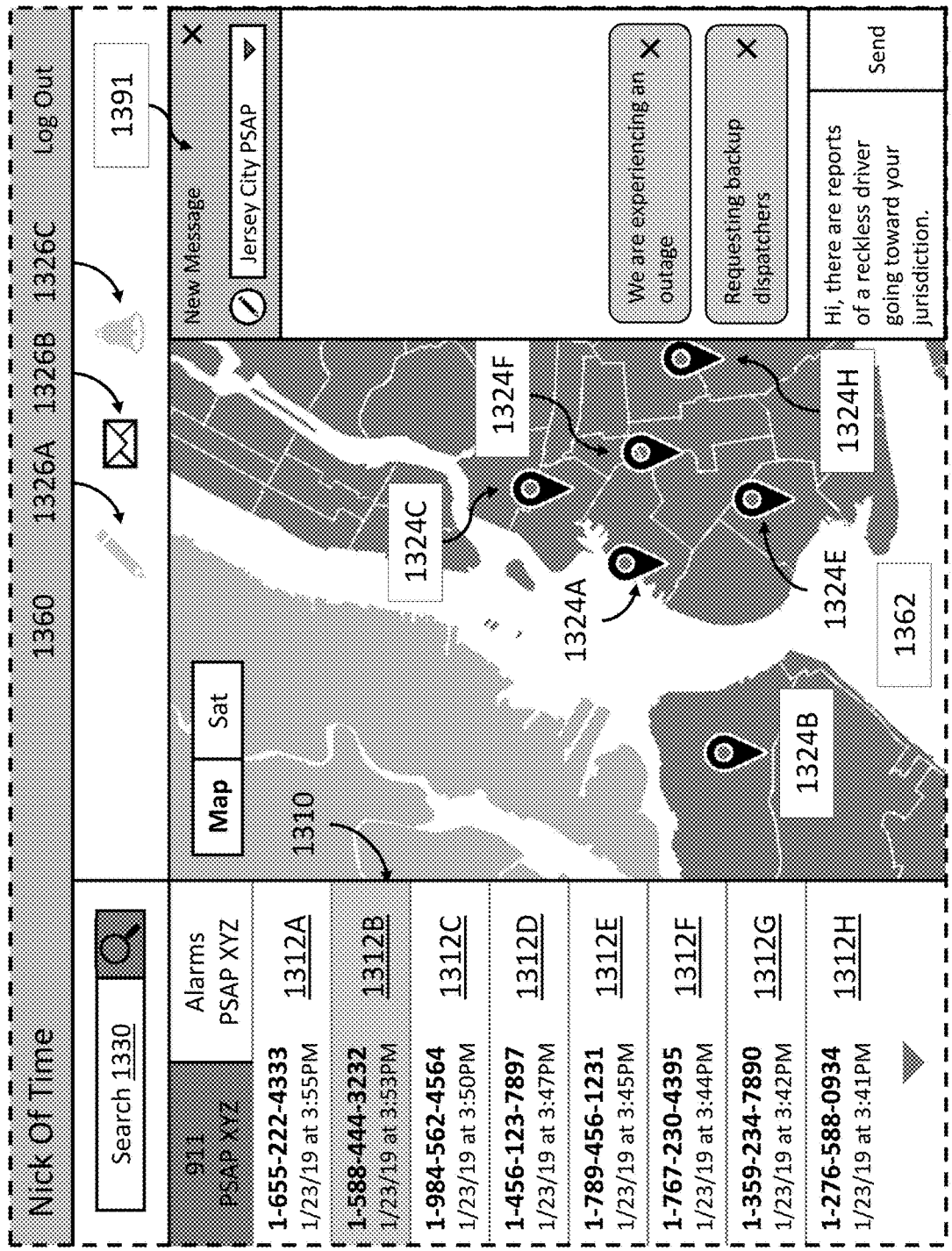
FIG. 13A, FIG. 13B, FIG. 13C, and FIG. 13D illustrate examples of a graphical user interface of an emergency response application in accordance with one embodiment of the present disclosure.

For both "911" queue and "Alarms" data queue, the GUI of the emergency response application 1260 also provides buttons 1226A-1226C for activating three enhanced ESP communication functions: Big Text, Interagency Communications, and Area Alerts, each of which is described in detail below.
Interagency Communications FIGS. 13A-13D illustrate various examples of an enhanced ESP communication function, Interagency Communications. In some embodiments, Interagency Communications allows two or more ESPs to communicate through an emergency response application. FIG. 13A illustrates an embodiment of an instance of an emergency response application 1360, wherein the button 1326B for Interagency Communications has been selected by a user accessing the first instance of the emergency response application 1360. In response, the emergency response application 1360 has presented a communication interface (e.g., a text-based communication interface) 1391 within the graphical user interface (GUI) of the emergency response application 1360, overlaid atop the interactive map 1362. The communication interface 1391 provides an interface within the emergency response application 1360 that a first user at a first ESP (e.g., the ESP at which this instance of the emergency response application 1360 is being accessed) can use to transmit a message to a second ESP or a second user at the second ESP. As illustrated in FIG. 13A, the communication interface 1391 presents options and elements for selecting a second ESP to receive a message, submitting a message, and sending a message. As illustrated in FIG. 13A, the emergency response application 1360 may also prompt the user accessing the instance of the emergency response application 1360 to select an incident 1312 to be associated with their message(s). In some embodiments, an incident 1312 may be selected from the list of incidents 1310 or an associated incident location 1324 may be selected from within the interactive map 1362. In some embodiments, a message sent to another ESP through the communication interface 1391 must be associated with one or more incidents 1312. In some embodiments, a message sent to an ESP through the communication interface 1391 need not be associated with any particular incident 1312.

In some embodiments, as illustrated by FIG. 13A, a first user of the emergency response application 1360 accessing a first instance of the emergency response application 1360 at a first ESP may select a second ESP to message through a list of ESPs presented within the communication interface 1391. In some embodiments, in order for a first ESP to send a message to a second ESP through the emergency response application 1360, the first and second ESPs must have previously opted into a relationship wherein they have agreed to receive messages from one another. In such an embodiment, the list of ESPs will only show ESPs with which the first ESP accessing the first instance of the emergency response application 1360 has such a relationship. In some embodiments, the list of ESPs shows any and all ESPs within a predetermined distance (e.g., 25 miles) of the first ESP accessing the first instance of the emergency response application 1360. In some embodiments, the emergency response application 1360 prioritizes the list of ESPs by proximity to the first ESP accessing the first instance of the emergency response application 1360. In some embodiments, the emergency response application 1360 prioritizes the list of ESPs by ESPs that have most recently received a message from the first ESP through the emergency response application 1360. In some embodiments, a second ESP will only be presented within the list of ESPs if the second ESP is actively accessing a second instance of the emergency response application 1360 (e.g., a second user at the second ESP has opened a second instance of the emergency response application on a computing device at the second ESP).

Figure 13B:
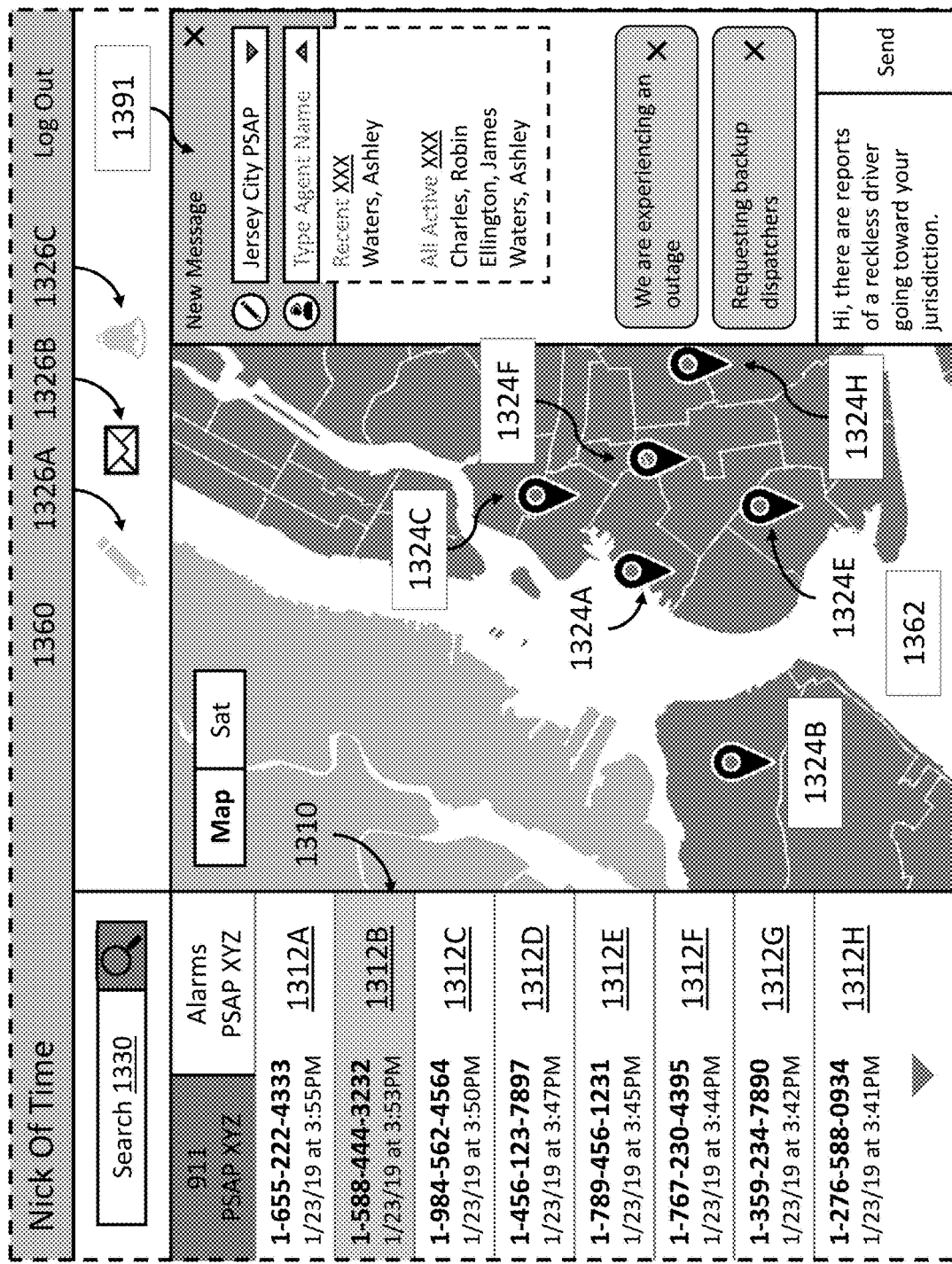
Figure 13C:
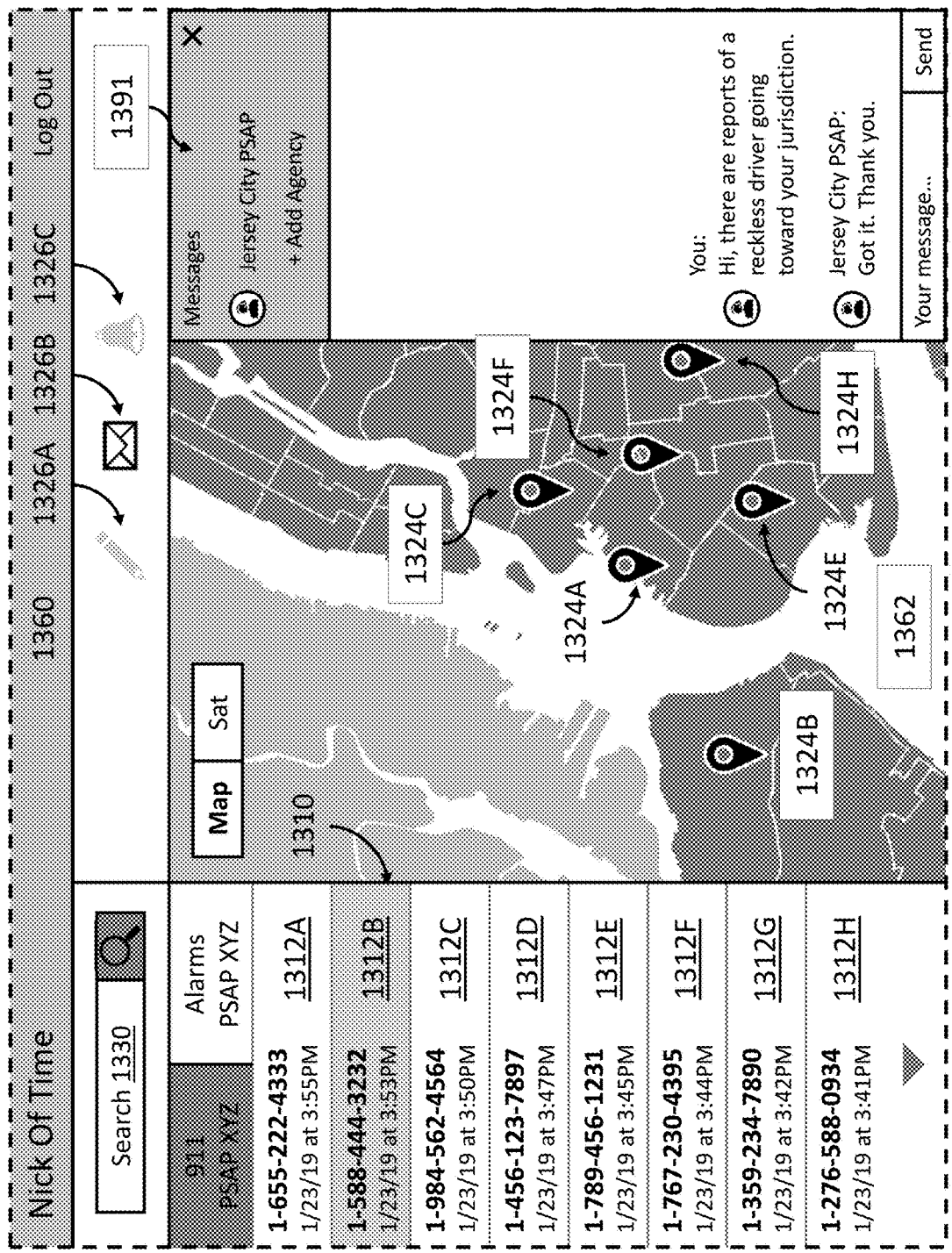

Once a second ESP to receive a message has been selected from the list of ESPs (and, in some embodiments, after an incident has been selected to be associated with a pending message; for example, in the example illustrated by FIG. 13A, incident 1312B has been selected), the first ESP may send a message to the second ESP through the emergency response application 1360. As illustrated by FIG. 13C, Jersey City PSAP has been selected as the second ESP and the message "Hi, there are reports of a reckless driver going toward your jurisdiction." has been entered into the communication interface 1391. In some embodiments, the emergency response application 1360 presents one or more precomposed messages for a user of the emergency response application 1360 to select. For example, in the example illustrated by FIG. 13A, two precomposed messages have been presented by the emergency response application 1360: "We are experiencing an outage" and "Requesting backup dispatchers." In some embodiments, precomposed messages are automatically generated by the emergency response application 1360, such as by using machine learning algorithms. In some embodiments, precomposed messages are entered in advance by users of the emergency response application 1360. In some embodiments, as illustrated by FIGS. 13B, in addition to selecting a second ESP, a user accessing the first instance of the emergency response application 1360 at a first ESP can (and, in some embodiments, must) select a specific second user at the second ESP to receive a message. As illustrated by FIGS. 13B, in some embodiments, a second user at the second ESP may be selected from a list of users. In some embodiments, the list of users shows only users at the second ESP who are actively logged into an instance of the emergency response application 1360. In some embodiments, the list of users is prioritized by users who have most recently received a message from the first ESP through the emergency response application 1360. In some embodiments, the user accessing the first instance of the emergency response application 1360 can prompt the EMS to transmit a message submitted into the communication interface 1391 to the second ESP by selecting a Send button. In some embodiments, the user accessing the first instance of the emergency response application 1360 can prompt the EMS to transmit a message to the second ESP by simply selecting a precomposed message presented within the communication interface 1391.

The submitted or selected message is received by the EMS. The EMS then establishes an indirect communication link (as described above) between the first ESP and the second ESP and transmits the submitted or selected message to the second ESP. The message is presented within a second instance of the emergency response application 1360 accessed by the second ESP. A two-way chat is displayed within both the first and second instances of the emergency response application 1360 accessed by the first and second ESPs, respectively, as illustrated by FIG. 13C. In the example illustrated by FIG. 13C, the message "Hi, there are reports of a reckless driver going toward your jurisdiction." has been transmitted from the first ESP to the second ESP (i.e., Jersey City PSAP). The second ESP (i.e., Jersey City PSAP) has sent a second message back to the first ESP confirming receipt of the first message. The two ESPs may freely send messages back and forth through the communication interfaces 1391 in their respective instances of the emergency response application 1360. Being able to quickly and easily communicate through their respective instances of the emergency response application 1360 can allow the first and second ESPs to more effectively and efficiently respond to emergency scenarios that may involve both of their respective jurisdictions.

Figure 13D:
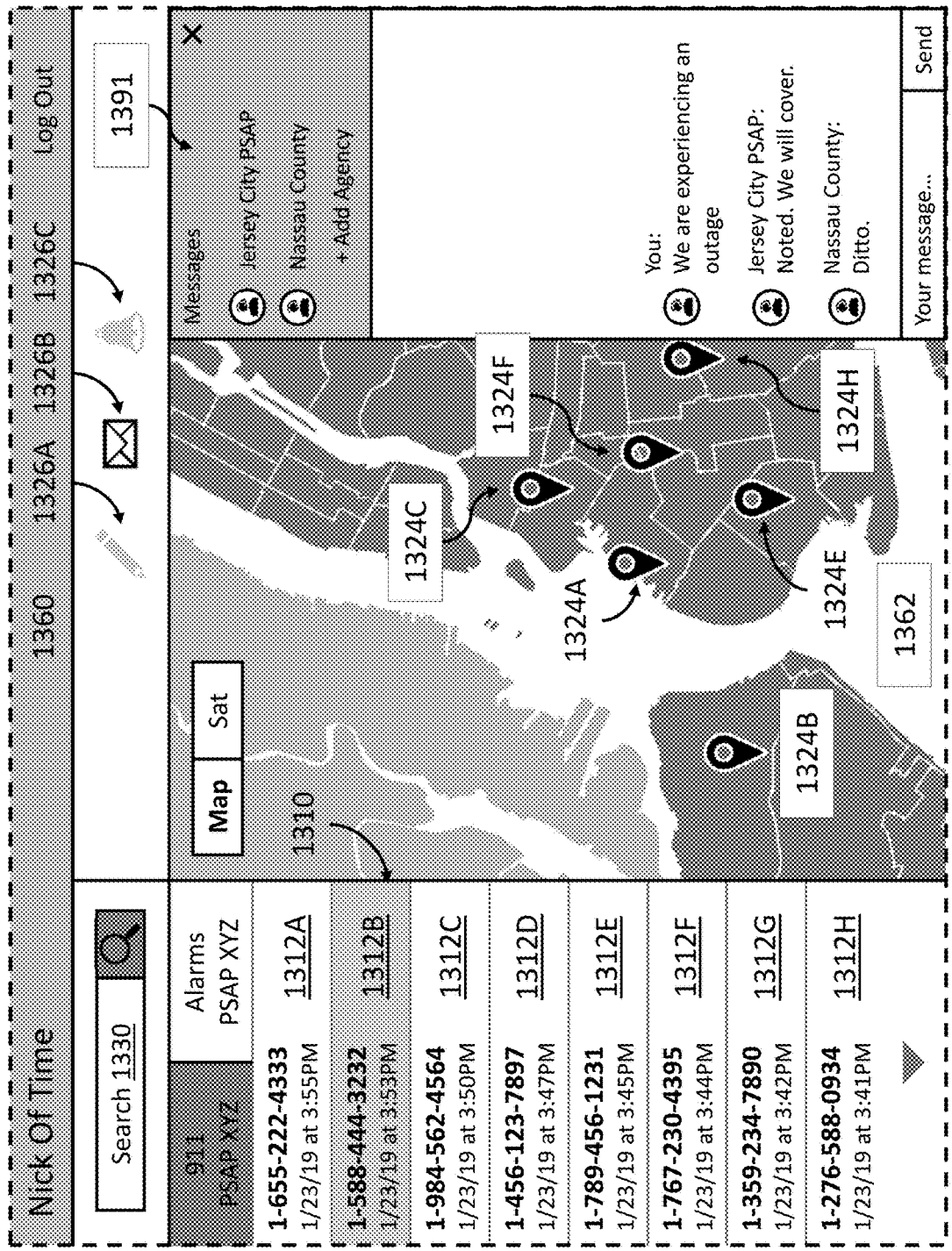

In some embodiments, as illustrated by FIG. 13D, three or more ESPs may enter a group chat through the communication interfaces 1391 in their respective instances of the emergency response application 1360. For example, as illustrated in FIG. 13D, in some embodiments, after selecting a second ESP to receive a message, a user accessing a first instance of the emergency response application 1360 at a first ESP can additionally select a third ESP to receive the message as well. As in the example illustrated by FIG. 13A, in some embodiments, the third ESP can be selected from a list of ESPs (illustrated by FIG. 13A. As illustrated by FIG. 13D, in this example, Nassau County has been selected as the third ESP (e.g., in addition to the second ESP, Jersey City PSAP). In this example, a precomposed message ("We are experiencing an outage") has been selected to be sent to the second and third ESPs. The EMS as transmitted the message to both the second and third ESPs and a group chat has been established between the first, second, and third ESPs. In response to the initial message, the second and third ESPs (Jersey City PSAP and Nassau County, respectively) have sent back messages confirming receipt. All three messages are presented within the communication interfaces 1391 of the respective instances of the three ESPs in the order in which the messages were sent/received.

Big Text

FIGS. 14A-14B illustrate an example of an enhanced ESP communication function, Big Text. In some embodiments, Big Text allows an ESP to transmit a message to a group of emergency callers (e.g., multiple persons requesting emergency assistance) simultaneously. FIG. 14A illustrates an embodiment of an emergency response application 1460, wherein the button 1426A has been selected by a user accessing the emergency response application 1460. In response, the emergency response application 1460 has activated the Big Text function, which allows the user to select a group (e.g., one or more) of incidents 1412 to message. In some embodiments, the group of incidents 1412 can be selected from the list of incidents 1410. In some embodiments, the group of incidents 1412 can be selected from the interactive map (e.g., by selecting associated incident locations 1424). In some embodiments, through the Big Text function, a representative area 1428 (e.g., a freeform or geometric shape) can be drawn on the interactive map (as illustrated by FIG. 14A), and the incidents 1412 associated with any incident locations 1424 contained within the representative area 1428 are selected as the group of incidents 1412. In the example illustrated by FIG. 14A, there are five incident locations (incident locations 1424A, 1424C, 1424E, 1424F, and 1424H) contained within the representative area 1428.

After receiving the representative area 1428, the emergency response application 1460 selects the incidents 1412 associated with the incident locations 1424 contained within the representative area 1428 as the group of incidents 1412. In this example, the group of incidents 1412 is thus determined to be incidents 1412A, 1412C, 1412E, 1412F, and 1412H. As illustrated in FIG. 14B, in response to being selected as the group of incidents 1412—incidents 1412A, 1412C, 1412E, 1412F, and 1412H—are now highlighted within the list of incidents 1410, and their respective associated incident locations 1424 are highlighted within the interactive map 1462.

Additionally, in response to receiving selection of the group of incidents, the emergency response application 1460 has now presented a communication interface 1491 within the GUI of the emergency response application 1460, overlaid atop the interactive map 1462 (as illustrated by FIG. 14B). The communication interface 1491 shows the user identifiers associated with the group of incidents as the recipients of a pending message. As with the Interagency Communications function, the communication interface 1491 presents options and elements for submitting and sending a message. The communication interface 1491 may also present one or more precomposed messages for a user of the emergency response application 1460 to select, as described above with respect to the Interagency Communications function. After a message is submitted or selected through the communication interface 1491, the EMS receives the message and transmits the message to the user identifiers associated with the group of incidents, as illustrated in FIG. 14B. In this way, the EMS establishes an indirect communication link (as described above) between the ESP accessing the emergency response application 1460 and electronic devices associated with each of the user identifiers associated with the group of incidents. As illustrated in FIG. 14B, the communication interface 1491 may stay open or otherwise accessible within the GUI of the emergency response application 1460, so that a user may transmit additional messages to the user identifiers associated with the group of incidents, such as to provide updates. In some embodiments, the EMS transmits the Big Text message to the user identifiers in the form of an electronic notification, such as push notification or an email. In some embodiments, the EMS transmits the Big Text message to the user identifiers in the form of an SMS or MMS message.

In one example of the Big Text function, an earthquake occurs in Brooklyn, N.Y. (illustrated by the map in FIGS. 14A & 14B). The ESP accessing the emergency response application 1460 receives five emergency alerts (represented by incident/incident location pairs 1412A/1424A, 1412C/1424C, 1412E/1424E, 1412F/1424F, and 1412H/1424H) within what a user (e.g., an emergency call taker) of the emergency response application 1460 believes to be within the area affected by the earthquake. The user can only respond to one emergency alert (e.g., an emergency call) at a time. However, they would like to let all of the emergency callers in the area know that the ESP is aware of the earthquake and will be responding to their emergencies as quickly as possible. To do so, the user activates the Big Text function by selecting button 1426A and draws a freeform shape (representative area 1428) around the five incident locations associated with the five emergency alerts. In response, the emergency response application 1460 automatically selects the five associated incidents as the group of incidents for the Big Text and opens the communication interface 1491. Within the communication interface 1491, the user types the message "This is 911. We have been made aware that there has been an earthquake in the area." and presses send. The EMS instantly and automatically sends the message to the five user identifiers associated with the five incidents.

Area Alerts

Figure 15A:
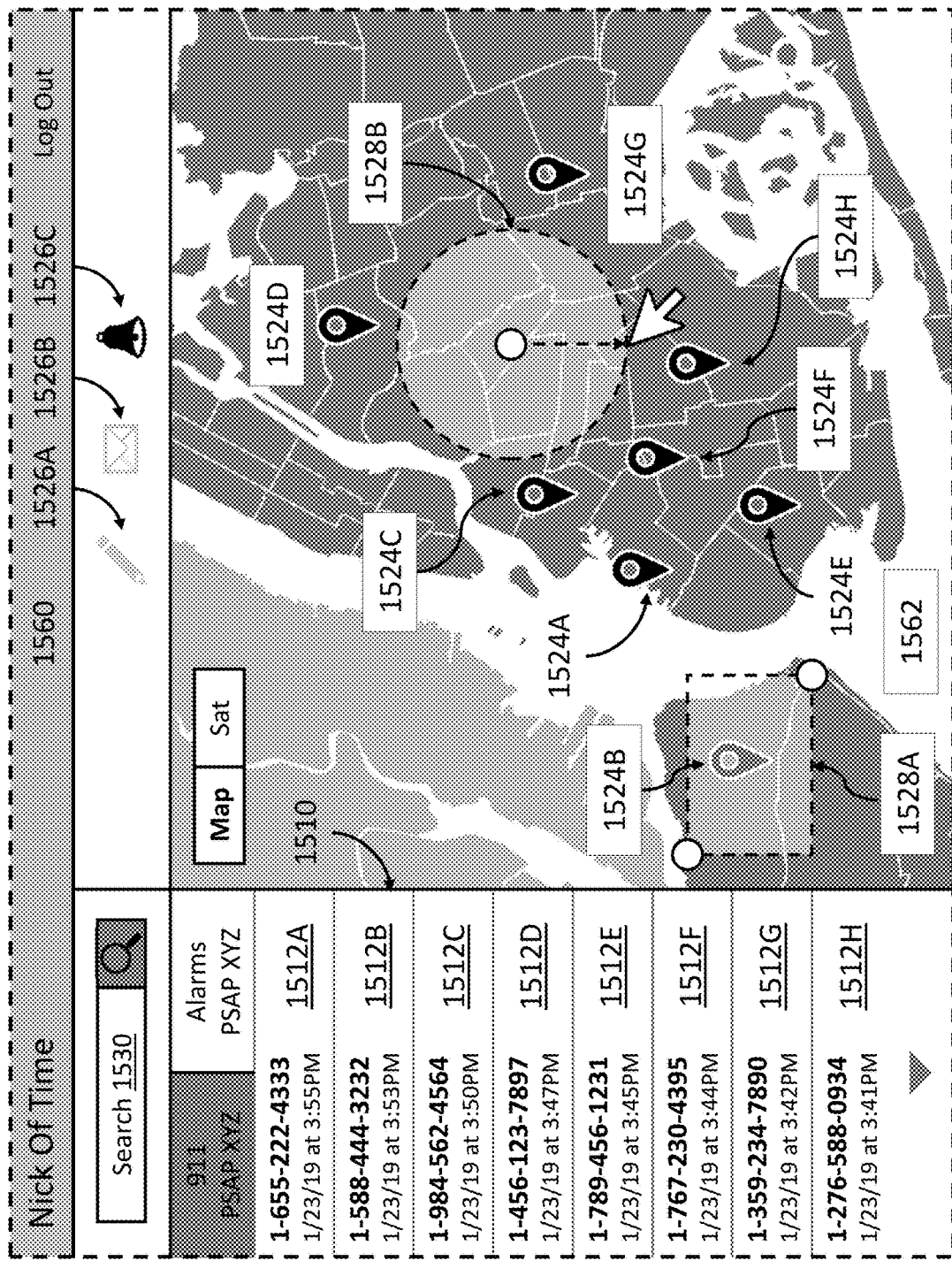
FIG. 15A, FIG. 15B, and FIG. 15C illustrate examples of a graphical user interface of an emergency response application in accordance with one embodiment of the present disclosure.
Figure 15B:
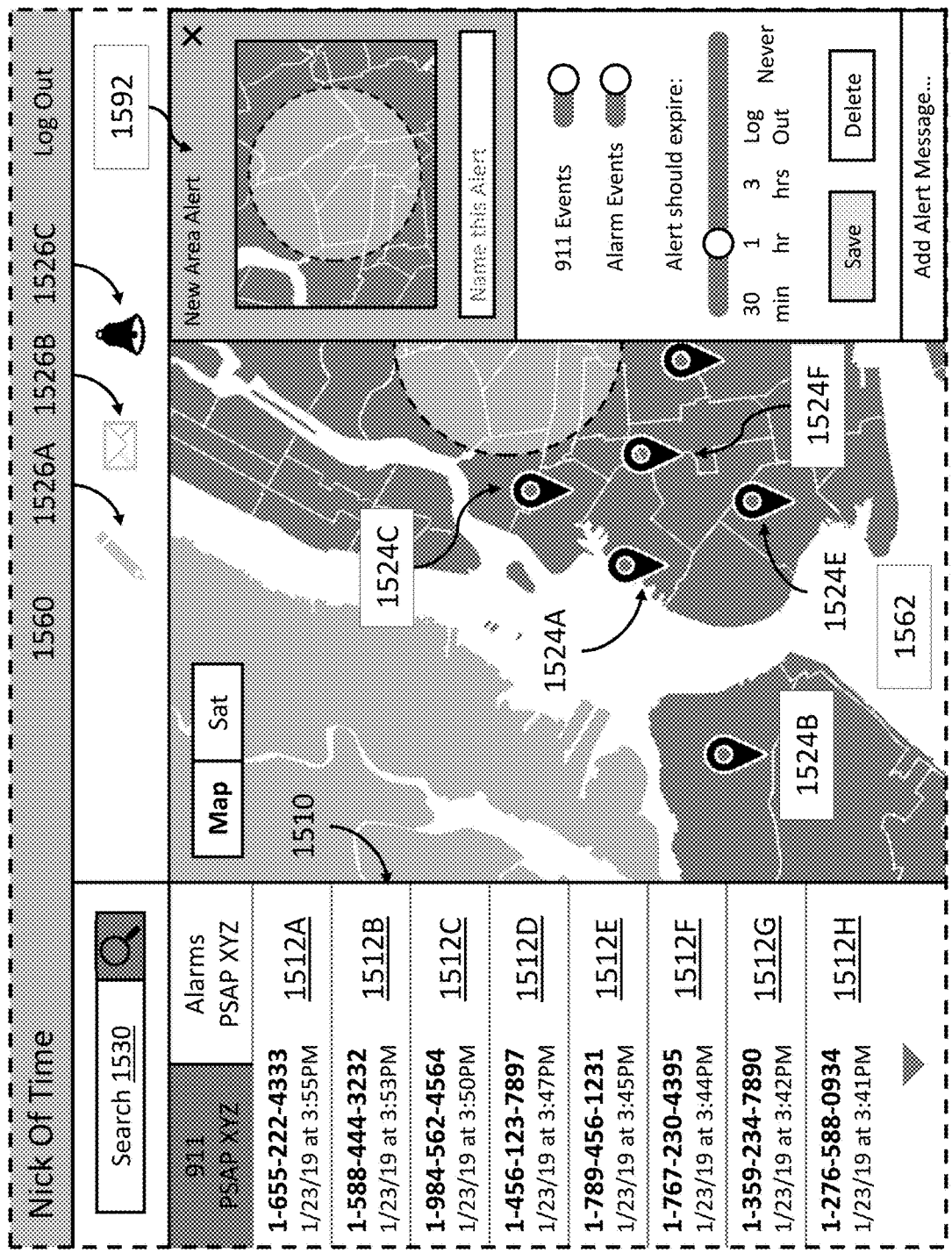
Figure 15C:
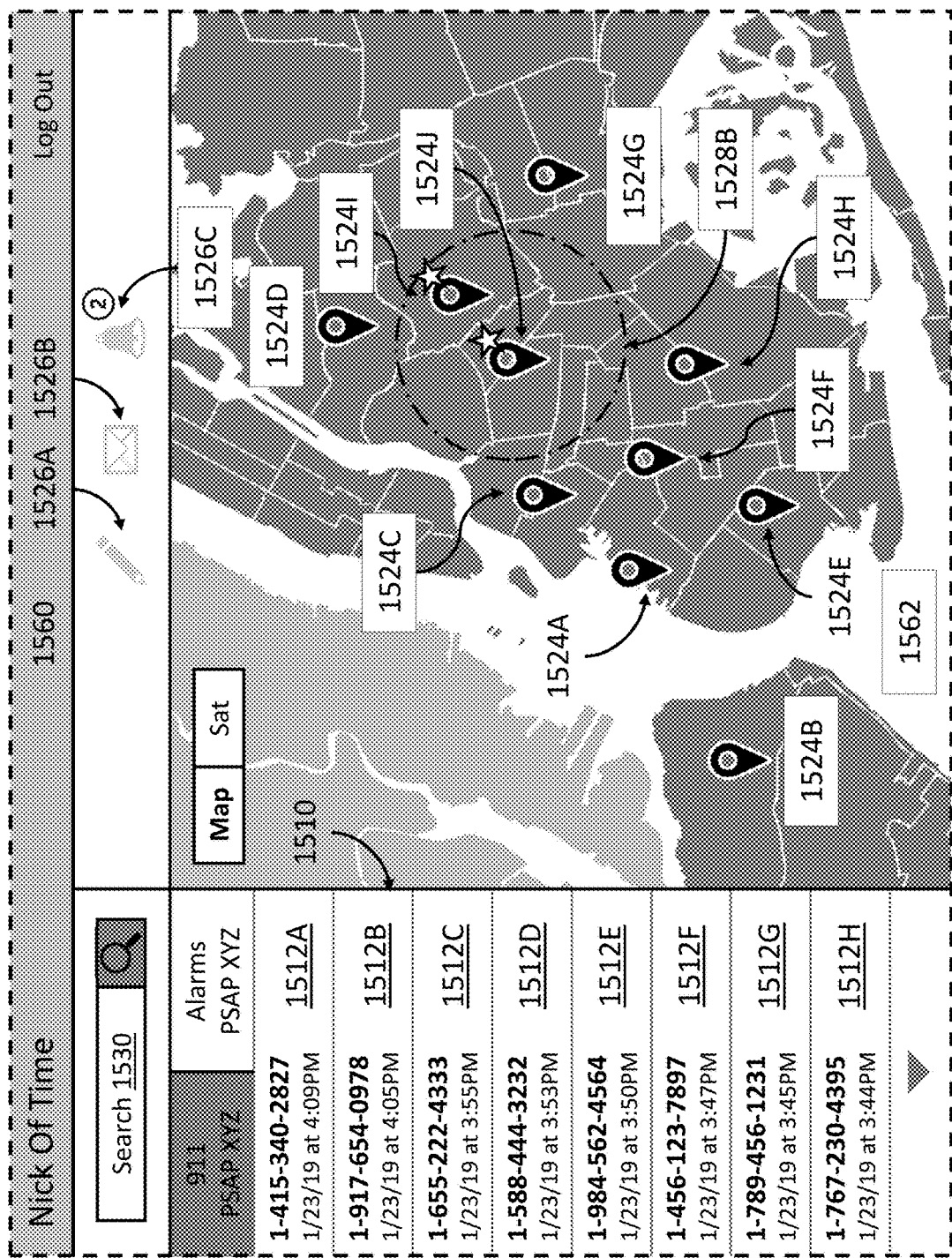

FIGS. 15A-15C illustrate an example of an enhance ESP communication function, Area Alerts. In some embodiments, Area Alerts allows an ESP to set up notifications or an automated message for subsequently received emergency alerts having emergency locations within a predetermined area. FIG. 15A illustrates an embodiment of an emergency response application 1560, wherein the button 1526C has been selected by a user accessing the emergency response application 1560. In response, the emergency response application 1560 has activated the Area Alerts function, which allows the user to select or submit a representative area 1528 for an Area Alert (hereinafter, "alert area"). As with the Big Text function, an area alert may be submitted in the form of a freeform or geometric shape. FIG. 15A illustrates two examples of an alert area 1528, rectangular representative area 1528A and circular representative area 1528B, both submitted by clicking and dragging within the interactive map 1562.

Once an area alert 1528 (e.g., representative area 1528B) has been submitted, the emergency response application 1560 presents an Area Alert interface 1592 within the GUI of the emergency response application 1560, overlaid atop the interactive map 1562 (as illustrated by FIG. 15B), that the user can use to create an area alert. As illustrated by FIG. 15B, the Area Alert interface 1592 presents options and elements for naming the area alert, setting the duration of the area alert, and optionally adding a message for the area alert. In some embodiments, the Area Alert interface also presents options and elements for setting the area alert to be activated for one or both of 911 calls and digital emergency service requests. The user can then confirm the area alert, such as by selecting the Save button.

FIG. 15C illustrates an example of an area alert. Alert area 1528B has been set for an area alert. Whenever the ESP accessing the emergency response application 1560 receives an emergency alert having an emergency location that falls within the alert area (and, in some embodiments, designated as a type of emergency alert set for the area alert), the area alert will be activated. When the area alert is activated, the emergency response application 1560 will execute a notification process specific to area alerts. For example, the notification process may include making a distinct audible sound, coloring or marking incident locations 1524 within the alert area differently than incident locations 1524 outside of the alert area, or showing a notification number over the button 1526C. However, the notification process may take any form or combination. For example, in the example illustrated by FIG. 15C, after setting up the area alert, two new emergency alerts have been received by the ESP accessing the emergency response application 1560, represented by incident/incident location pairs 1512I/1524I and 1512J/1524J. Both of these new emergency alerts have emergency locations (represented by incident locations 1524I and 1524J, respectively) that fall within the alert area 1528B. In response, the emergency response application 1560 has automatically marked incident locations 1524I and 1524J with a star and presented a notification number of 2 (i.e., the number of new emergency alerts that have triggered the area alert) over the button 1526C. Additionally or alternatively, if an area alert is set up with an associated message, in response to the ESP accessing the emergency response application 1560 receiving a new emergency alert having an emergency location that falls within the alert area, the EMS can automatically transmit the message associated with the area alert to the user identifier associated with the new emergency alert, as described above with respect to the Big Text function. For example, in the example illustrated by FIG. 15C, if the area alert represented by alert area 1528B was set up with an associated message, the EMS can automatically transmit the message associated with the area alert to the user identifiers associated with incidents 1512I and 1512J.

Text/Call Back

Figure 16A:
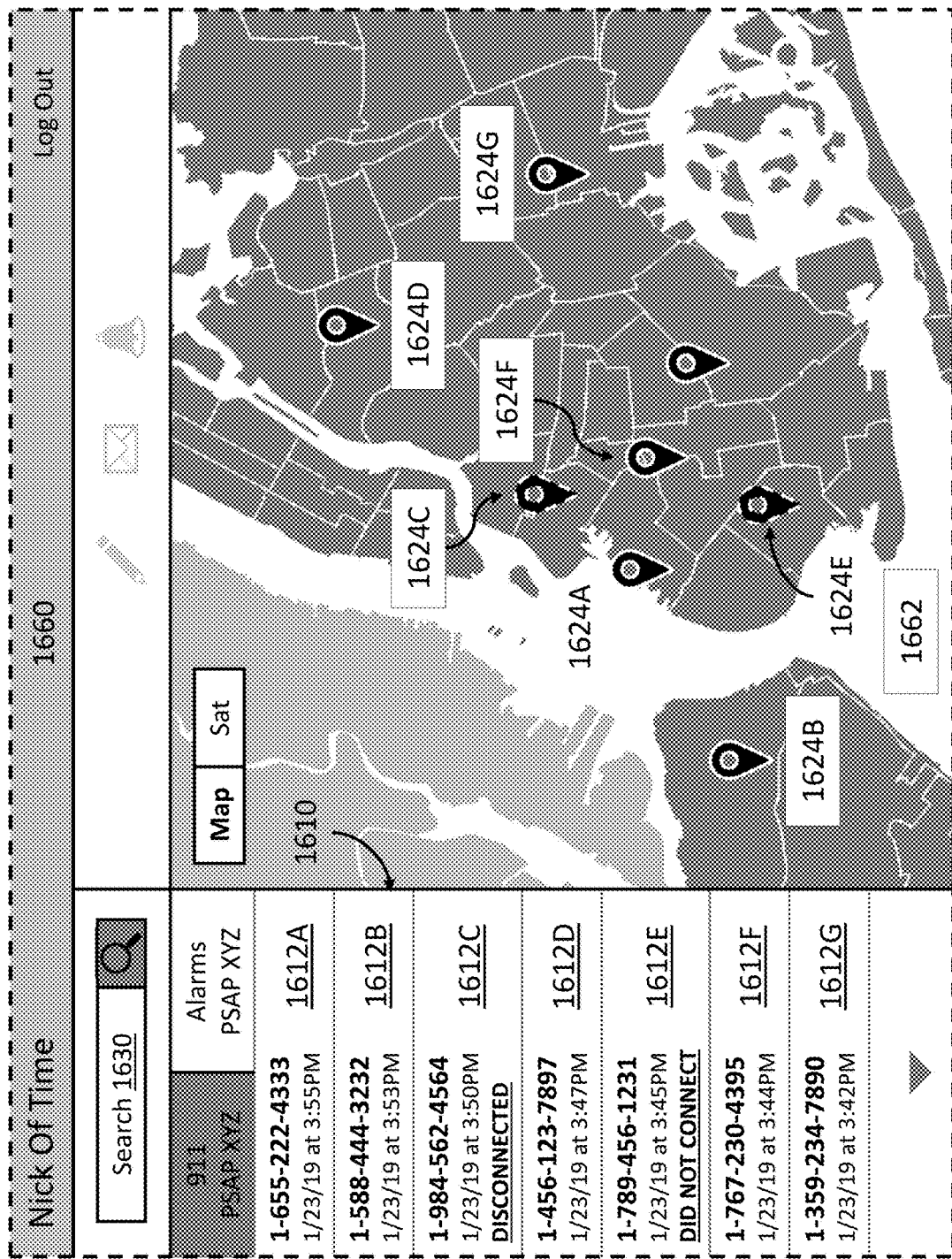
Figure 16B:
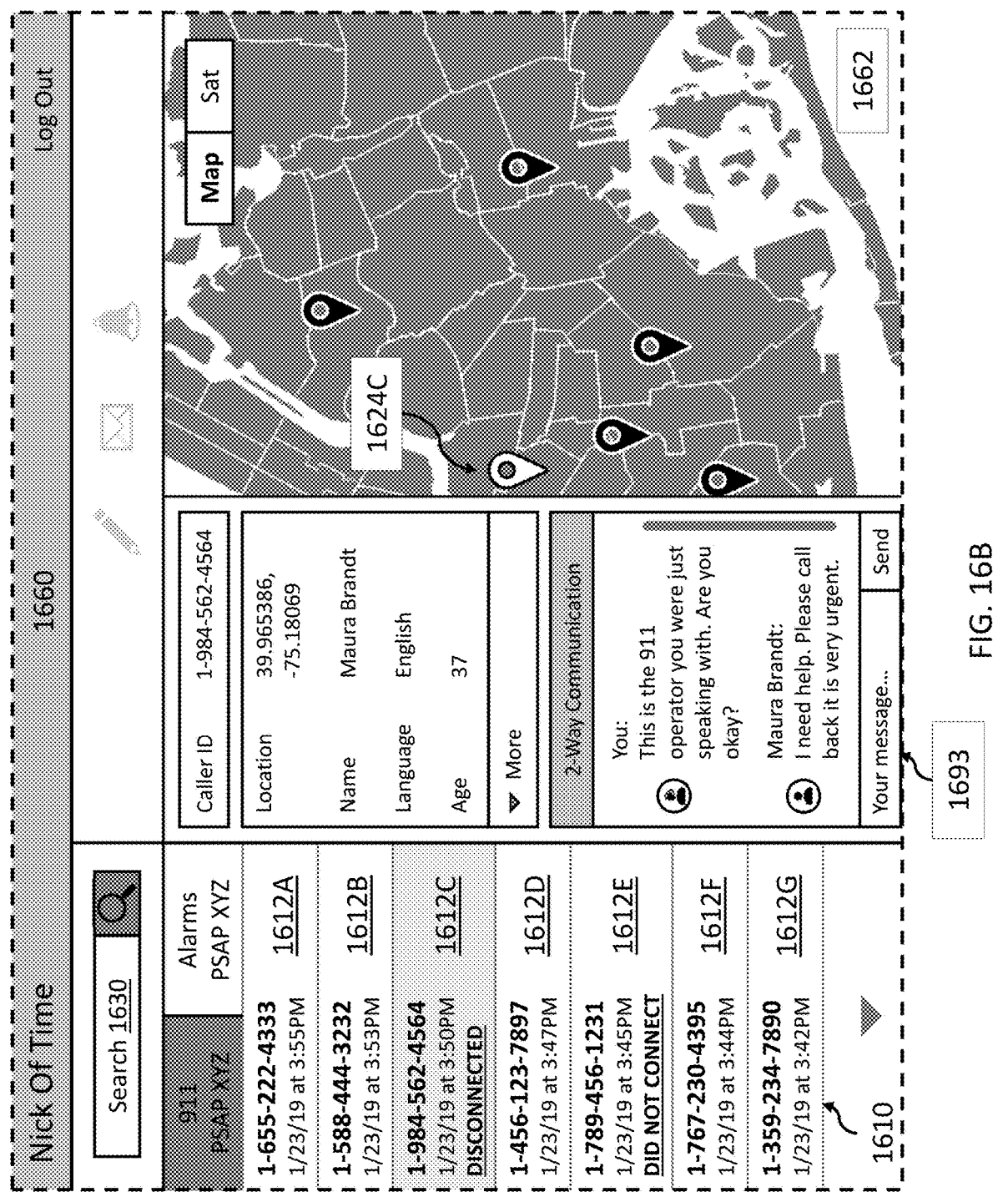
Figure 16C:
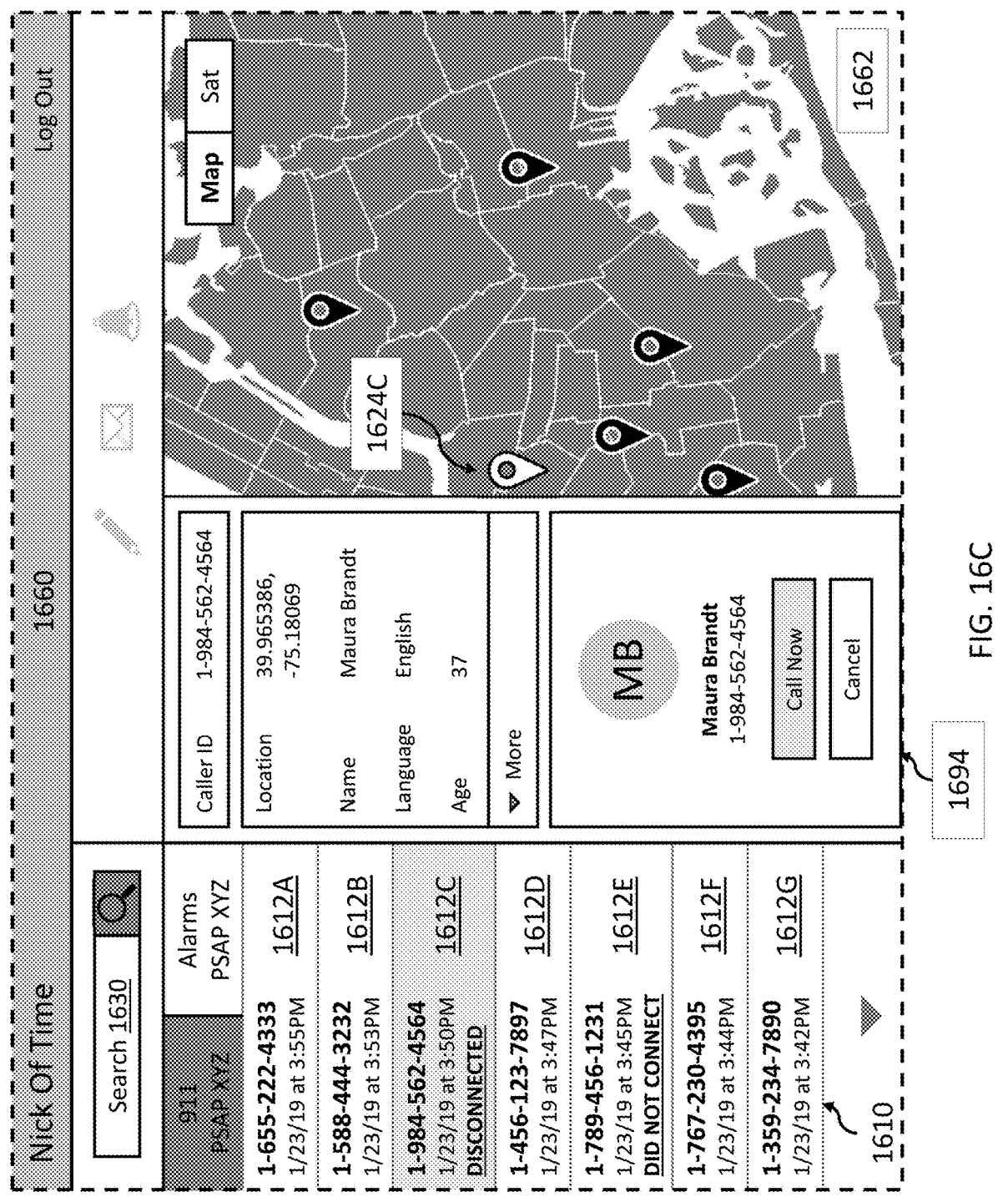

Occasionally, an emergency call (e.g., a 911 call) is unable to connect to an emergency call center, or the emergency call is disconnected prematurely (e.g., the call fails). In such cases, it is imperative that an emergency service provider (ESP; e.g., a public safety answering point (PSAP)) is able to contact or get back into contact with the emergency caller in order to provide that person with the appropriate emergency response. In some embodiments of the methods, systems, devices, servers, and media of the present disclosure, an emergency management system (EMS) can detect when an emergency call to an ESP has failed to connect or has disconnected prematurely, and, in response, facilitate the connection (or reconnection) of the emergency caller and the ESP through an emergency response application. FIGS. 16A-16C illustrate examples of an enhanced ESP communication function, Text/Call Back. In some embodiments, Text/Call Back allows an ESP to connect or reconnect with an emergency call whose emergency call has failed to connect or has disconnected prematurely.

FIG. 16A illustrates an embodiment of an emergency response application 1660 having a list of incidents 1610 populated with incidents 1612 and an interactive map 1662 populated with incident locations 1624 associated with the respective incidents 1612. As illustrated by FIG. 16A, the EMS has determined that the emergency calls represented by two of the incidents 1612 (incidents 1612C and 1612E) have failed. Specifically, as illustrated in FIG. 16A, the emergency call represented by incident 1612C has connect and subsequently failed and the emergency call represented by incident 1612E failed to connect entirely. The EMS can determine that an emergency call has failed in various ways. For example, in some embodiments, when a person makes an emergency call from an electronic device, the electronic device simultaneously transmits an emergency alert to the EMS (as described above). In some embodiments, the electronic device continues to transmit updated emergency alerts to the EMS for the duration of the emergency call. If the emergency call fails to connect or fails after connecting, the electronic device can include an indication of the failure within an updated emergency alert. The EMS can then determine that the emergency call has failed by detecting the indication of the failure within the updated emergency alert. In another example, if an ESP receives an emergency call but the emergency call subsequently fails or otherwise disconnects prematurely, the ESP can submit an indication of the failure to the EMS through the emergency response application 1660, such as by selecting the associated incident 1612 and clicking a call failed button. However, the EMS can determine that an emergency call has failed in any other way. After the EMS determines that an emergency call has failed, the emergency response application 1660 can mark the associated incident 1612 accordingly, as illustrated by FIG. 16A. Additionally or alternatively, after an EMS determines that emergency call has failed, the emergency response application can change the appearance of the associated incident location 1624 accordingly. For example, as illustrated by FIG. 16B, the incident locations 1624C and 1624E, associated with incidents 1612C and 1612E (which represent emergency calls that the EMS has determined have failed), are marked with dashed outlines.

In some embodiments, a user of the emergency response application 1660 can select an incident 1612 representing an emergency call that has failed to text or call back the emergency caller. FIG. 16B illustrates an example of a text back function. In the example illustrated by FIG. 16B, incident 1612C represents an emergency call that the EMS has determined connected and subsequently disconnected prematurely. In this example, a user of the emergency response application 1660 has selected incident 1612C from the list of incidents 1610. In response, the emergency response application 1660 has presented a communication interface 1693 (e.g., a two-way, text-based communication interface) that the user of the emergency response application 1660 can use to text the emergency caller back. In this example, the user of the emergency response application 1660 has submitted the message "This is the 911 operator you were just speaking with. Are you okay?" The EMS has transmitted the message to the user identifier associated with the incident 1612C (in this example, the phone number 1-984-562-4564), thereby establishing a chat with the emergency caller through the communication interface 1693. Also, in this example, the emergency caller has replied with the message "I need help. Please call back it is very urgent." The emergency caller's message was first received by the EMS and then displayed by the emergency response application 1660 within the communication interface 1693.

FIG. 16C illustrates an example of a call back function. In the example illustrated by FIG. 16C, incident 1612C represents an emergency call that the EMS has determined connected and subsequently disconnected prematurely. In this example, a user of the emergency response application 1660 has selected incident 1612C from the list of incidents 1610. In response, the emergency response application 1660 has presented a communication interface 1694 (e.g., a Voice over Internet Protocol (VoIP) communication interface) that the user of the emergency response application 1660 can use to call the emergency caller back. In this example, the user of the emergency response application 1660 can select a button (e.g., the Call Now button) to prompt the emergency response application 1660 and EMS to facilitate a phone call (e.g., a VoIP call) between the electronic device associated with the user identifier associated with incident 1612C and the computing device at which the emergency response application 1660 is being accessed.

Tactical Geofencing

Traditionally, as described above, emergency service providers (ESPs) are assigned jurisdictions over which they have responsibility or authority. For example, a public safety answering point (PSAP) may be authorized to receive emergency calls originating from within the bounds of a particular town, city, county, state, or any other geographical area defined in any other way. Furthermore, jurisdictions of different PSAPs generally do not overlap, so that when an emergency call originates from a particular location, that emergency call is routed to one PSAP and that one PSAP only. This is important for efficiently managing emergency response efforts. Accordingly, some of the systems and methods described herein describe a process for routing emergency data (e.g., data generated or gathered in response to the initiation of an emergency call) to an ESP wherein a location (e.g., an emergency location) associated with the emergency data is compared to a set of geofences (i.e., digital representations of jurisdictions, as described above) associated with a respective set of ESPs. If the location associated with the emergency data is determined to fall within one of the geofences associated with one of the ESPs, then the emergency data may be transmitted to that ESP (and only that ESP). In this way, the transmission of emergency data can follow the routing of emergency calls.

However, there are instances and scenarios in which it would be advantageous for an ESP to receive emergency data associated with emergency locations that are not within the jurisdiction of the ESP. For example, if a first ESP associated with a first jurisdiction is experiencing an abnormally high volume of emergency events within their jurisdiction, and a second ESP associated with a second, neighboring jurisdiction would like to provide overflow support to the first ESP, it would be helpful for the second ESP to have visibility into the first jurisdiction (e.g., to receive or otherwise have access to emergency data associated with emergency locations within the first jurisdiction). Or for example, if a mass emergency (e.g., an earthquake) is affecting both the first jurisdiction and the second jurisdiction, it would be helpful for the first ESP to have visibility into the second jurisdiction and, likewise, for the second ESP to have visibility into the first jurisdiction. In both of these examples (and in many similar instances, although not necessarily), the desire for one ESP to have visibility into a jurisdiction outside of its own is temporary, based on the extenuating circumstances (e.g., the abnormally high volume of emergency events in the first jurisdiction or the earthquake affecting both the first and second jurisdictions). When the extenuating circumstances subside, there would no longer be a need for the ESP to have visibility into a jurisdiction outside of its own.

In various embodiments, disclosed herein are systems and methods for providing an ESP with access to emergency data associated with emergency locations outside of a geofence associated with the ESP (hereinafter, "tactical geofencing"). As described above, tactical geofencing may be advantageous in various situations, such as when a first ESP would like to provide support to a second ESP, or when a mass emergency affects more than one (e.g., neighboring) jurisdictions. In some embodiments, tactical geofencing is maintained for a temporary period of time. In some embodiments, tactical geofencing is facilitated by an emergency management system (EMS) communicatively coupled to a plurality of ESPs (as described above), such as through an emergency response application accessed by the plurality of ESPs (as described above), although the EMS may be communicatively coupled to ESPs in various ways. As described above, in some embodiments, an ESP communicatively coupled to the EMS is associated by the EMS with one or more geofences, and, when the EMS receives emergency data associated with an emergency location that falls within one of the one or more geofences associated with the ESP, the EMS can make that emergency data available to the ESP. In some embodiments, a tactical geofence is established when an ESP associated by the EMS with a first geofence is additionally and temporarily associated by the EMS with a second geofence that is not normally part of the ESPs jurisdiction.

Figure 17A:
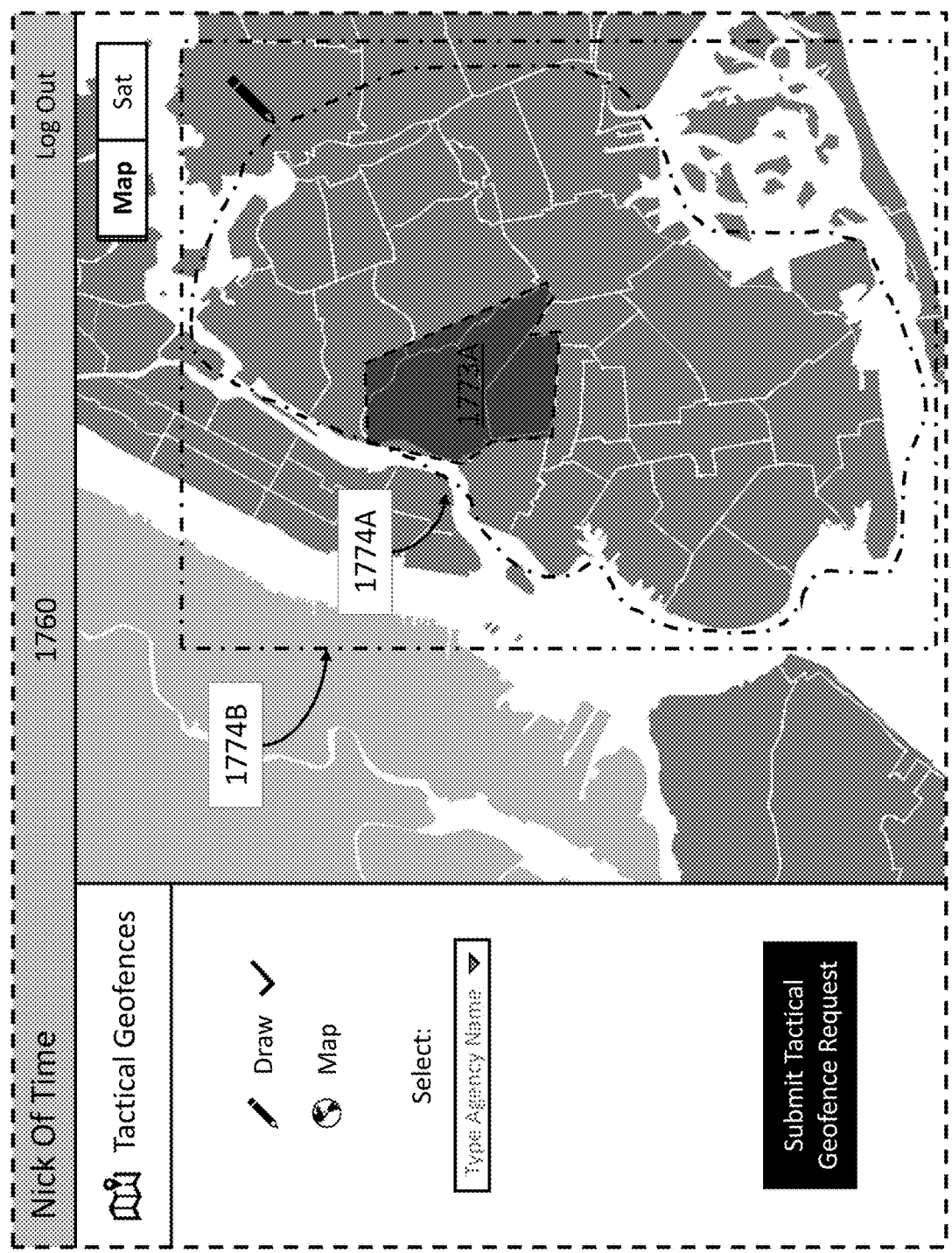
FIG. 17A, FIG. 17B, and FIG. 17C illustrate examples of a graphical user interface of an emergency response application in accordance with one embodiment of the present disclosure.

FIG. 17A illustrates an example of a graphical user interface (GUI) of an emergency response application used to facilitate the process of tactical geofencing. In this example, the emergency response application 1760 is being accessed by a first ESP, such as via a computing device at the first ESP. The first ESP has previously been associated by the EMS with a first geofence 1773 representing the first ESP's jurisdiction, which is shown in FIG. 17A within an interactive map provided by the GUI of the emergency response application 1760. In this example, the first ESP (e.g., an administrator of the first ESP) can use the emergency response application 1760 (which communicatively couples the first ESP to the EMS) to request access to emergency data associated with emergency locations outside of the first geofence 1773A (i.e., outside of the first ESP's jurisdiction) by submitting a tactical geofence request to the EMS. In response to receiving the tactical geofence request from the first ESP, the EMS may establish a tactical geofence for the first ESP, as described below. It will be understood, however, that while the EMS may establish a tactical geofence for an ESP in response to receiving a tactical geofence request, the EMS may also establish a tactical geofence for an ESP automatically or unilaterally.

Figure 17B:
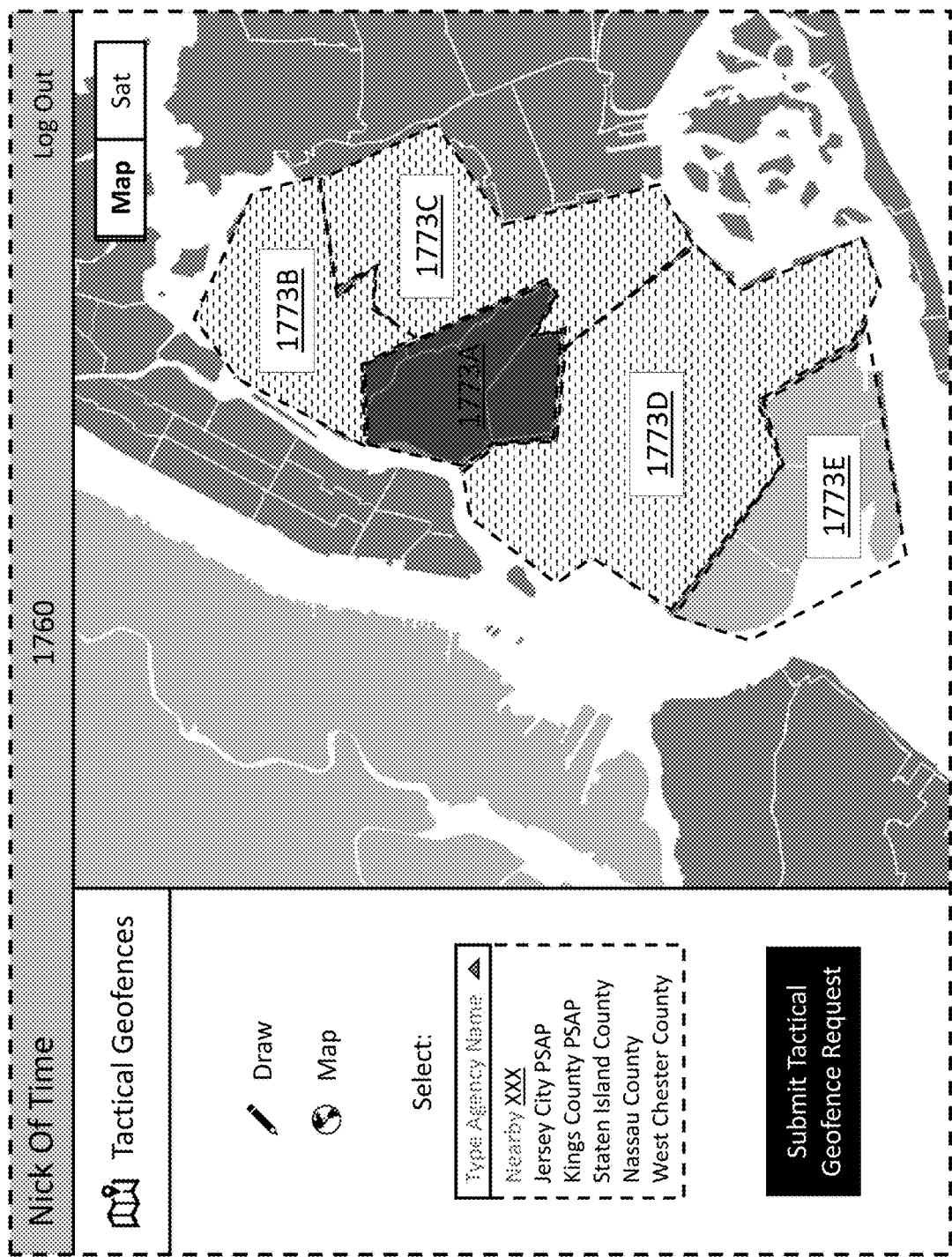

In some embodiments, a tactical geofence request must include a second geofence (i.e., a geofence that the requesting ESP is not yet associated with by the EMS) that the requesting ESP is requesting access to. In some embodiments, as illustrated in FIG. 17A, the emergency response application 1760 provides multiple ways for an ESP to select or define a second geofence 1774 to be included in the tactical geofence request. For example, the example illustrated in FIG. 17A indicates at least three options for selecting or defining a second geofence 1774: a draw option, a map option, and a select ESP option. In some embodiments, a draw option allows a user to create a second geofence 1774 to be included in a tactical geofence request by drawing the second geofence 1774 within an interactive map provided by the GUI of the emergency response application 1760, as illustrated in FIG. 17A. For example, as illustrated in FIG. 17A, in some embodiments, when the draw option is selected, a user can draw a second geofence 1774 to be included in a tactical geofence request by drawing a freeform shape 1774A within the interactive map, or by drawing a geometric shape 1774B (e.g., a rectangle or a circle) within the interactive map. The emergency response application 1760 will automatically save the shape drawn within the interactive map and convert the boundary that the shape defines within the interactive map into a second geofence 1774 to be included in a tactical geofence request. Alternatively, in some embodiments, a user can select the map option to choose between previously defined second geofences 1774 (e.g., second geofences 1774 previously drawn within the interactive map by the requesting ESP) or geofences 1773 associated with other ESPs (e.g., a geofence representing the jurisdiction of a neighboring ESP). For example, as illustrated in FIG. 17B, in some embodiments, when the map option is selected, the emergency response application 1760 displays one or more geofences 1773 associated with other ESPs in the vicinity of the requesting ESP within the interactive map. In this example, the emergency response application has displayed four geofences 1773B-1773E associated with four other ESPs, respectively, within the vicinity of the requesting ESP (represented here by geofence). In some embodiments, a user can then select one or more of these other geofences as a second geofence to be included in a tactical geofence request. In this example, as illustrated in FIG. 17B, a user has selected three of the four geofences (geofences 1773B-1773D) associated with the other ESPs in the vicinity. The emergency response application can then automatically collectively include these three geofences in a second geofence to be included in a tactical geofence request. Alternatively, in some embodiments, a user can use the select ESP option to select one or more geofences associated with one or more specific other ESPs, respectively, as a second geofence to be included in a tactical geofence request. For example, as illustrated in FIG. 17B, the emergency response application 1760 presents a drop-down list of ESPs that a user has accessed. If the user selects one of the ESPs listed in the drop-down list, the emergency response application can automatically include a geofence associated with the selected ESP in a second geofence to be included in a tactical geofence request. In some embodiments, the drop-down list includes only ESPs that the requesting ESP has prior established an emergency data sharing relationship with, as described above.

In some embodiments, once a second geofence has been selected or defined by a user of the emergency response application, the user can submit the second geofence along with a tactical geofence request to the EMS by selecting a button within the emergency response application, such as the Submit Tactical Geofence Request button illustrated in FIG. 17B. In some embodiments, in addition to a second geofence, a tactical geofence request must also include a proposed duration (e.g., one hour, 24 hours, 48 hours, etc.). In some embodiments, if a proposed duration is not specified by the user, the emergency response application includes a default proposed duration (e.g., 24 hours) in the tactical geofence request. In some embodiments, in response to receiving the tactical geofence request from the requesting ESP (e.g., via the emergency response application), the EMS associates the requesting ESP with the second geofence (e.g., alternatively or additionally to any geofences that may have been previously associated with the requesting ESP) within the EMS's geofence system (as described above) for a temporary period of time equivalent to the proposed duration included in the tactical geofence request. During the temporary period, the EMS may then employ the second geofence associated with the requesting ESP in the same ways that the EMS may employ any geofences that had been previously associated with the requesting ESP, such as for the purpose of routing emergency data (as described above and below). In some embodiments, the EMS (e.g., an administrator of the EMS) must approve a tactical geofence request received from an ESP. In some embodiments, the EMS automatically approves a tactical geofence request including a proposed duration less than a threshold amount of time (e.g., less than 6 hours). In some embodiments, the EMS automatically approves a tactical geofence request including a second geofence including only one or more geofences associated with one or more ESPs with which the requesting ESP has prior established an emergency data sharing relationship. In some embodiments, when a first ESP submits a tactical geofence request including a second geofence including (e.g., fully or partially) a geofence associated with a second ESP, the tactical geofence request is first sent to the second ESP (e.g., via an emergency response application) for approval, and the EMS may approve the tactical geofence request only after it is approved by the second ESP. In some embodiments, a particular ESP may submit only a limited number of tactical geofence requests within a predetermined period of time (e.g., only one request per 24 hours).

Figure 17C:
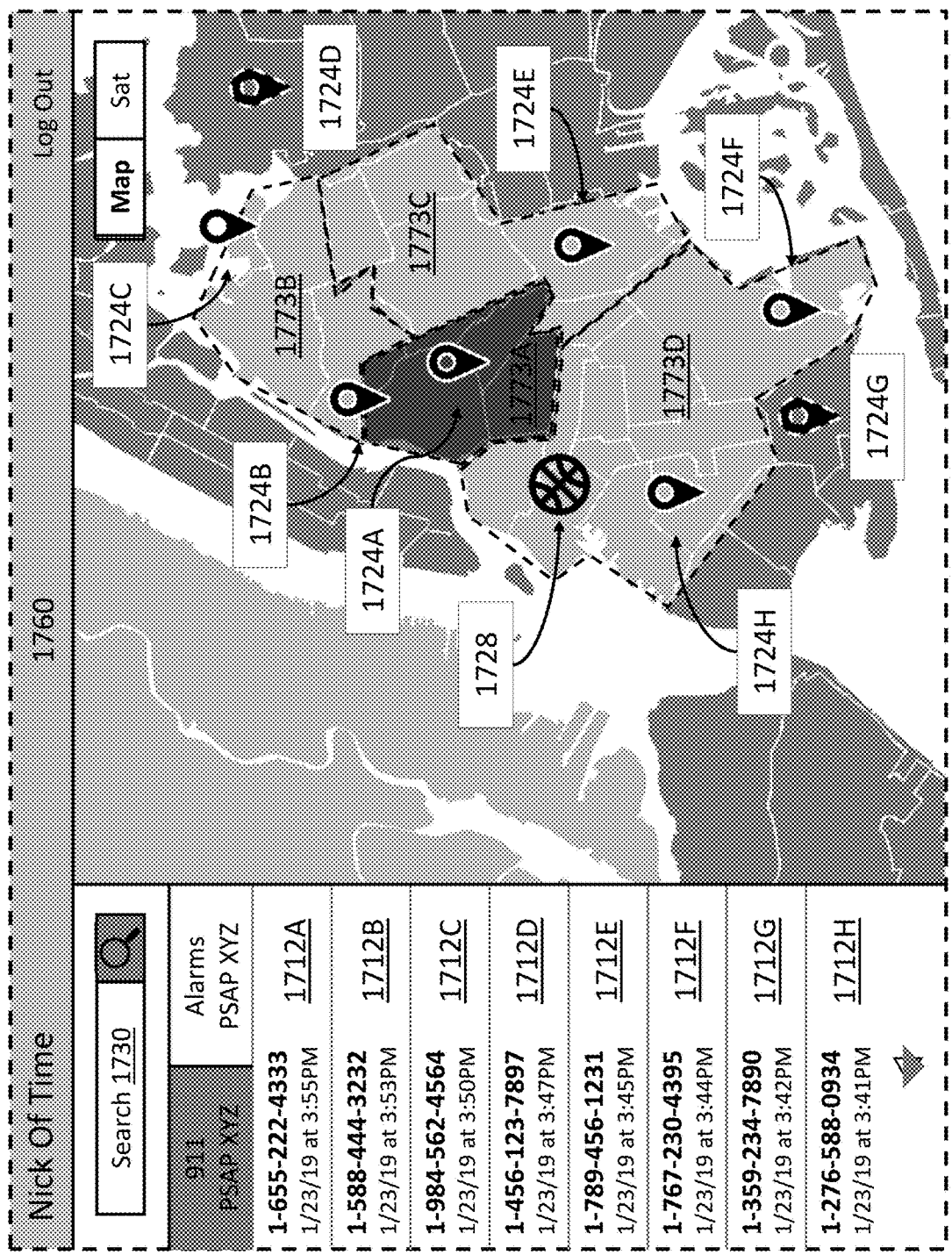

FIG. 17C illustrates an example of tactical geofencing. In this example, the Brooklyn Nets are set to play in the NBA Finals. The Nets will host two consecutive NBA Finals games at Barclays Center 1728 in downtown Brooklyn over a 72-hour period. While they are generally very enjoyable and memorable experiences for many people, professional sports championships can also be accompanied by sharp temporary increases in emergency events in the areas in which they are hosted. For example, increased levels of alcohol consumption can lead to increased domestic and civil disagreements as well as increased car accidents. In anticipation of the upcoming event, PSAP XYZ (in this example, the same ESP from the examples described above with respect to FIGS. 17A-17B), previously associated by the EMS with geofence 1773A, has used the emergency response application to request temporary visibility into a tactical geofence that includes geofences 1773B-1773D (as described above). For example, as described above, PSAP XYZ has used the emergency response application 1760 to select the three geofences 1773B-1773D associated with three neighboring and respective PSAPs as a second geofence and submitted a tactical geofence request including the second geofence and a 72-hour proposed duration (covering the two NBA Finals games set to be hosted in Brooklyn) to the EMS. In this example, the EMS has already approved the tactical geofence request (as described above), and the resulting tactical geofence (i.e., the second geofence; in this example, the combination of geofences 1773B-1773D) is now displayed within the interactive map of the emergency response application, in addition to the geofence 1773A previously associated with PSAP XYZ. Thus, in this example, for the 72-hour period covering the two basketball games, PSAP XYZ will have access not only to emergency data received by the EMS and associated with emergency locations 1724 that fall within geofence 1773A normally associated with PSAP XYZ (e.g., emergency locations 1724A and 1724B), but also emergency data associated with emergency locations 1724 that fall within geofences 1773B-1773D (e.g., emergency locations 1724C, 1724E, 1724F, and 1724H). PSAP XYZ can use this increased and additional visibility into a larger area to have better situational awareness during the NBA Finals held in Brooklyn and to provide other ESPs in the area with extra support. Because emergency locations 1724D and 1724G are still outside of both PSAP XYZ's normal geofence 1773A and the tactical geofence (i.e., in this example, the combination of geofences 1773B-1773D), PSAP XYZ will not have access to emergency data associated with these emergency locations. After the 72-hour period, PSAP XYZ will no longer be associated with the tactical geofence, and will return to having visibility only within the geofences previously associated with PSAP XYZ (e.g., geofence 1773A).

Beat Monitoring

As described above, in various embodiments, tactical geofencing allows for an emergency service provider (ESP) to have visibility into a different or larger area than the ESP's normal jurisdiction. As described above, visibility into a different or larger area than the ESP's normal jurisdiction can be helpful in scenarios in which a mass emergency affects multiple jurisdictions or when an ESP would like to provide overflow support to another ESP, for example. Similarly, there are scenarios in which it would aid an ESP (or a particular member of an ESP, such as a particular call taker at a public safety answering point (PSAP)) to isolate or focus on a subsection of their normal jurisdiction (hereinafter, a "beat area"). For example, during a period in which a PSAP is experiencing an above average call volume, the PSAP may choose to have some of its call takers focus on one area within the PSAP's jurisdiction (e.g., a first beat area) and have some of its other call takers focus on another area within the PSAP's jurisdiction (e.g., a second beat area). Or for example, if a PSAP expects a high volume of emergency calls from a particular area within the PSAP's jurisdiction, the PSAP may have one or two call takers focus on that particular area.

In various embodiments, disclosed herein are systems and methods for providing an ESP with the ability to limit emergency data received by or displayed to the ESP (e.g., through an emergency response application, as described above) to a subsection of the ESP's normal jurisdiction (hereinafter, "beat monitoring"). In some embodiments, beat monitoring limits emergency data received by an ESP from an emergency management system (EMS) to emergency data associated with emergency locations within a particular subsection of the ESP's normal jurisdiction (i.e., a beat area). In some embodiments, beat monitoring limits emergency data displayed to an ESP (e.g., through an emergency response application) to emergency data associated with emergency locations within a particular beat area. In some embodiments, beat monitoring is maintained for a temporary period of time. In some embodiments, beat monitoring is facilitated by an EMS communicatively coupled to an ESP, such as through an emergency response application accessed by the ESP. As described above, in some embodiments, an ESP communicatively coupled to the EMS is associated by the EMS with one or more geofences, and, when the EMS receives emergency data associated with an emergency location that falls within one of the one or more geofences associated with the ESP, the EMS can make that emergency data available to the ESP. For example, in some embodiments, the EMS transmits the emergency data to the ESP to be displayed within a graphical user interface (GUI) provided by an emergency response application accessed by the ESP. In some embodiments, as described above, the EMS provides the emergency response application.

Figure 18A:
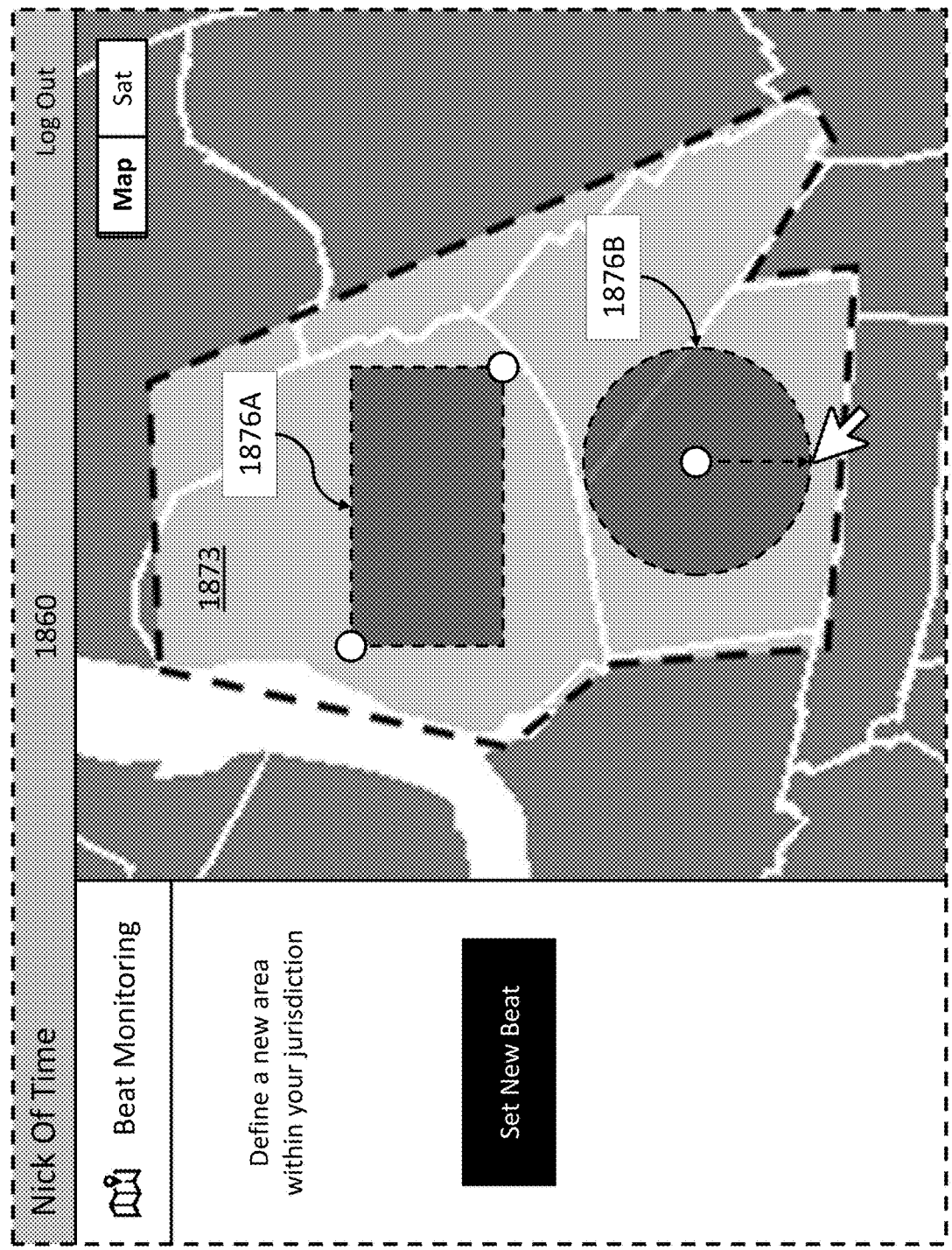
FIG. 18A and FIG. 18B illustrate examples of a graphical user interface of an emergency response application in accordance with one embodiment of the present disclosure.

FIG. 18A illustrates an example of a graphical user interface (GUI) of an emergency response application used to facilitate the process of beat monitoring. In this example, the emergency response application 1860 is a web application being accessed by an ESP via a standard web browser from a computing device at the ESP. The ESP has previously been associated with by the EMS with a geofence 1873 representing the ESP's jurisdiction, which is show in FIG. 18A within an interactive map provided by the GUI of the emergency response application 1860. In this example, the ESP (e.g., a call taker at the ESP) can use the interactive map provided by the GUI of the emergency response application to define a beat area within the geofence associated with the ESP. FIG. 18A illustrates the definition of two beat areas 1876 within geofence 1873. A beat area 1876 may be defined in various ways. In some embodiments, a beat area 1876 is defined as a circle or a polygon. For example, as illustrated in FIG. 18A, beat area 1876A is a rectangle defined by a top left point and a bottom right point. In another example, beat area 1876B is a circle defined by a center point and a radius. In some embodiments, a beat area 1876 is defined by a freeform shape drawn within the interactive map (similar to the process of drawing a freeform shape to define a second geofence for a tactical geofence request, as described above and illustrated in FIG. 17A). Once the beat area 1876 has been defined, the ESP (e.g., a call taker at the ESP) can select the Set New Beat button to confirm the beat area 1876. In some embodiments, beat areas can be saved so that they can be quickly selected in the future.

Figure 18B:
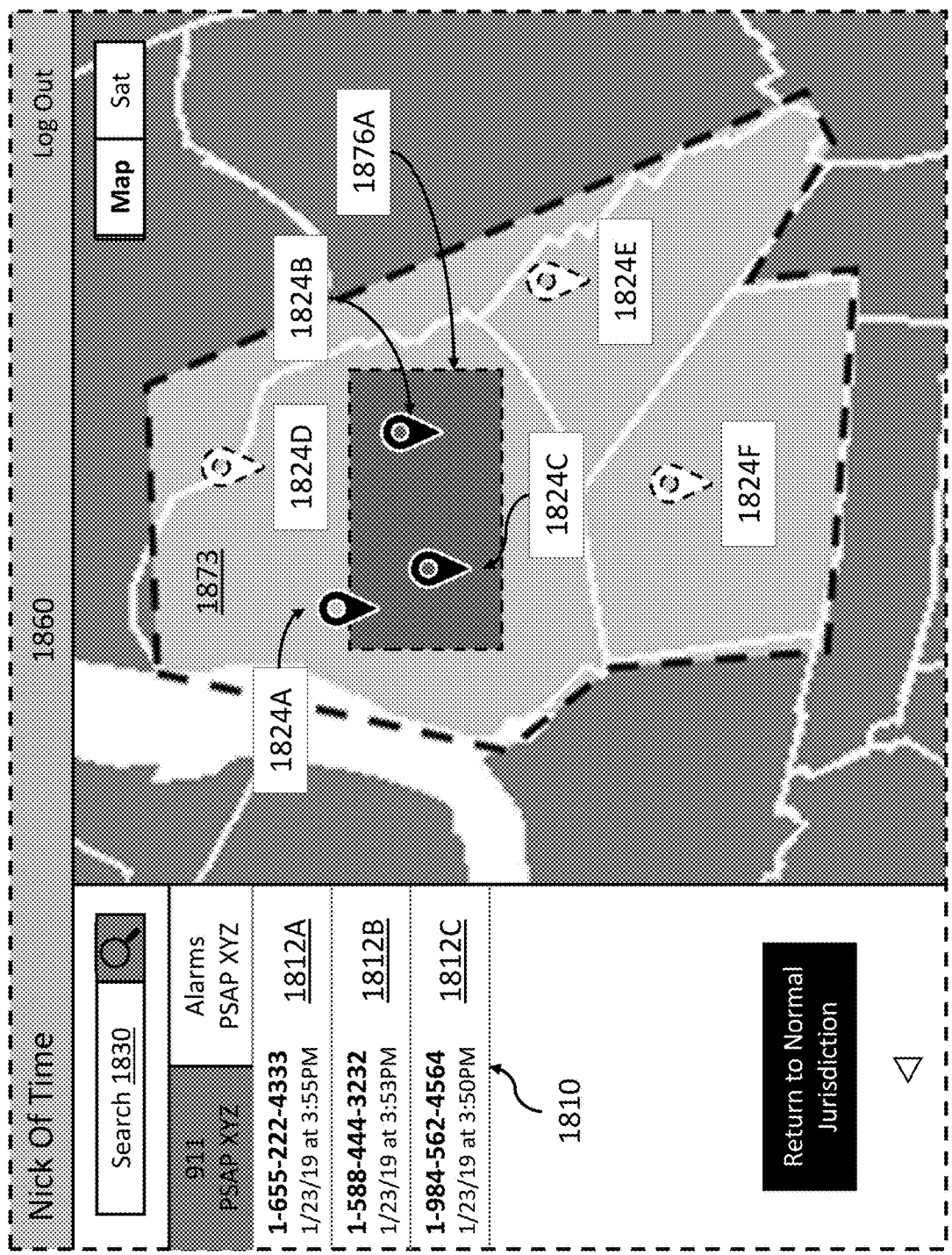

In some embodiments, once a beat area 1876 is confirmed, the emergency response application will only display emergency data associated with emergency locations that fall within the beat area 1876, as illustrated in FIG. 18B. FIG. 18B illustrates an example of a graphical user interface (GUI) of an emergency response application used to facilitate the process of beat monitoring. In the example illustrated in FIG. 18B, beat area 1876A (as described above with respect to FIG. 18A) has been selected or defined by a user of the emergency response application (e.g., a call taker at a PSAP) and confirmed. In this example, the GUI of the emergency response application 1860 displays both the boundary of the geofence 1773 associated with the ESP accessing the emergency response application as well as the boundary of the selected beat area 1876A within the geofence 1773. In some embodiments, however, the emergency response application displays only the boundary of the selected beat area when being used for beat monitoring. While a beat area 1876 is being used for beat monitoring, when the emergency management system (EMS) receives emergency data associated with an emergency location, compares the emergency location to one or more geofences associated with one or more emergency service providers (ESPs), and determines that the emergency location falls within a geofence associated with one of the one or more ESPs (as described above), the EMS additionally determines if the emergency location falls within a beat area being employed by the ESP. In some embodiments, if the ESP associated with the geofence that the emergency location falls within is not employing a beat area within which the emergency location also falls, the EMS will not transmit the emergency data associated with the emergency location to the ESP. For example, in some embodiments, if a particular ESP is only accessing one instance of the emergency response application, and the user accessing that one instance of the emergency response application is using the emergency response application to monitor a beat area, the EMS will not transmit emergency data associated with emergency locations that fall outside of the beat area to the ESP, even if the emergency locations are within the geofence(s) associated with the ESP. In some embodiments, the EMS will transmit (whether automatically or by request) emergency data associated with all emergency locations that fall within the geofence(s) associated with a particular ESP to that ESP, but the emergency response application will only display emergency data associated with emergency locations that fall within a beat area (if a beat area is currently being used for beat monitoring by a user of the emergency response application). For example, in the example illustrated in FIG. 18B, there are six emergency locations 1824 within the geofence 1773 associated with the ESP accessing this instance of the emergency response application. However, only emergency locations 1824A, 1824B, and 1824C, which fall within the beat area 1876A, are displayed within the interactive map, and the list of incidents 1810 shows incidents 1812 for only those three emergency locations (1824A-1824C). However, in this example, if the user of the emergency response application selected the "Return to Normal Jurisdiction" button, the emergency response application would then additionally display both the three hidden emergency locations 1824D-1824F within the interactive map and three respective incidents for emergency locations 1824D-1824F within the list of incidents 1810.

In some embodiments, a beat area 1876 can be dynamically changed while it is being actively used for beat monitoring. For example, in some embodiments, a user can move a beat area 1876, such as by clicking, holding, and dragging the beat area 1876 around the interactive map. In some embodiments, a user can shrink, enlarge, or change the shape of a beat area 1876, such as by clicking, holding, and dragging a corner of the rectangular beat area 1876A. In some embodiments, similar to the way in which a particular incident may be shared from one ESP to another (as described above), a beat area 1876 or the emergency data contained within the beat area (e.g., the emergency locations within the beat area and the emergency data associated with those emergency locations) can be shared from one ESP to another. In this way, an ESP can send a snapshot of emergency information within the ESP's jurisdiction to another ESP.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device. In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In some embodiments, the non-volatile memory comprises magneto resistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, trackpad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" is a digital processing device designed with one or more functionality. A "communication device" refers to a digital processing device with a communication component, which will allow it to send and receive information over a wireless channel, a wired channel, or any combination thereof (e.g., sending/receiving information over the Internet). Exemplary communication devices include a mobile phone (e.g., a smartphone), a laptop, a desktop, a tablet, a radio (e.g., a two-way radio), and a vehicular communication system. In some embodiments, a communication device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a communication device is an Internet of Things (IoT) device. In some embodiments, the communication device is a sensor for sensing environmental or health indicators. In some embodiments, the sensor may include a sensing component and a communication component. In some embodiments, the communication device is a sensor in a sensor network or a device that controls a sensor network.

In some embodiments, a communication device is a wearable device (e.g., a communication device worn by a user). In some embodiments, a communication device (e.g., a wearable device) comprises one or more sensors. As used herein, a "mobile wireless device" refers to a device that is portable and communicates wirelessly. In some embodiments, a user wears or carries the mobile wireless device on the user's person or in the user's vehicle. Exemplary mobile wireless devices include mobile or cellular phones, wearable devices (e.g., smart watch, fitness tracker, wearable sensor, smart glasses, etc.).

As used herein, a "emergency service request" refers to a request or message sent to an emergency service provider for emergency assistance. In some embodiments, a request for assistance is an emergency request for assistance (e.g., the request is associated with an emergency situation) such as, for example, an emergency alert. In some embodiments, an emergency alert comprises a request for assistance. In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency situation (e.g., request for a tow truck after car breaks down). In some embodiments, a request for assistance is associated with a device sending the request. In other embodiments, a request for assistance is associated with a device not sending the request (e.g., a proxy request on behalf of a second device and/or a member device in a group of devices). As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, a "emergency responder" refers to any person or persons responsible for addressing an emergency situation. In some embodiments, a first responder refers to government personnel responsible for addressing an emergency situation. In some embodiments, a first responder is responsible for a particular jurisdiction (e.g., a municipality, a township, a county, etc.). In some embodiments, a first responder is assigned to an emergency by an emergency dispatch center. In some embodiments, a first responder responds to a request for emergency assistance placed by a user via a user communication device. In some embodiments, a first responder includes one or more fire fighters, police officers, emergency medical personnel, community volunteers, private security, security personnel at a university, or other persons employed to protect and serve the public and/or certain subsets of the population.

As used herein, an "emergency service provider" (ESP) is a public or private organization or institution responsible for providing emergency services. For example, in some embodiments, an EDC (e.g., a public safety answering point (PSAP)), a fire department, a police department, and a hospital may all be considered emergency service providers. In some embodiments, an emergency responder is a member of an ESP. In some embodiments, an ESP personnel is a person who works at an ESP. For example, an ESP personnel may be a call-taker at a PSAP or a first responder at a fire department.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when he requests for assistance pertains to an emergency (e.g., a tier 2 emergency). In some embodiments, a recipient is an emergency management system. In some embodiments, a recipient is an emergency dispatch center. In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security guards who are closer to the child than the parent. Security is then able to pick up the child quickly using the data set associated with the member device, which they are given authorization to access by the parent's communication device.

As used herein, an "emergency data source" refers to any device, server, or system that can produce, generate, or communicate information or data pertinent to an emergency. In some embodiments, an emergency data source is a communication device, a wearable device, an internet of things (IoT) device, or any other type of device. In some embodiments, an emergency data source is a network server. As used herein, an "emergency data recipient" refers to any device, server, or system or user of any device, server, or system that can receive information or data pertinent to an emergency. In some embodiments, an emergency data recipient is an emergency service provider (ESP), ESP personnel, or an electronic device associated with an ESP. In some embodiments, an emergency data recipient is a person in an emergency or an electronic device associated with a person in an emergency.

As used herein, a "victim" refers to a person experiencing an emergency. As used herein, a "medical service provider" is a facility that provides people with medical services, such as a hospital, healthcare clinic, emergency room, urgent care center, etc. As used herein, a "preferred medical service provider" is a medical service provider covered under a victim's medical insurance or a medical service provider or has better (e.g., more optimal or less expensive) coverage under the victim's medical insurance than another medical service provider. In some embodiments, a preferred medical service provider may be referred to as an "in-network hospital" or "in-network medical service provider." As used herein, a medical service provider is "proximal" to a location if the medical service provider is within the vicinity of the location (e.g., within 1 mile, 2 miles, 3 miles, 4 miles, or 5 miles of the location).

As used herein, a "user" refers to one or more person or persons associated with a device (e.g., communication device, member device, second device, device of a first responder, etc.). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link refers to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session.

As used herein, "voice or speech recognition software" refers to computer programs that can recognize a person's speech to identify phrases or commands (e.g., iListen, Voice Navigator, Google Now, LilySpeech, etc.). In some embodiments, the software may be able to recognize the identity of the speaker. As used herein, "voice command" refers to words or phrases that a user may use to give command to an electronic device such as a user communication device (e.g., smartphone, smart sensor). The phrases or commands may be user-defined or may be from a library of phrases on the device or at a remote server.

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient (e.g., EMS, EDC, first responder, etc.).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for sharing emergency data between two or more emergency service providers (ESPs), by an emergency management system (EMS), the method comprising:
provinding a first instance of an emergency response application to a first ESP and a second instance of the emergency response application to a second ESP based on a plurality of geofences, each of the plurality of geofences representing jurisdiction of each of a plurality of ESPs including the first ESP and the second ESP, wherein the emergency response application comprises a graphical user interface (GUI) comprising a list of incidents and an interactive map;
receiving, through the GUI of the first instance of the emergency response application, a selection of an option to share a first incident from within the list of incidents;
displaying, within the GUI of the first instance of the emergency response application, a list of ESPs comprising ESPs available for sharing the incident with, wherein the list of ESPs comprises the second ESP;
receiving, through the GUI of the first instance of the emergency response application, a selection of the second ESP from the list of ESPs;
transmitting emergency data associated with the first incident to the second ESP through the second instance of the emergency response application,
wherein the emergency data associated with the first incident comprises a user identifier and an emergency location;
displaying, within the GUI of the second instance of the emergency response application, the user identifier as a second incident within the list of incidents and the emergency location as an incident location within the interactive map; and
initiating a two-way, text-based communication session between the first and second instances of the emergency response application.

2. The method of claim 1, wherein the list of ESPs further comprises one or more ESPs not available for sharing the incident with and wherein the ESPs available for sharing the incident with are marked with an available icon.

3. The method of claim 1, wherein the second ESP is shown within the list of ESPs only if a user associated with the second ESP is logged into the second instance of the emergency response application.

4. The method of claim 1, wherein the list of ESPs further comprises a list of pre-approved ESPs for the first ESP to share incidents with and wherein the second ESP is a pre-approved ESP for the first ESP.

5. The method of claim 1, further comprising receiving a selection of the second incident from within the GUI of the second instance of the emergency response application and, in response, notifying the first ESP of receipt of the second incident by the second ESP.

6. The method of claim 2, wherein notifying the first ESP of the receipt of the second incident by the second ESP comprises displaying a share icon on the first incident within the list of incidents of the first instance of the emergency response application.

7. The method of claim 1, further comprising determining that the second incident is not selected from within the list of incidents of the second instance of the emergency response application within a threshold period of time and, in response, notifying the first ESP of a failed receipt of the second incident by the second ESP.

8. The method of claim 7, wherein notifying first ESP of the failed receipt of the second incident by the second ESP comprises displaying a failed share icon on the first incident within the list of incidents or a failed share banner within the GUI of the first instance of the emergency response application.

9. The method of claim 7, further comprising displaying the emergency location as a second incident location within the interactive map of the first instance of the emergency response application and wherein notifying the first ESP of the failed receipt of the second incident by the second ESP comprises displaying a failed share icon on the second incident location.

10. The method of claim 1, further comprising: providing a third instance of the emergency response application to the first or second ESP; receiving a selection of a third incident associated with the user identifier from within the third instance of the emergency response application; and facilitating a three-way, text-based communication session between the first, second, and third instances of the emergency response application.

11. The method of claim 1, further comprising: providing a third instance of the emergency response application to a third ESP; receiving, through the GUI of the first instance of the emergency response application, a selection of an option to share the first incident with the third ESP; transmitting the emergency data associated with the first incident to the third ESP through the third instance of the emergency response application; displaying, within the GUI of the second instance of the emergency response application, the user identifier as a third incident within the list of incidents; receiving a selection of the third incident from within the third instance of the emergency response application; and facilitating a three-way, text-based communication session between the first, second, and third instances of the emergency response application.

12. The method of claim 1, wherein the both the first and second ESPs are public safety answering points (PSAPs).

13. The method of claim 1, wherein the first ESP is a primary emergency response agency and the second ESP is a non-primary emergency response agency.

14. The method of claim 13, wherein the non-primary emergency response agency is one of a police department, a fire department, and emergency medical services.

15. The method of claim 13, further comprising providing a jurisdictional awareness view to the primary emergency response agency and not providing a jurisdictional awareness view to the non-primary emergency response agency.

16. The method of claim 13, wherein primary emergency response agencies are permitted to share incidents via the emergency response application and non-primary emergency response agencies are not permitted to share incidents via the emergency response application.

17. The method of claim 1, wherein the first ESP is associated with a first geofence and wherein the second ESP is associated with a second geofence that shares a border with the first geofence.

18. An emergency management system (EMS) for sharing emergency data within a network of emergency service providers (ESPs), the system comprising:
(a) a network communication element communicatively coupled to the network of ESPs; and
(b) a processor and non-transitory computer readable storage medium containing instructions that, when executed by the processor, cause the processor to:
provide a first instance of an emergency response application to a first ESP from the network of ESPs and a second instance of the emergency response application to a second ESP from the plurality of ESPs based on a plurality of geofences, each of the plurality of geofences representing jurisdiction of each of the plurality of ESPs,
wherein the emergency response application comprises a graphical user interface (GUI) comprising a list of incidents and an interactive map;
receive, through the GUI of the first instance of the emergency response application, a selection of an option to share a first incident from within the list of incidents;
display, within the GUI of the first instance of the emergency response application, a list of ESPs comprising ESPs available for sharing the first incident with, wherein the list of ESPs comprises the second ESP;
receive, through the GUI of the first instance of the emergency response application, a selection of the second ESP from the list of ESPs;
transmit emergency data associated with the first incident to the second ESP through the second instance of the emergency response application,
wherein the emergency data associated with the first incident comprises a user identifier and an emergency location;
display, within the GUI of the second instance of the emergency response application, the user identifier as a second incident within the list of incidents and the emergency location as an incident location within the interactive map;
receive a selection of the second incident from within the second instance of the emergency response application; and
initiate a two-way, text-based communication session between the first and second instances of the emergency response application.

* * * * *

UNITED STATES PATENT AND TRADEMARK OFFICE
CERTIFICATE OF CORRECTION

PATENT NO. : 11,743,706 B2
APPLICATION NO. : 17/515073
DATED : August 29, 2023
INVENTOR(S) : Pellegrini et al.

Page 1 of 1

It is certified that error appears in the above-identified patent and that said Letters Patent is hereby corrected as shown below:

On the Title Page

Item (54), and in the Specification, Column 1, Line 1, delete "ENHANCED COMMUNICATION FUNCTIONS FOR EMERGENCY SERVICE PROVIDERS" and insert -- ENHANCED EMERGENCY COMMUNICATIONS & TRANSFERS --, therefor.

In the Claims

In Column 83, Claim 1, Line 23, delete "the incident" and insert -- the first incident --, therefor.

In Column 83, Claim 2, Line 44, delete "incident" and insert -- first incident --, therefor.

In Column 83, Claim 2, Line 45, delete "incident" and insert -- first incident --, therefor.

In Column 84, Claim 8, Line 3, delete "first" and insert -- the first --, therefor.

In Column 84, Claim 12, Line 42, delete "the both" and insert -- both of --, therefor.

Signed and Sealed this
Twenty-fifth Day of February, 2025

Coke Morgan Stewart
*Acting Director of the United States Patent and Trademark Office*